(12) United States Patent
Sahin et al.

(10) Patent No.: US 12,522,640 B2
(45) Date of Patent: Jan. 13, 2026

(54) IL2 AGONISTS

(71) Applicants: BioNTech RNA Pharmaceuticals GmbH, Mainz (DE); TRON—Translational Onkologie an der Universitätsmedizin der Johannes Gutenberg-Universität Mainz gemeinnutzige GmbH, Mainz (DE)

(72) Inventors: Ugur Sahin, Mainz (DE); Mathias Vormehr, Mainz (DE); Lena Mareen Kranz, Mainz (DE); Sina Fellermeier-Kopf, Mainz (DE); Alexander Muik, Mainz (DE); Friederike Gieseke, Mainz (DE); Bodo Tillmann, Frankfurt (DE); Sonja Witzel, Bad Vilbel (DE)

(73) Assignees: BIONTECH SE, Mainz (DE); TRON—TRANSLATIONALE ONKOLOGIE AN DER UNIVERSITÄTSMEDIZIN DER JOHANNES GUTENBERG-UNIVERSITÄT MAINZ GEMEINNÜTZIGE GMBH, Mainz (DE)

( * ) Notice: Subject to any disclaimer, the term of this patent is extended or adjusted under 35 U.S.C. 154(b) by 275 days.

(21) Appl. No.: 17/262,097

(22) PCT Filed: Jul. 19, 2019

(86) PCT No.: PCT/EP2019/069541
§ 371 (c)(1),
(2) Date: Jan. 21, 2021

(87) PCT Pub. No.: WO2020/020783
PCT Pub. Date: Jan. 30, 2020

(65) Prior Publication Data
US 2021/0292386 A1 Sep. 23, 2021

(30) Foreign Application Priority Data

Jul. 24, 2018 (WO) ................ PCT/EP2018/070068

(51) Int. Cl.
*A61K 38/20* (2006.01)
*A61K 39/00* (2006.01)
*A61K 39/39* (2006.01)
*A61K 45/06* (2006.01)
(Continued)

(52) U.S. Cl.
CPC .......... *C07K 14/55* (2013.01); *A61K 38/2013* (2013.01); *A61K 39/0011* (2013.01); *A61K 39/00114* (2018.08); *A61K 39/39* (2013.01); *A61K 45/06* (2013.01); *A61P 35/00* (2018.01); *A61K 2039/53* (2013.01); *A61K 2039/55533* (2013.01); *A61K 2039/57* (2013.01); *C07K 2319/30* (2013.01); *C07K 2319/31* (2013.01)

(58) Field of Classification Search
None
See application file for complete search history.

(56) References Cited

U.S. PATENT DOCUMENTS

| 4,281,061 | A | * | 7/1981 | Zuk | ........................... C12N 9/96 |
|---|---|---|---|---|---|
| | | | | | 435/7.37 |
| 5,977,322 | A | * | 11/1999 | Marks | .................... F16H 59/105 |
| | | | | | 530/387.3 |
| 7,888,071 | B2 | | 2/2011 | Gillies et al. | |

(Continued)

FOREIGN PATENT DOCUMENTS

| CA | 2 583 716 A1 | 10/2008 |
|---|---|---|
| CN | 102 101 885 A | 6/2011 |

(Continued)

OTHER PUBLICATIONS

Suave et al. (Proc. Nati. Acad. Sci. USA vol. 88, pp. 4636-4640, Jun. 1991). (Year: 1991).*

(Continued)

*Primary Examiner* — Zachary S Skelding
(74) *Attorney, Agent, or Firm* — McDonnell Boehnen Hulbert & Berghoff, LLP

(57) ABSTRACT

The invention relates to variants of interleukin-2 (IL2). In one embodiment, the IL2 variants activate effector T cells over regulatory T cells. In particular, the invention relates to a polypeptide comprising a mutein of human IL2 or of a functional variant of human IL2, wherein the human IL2 or functional variant thereof is substituted at at least a position having an acidic or basic amino acid residue in wild type human IL2 that contacts the alpha subunit of the αβγ IL2 receptor complex (Il2Kαβγ). Alternatively, the mutein of human IL2 or of a functional variant of human IL2 comprises at least (i) one or more amino acid substitutions which reduce the affinity for the alpha subunit of II_2Kαβγ and (ii) one or more amino acid substitutions which enhance the affinity for II_2Kβγ. The invention also relates to polynucleotides coding for the polypeptides of the invention, host cells comprising the polynucleotides, pharmaceutical compositions comprising the polypeptides, polynucleotides or host cells, therapeutic or prophylactic methods of treatment using the polypeptides, polynucleotides, host cells or pharmaceutical compositions and medical preparations comprising the polypeptides, polynucleotides, host cells or pharmaceutical compositions.

25 Claims, 17 Drawing Sheets
Specification includes a Sequence Listing.

(51) Int. Cl.
*A61P 35/00* (2006.01)
*C07K 14/55* (2006.01)

(56) References Cited

U.S. PATENT DOCUMENTS

| | | | |
|---|---|---|---|
| 9,428,567 | B2 | 8/2016 | Garcia et al. |
| 10,184,009 | B2 | 1/2019 | Ast et al. |
| 2006/0099582 | A1* | 5/2006 | Papadopoulos ......... A61P 41/00 435/6.16 |
| 2011/0091412 | A1 | 4/2011 | Wittrup et al. |
| 2012/0244112 | A1* | 9/2012 | Ast ................... A61K 47/6891 536/23.4 |
| 2014/0046026 | A1 | 2/2014 | Garcia et al. |
| 2019/0062395 | A1* | 2/2019 | Merchant .......... C07K 16/2896 |
| 2019/0315826 | A1 | 10/2019 | Dorantes et al. |

FOREIGN PATENT DOCUMENTS

| | | |
|---|---|---|
| WO | 2004/022593 A2 | 3/2004 |
| WO | 2005/007121 A2 | 1/2005 |
| WO | 2005/086751 A1 | 9/2005 |
| WO | 2005/086798 A2 | 9/2005 |
| WO | 2012/107417 A1 | 8/2012 |
| WO | 2012/119093 A1 | 9/2012 |
| WO | 2014/145907 A1 | 9/2014 |
| WO | 2015/164815 A1 | 10/2015 |
| WO | WO-2018091003 A1 * | 5/2018 ......... A61K 38/2013 |

OTHER PUBLICATIONS

Jiang et al. (Oncoimmunology. Apr. 25, 2016;5(6):e1163462), renumbered as pp. 1-11). (Year: 2016).*
Vazquez-Lombardi et al. (Nat Commun. May 12, 2017;8:15373, supplemental pp. 1-21). (Year: 2017).*
Stauber DJ, Debler EW, Horton PA, Smith KA, Wilson IA. Crystal structure of the IL-2 signaling complex: paradigm for a heterotrimeric cytokine receptor. Proc Natl Acad Sci U S A. Feb. 21, 2006; 103(8):2788-93.
Glaesner W. et al., Engineering and characterization of the long-acting glucagon-like peptide-1 analogue LY2189265, an Fc fusion protein, Diabetes/metabolism research and reviews, 2010, v. 26, n. 4, p. 287-296.
Berry M. J. et al., Substitution of cysteine for selenocysteine in type I iodothyronine deiodinase reduces the catalytic efficiency of the protein but enhances its translation, Endocrinology, 1992, v. 131, n. 4, p. 1848-1852.
Gasser B. et al., Antibody production with yeasts and filamentous fungi: on the road to large scale?, Biotechnology letters, 2007, v. 29, n. 2, p. 201-212.
Muller S. et al., Spliceosomal peptide P140 for immunotherapy of systemic lupus erythematosus: results of an early phase II clinical trial, Arthritis & Rheumatism: Official Journal of the American College of Rheumatology, 2008, v. 58, n. 12, p. 3873-3883.
Viola J.R. et al., Non-viral nanovectors for gene delivery: factors that govern successful therapeutics, Expert Opin. Drug Deliv., 2010, v. 7, is. 6, p. 721-735.
Khan K. H., Gene expression in Mammalian cells and its applications, Advanced Pharmaceutical Bulletin, 2013, v. 3, n. 2, p. 257-263.
Zhang H. et al., New strategies for the treatment of solid tumors with CAR-T cells, International Journal of Biological Sciences, 2016, v. 12, n. 6, p. 718-729.

L. V. Prokofieva, et al., "P 80 a course of lectures on general pharmacology," Ulyanovsk State University Institute of Medicine, Ecology and Physical Culture Faculty of Postgraduate Medical and Pharmaceutical Education Department of General and Clinical Pharmacology with Microbiology Course (ПРОКОФЬЕВА Л.В. и др., Курс лекций по общей фармакологии: учебно-методическое пособие. Ульяновск: УлГУ 2017, 155 с., с.65-77.
Marofi, et al., "CAR T cells in solid tumors: challenges and opportunities," Stem Cell Research & Therapy (2021) 12:81.
Moiseeva I. Ya et al., General Pharmacology and Formulation: textbook for training 30.05.03 "Medical cybernetics", 2017, Penza: Publishing house of PSU, 68 p. p. 5 (translation included).
Prokofieva. L. V. et al., A course of lectures on general pharmacology: an educational and methodological manual, Ulyanovsk: UlSU, 2017, 155 p., pp. 65-77 (translation included).
Baggio L.L. et al., Recombinant human glucagon-like peptide (GLP)-1-albumin protein (albumin) mimics the peptidergic activation of receptor-dependent GLP-1 pathways associated with saturation, gastrointestinal peristalsis tract and glucose homeostasis, Diabetes, 2004, v.53, No. 9, pp. 2492-2500.
Wang et al., "Substitutions at the Glu62 residue of human interleukin-2 differentially affect its binding to the alpha chain and the beta gamma complex of the interleukin-2 receptor.", European Journal of Immunology, 1995, 25(5), 1212-1216.
Wang et al., "A New Computer-imitated Model of Spatial Interaction between Interleukin-2 and Interleukin-2 Receptor Complex.", XP002794559, Database Medline, US National Library of Medicine, 1996, 1 page.
Bamborough et al., "The interleukin-2 and interleukin-4 receptors studied by molecular modelling", Structure, 1994, 2(9), 839-851.
Rosalia et al., "Use of enhanced interleukin-2 formulations for improved immunotherapy against cancer.", Current Opinion in Chemical Biology, 2014, vol. 23, 39-46.
Huang et al., "[Analysis of the molecular characteristics and cloning of full-length coding sequence of Interleukin-2 in tree shrews].", Zoological Research, 2013, 34(2), 121-126.
Adams et al., "Expression of nine-banded armadillo (*Dasypus novemcinctus*) interleukin-2 in *E. coli*", Cytokine, 2005, 32(5), 219-225.
Vazquez-Lombardi et al., "Potent antitumour activity of interleukin-2-Fc fusion proteins requires Fo-mediated depletion of regulatory T-cells", Nature Communications, 2017, vol. 8, 12 pages.
Melder et al., Pharmacokinetics and in vitro and in vivo anti-tumor response of an interleukin-2-human serum albumin fusion protein in mice, Cancer Immunology, Immunotherapy, 2005, 54(6), 535-547.
Najjam et al., "Further characterization of the binding of human recombinant interleukin 2 to heparin and identification of putative binding sites", Glycobiology, 1998, 8(5), 509-516.
Haigh P.I. et al., Vaccine therapy for patients with melanoma, Oncology, 1999, v.13, n.11, p. 1561-1574.
Jahn E. M, et al., How to systematically evaluate immunogenicity of therapeutic proteins-regulatory considerations, New biotechnology, 2009, v. 25, n. 5, p. 280-286.
Kaiko et al., Immunological decision-making: how does the immune system decide to mount a helper T-cell response?, Immunology, 2008, v.123, n.3, p. 326-338.
Kontermann R. E. et al., Bispecific antibodies, Drug Discovery Today, 2015, v. 7, n. 20, p. 838-847.
Nelson et al., The "Trojan Horse" Approach to Tumor Immunotherapy: Targeting the Tumor Microenvironment, J. Immunol. Res., 2014, v.2014, art.789069, p. 1-14.
Spitler L.E., Cancer vaccines: the interferon analogy, Cancer Biother., 1995, v.10, n.1, p. 1-3.

* cited by examiner

A

B

C

G

H

A

B

C

H

I

J

SEQUENCE LISTING

```
<160> NUMBER OF SEQ ID NOS: 21

<210> SEQ ID NO 1
<211> LENGTH: 133
<212> TYPE: PRT
<213> ORGANISM: Artificial Sequence
<220> FEATURE:
<223> OTHER INFORMATION: IL2 Variant

<400> SEQUENCE: 1

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30
```

```
Asn Pro Lys Leu Thr Ala Met Leu Thr Ala Lys Phe Ala Met Pro Lys
            35                  40                  45

Lys Ala Thr Glu Leu Lys His Leu Gln Cys Leu Glu Glu Ala Leu Lys
     50                  55                  60

Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
            115                 120                 125

Ile Ser Thr Leu Thr
        130

<210> SEQ ID NO 2
<211> LENGTH: 133
<212> TYPE: PRT
<213> ORGANISM: Artificial Sequence
<220> FEATURE:
<223> OTHER INFORMATION: IL2 Variant

<400> SEQUENCE: 2

Ala Pro Thr Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
             20                  25                  30

Asn Pro Ala Leu Thr Arg Met Leu Thr Phe Ala Phe Tyr Met Pro Lys
            35                  40                  45

Lys Ala Thr Glu Leu Lys His Leu Gln Cys Leu Glu Ala Glu Leu Lys
     50                  55                  60

Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
            115                 120                 125

Ile Ser Thr Leu Thr
        130

<210> SEQ ID NO 3
<211> LENGTH: 133
<212> TYPE: PRT
<213> ORGANISM: Artificial Sequence
<220> FEATURE:
<223> OTHER INFORMATION: IL2 Variant

<400> SEQUENCE: 3

Ala Pro Thr Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
             20                  25                  30

Asn Pro Glu Leu Thr Arg Met Leu Thr Phe Glu Phe Tyr Met Pro Lys
            35                  40                  45

Lys Ala Thr Glu Leu Lys His Leu Gln Cys Leu Glu Lys Glu Leu Lys
```

```
                    50                  55                  60
Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
        130

<210> SEQ ID NO 4
<211> LENGTH: 133
<212> TYPE: PRT
<213> ORGANISM: Artificial Sequence
<220> FEATURE:
<223> OTHER INFORMATION: IL2 Variant

<400> SEQUENCE: 4

Ala Pro Thr Ser Ser Ser Thr Lys Lys Thr Gln Leu Gln Leu Glu His
  1               5                  10                  15

Leu Leu Leu Asp Leu Gln Met Ile Leu Asn Gly Ile Asn Asn Tyr Lys
                 20                  25                  30

Asn Pro Lys Leu Thr Arg Met Leu Thr Phe Glu Phe Tyr Met Pro Lys
             35                  40                  45

Lys Ala Thr Glu Leu Lys His Leu Gln Cys Leu Glu Lys Glu Leu Lys
         50                  55                  60

Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
        130

<210> SEQ ID NO 5
<211> LENGTH: 133
<212> TYPE: PRT
<213> ORGANISM: Artificial Sequence
<220> FEATURE:
<223> OTHER INFORMATION: IL2 Variant

<400> SEQUENCE: 5

Ala Pro Thr Ser Ser Ser Thr Lys Lys Thr Gln Leu Gln Leu Glu His
  1               5                  10                  15

Leu Leu Leu Asp Leu Gln Met Ile Leu Asn Gly Ile Asn Asn Tyr Lys
                 20                  25                  30

Asn Pro Lys Leu Thr Arg Met Leu Thr Phe Lys Phe Tyr Met Pro Lys
             35                  40                  45

Lys Ala Thr Glu Leu Lys His Leu Gln Cys Leu Glu Lys Glu Leu Lys
         50                  55                  60

Pro Leu Glu Glu Val Leu Asn Leu Ala Gln Ser Lys Asn Phe His Leu
 65                  70                  75                  80
```

```
Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
        130

<210> SEQ ID NO 6
<211> LENGTH: 133
<212> TYPE: PRT
<213> ORGANISM: Artificial Sequence
<220> FEATURE:
<223> OTHER INFORMATION: IL2 Variant

<400> SEQUENCE: 6

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Lys Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
        130

<210> SEQ ID NO 7
<211> LENGTH: 133
<212> TYPE: PRT
<213> ORGANISM: Artificial Sequence
<220> FEATURE:
<223> OTHER INFORMATION: IL2 Variant

<400> SEQUENCE: 7

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Glu Phe Tyr Met Pro Lys
        35                  40                  45

Lys Ala Thr Glu Leu Lys His Leu Gln Cys Leu Glu Lys Glu Leu Lys
    50                  55                  60

Pro Leu Glu Glu Val Leu Asn Leu Ala Gln Ser Lys Asn Phe His Phe
65                  70                  75                  80

Asp Pro Arg Asp Val Val Ser Asn Ile Asn Val Phe Val Leu Glu Leu
                85                  90                  95

Lys Gly Ser Glu Thr Thr Phe Met Cys Glu Tyr Ala Asp Glu Thr Ala
            100                 105                 110
```

```
Thr Ile Val Glu Phe Leu Asn Arg Trp Ile Thr Phe Cys Gln Ser Ile
        115                 120                 125

Ile Ser Thr Leu Thr
        130

<210> SEQ ID NO 8
<211> LENGTH: 133
<212> TYPE: PRT
<213> ORGANISM: Artificial Sequence
<220> FEATURE:
<223> OTHER INFORMATION: IL2 Variant

<400> SEQUENCE: 8

Ala Pro Thr Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Arg Met Leu Thr Phe Lys Phe Tyr Met Pro Lys
            35                  40                  45

Lys Ala Thr Glu Leu Lys His Leu Gln Cys Leu Glu Glu Lys Leu Lys
    50                  55                  60

Pro Leu Glu Glu Val Leu Asn Leu Ala Gln Ser Lys Asn Phe His Phe
65                  70                  75                  80

Asp Pro Arg Asp Val Val Ser Asn Ile Asn Val Phe Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
        130

<210> SEQ ID NO 9
<211> LENGTH: 752
<212> TYPE: PRT
<213> ORGANISM: Artificial Sequence
<220> FEATURE:
<223> OTHER INFORMATION: IL2 Variant

<400> SEQUENCE: 9

Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
                20                  25                  30

His Arg Phe Lys Asp Leu Gly Glu Glu Asn Phe Lys Ala Leu Val Leu
            35                  40                  45

Ile Ala Phe Ala Gln Tyr Leu Gln Gln Cys Pro Phe Glu Asp His Val
    50                  55                  60

Lys Leu Val Asn Glu Val Thr Glu Phe Ala Lys Thr Cys Val Ala Asp
65                  70                  75                  80

Glu Ser Ala Glu Asn Cys Asp Lys Ser Leu His Thr Leu Phe Gly Asp
                85                  90                  95

Lys Leu Cys Thr Val Ala Thr Leu Arg Glu Thr Tyr Gly Glu Met Ala
            100                 105                 110

Asp Cys Cys Ala Lys Gln Glu Pro Glu Arg Asn Glu Cys Phe Leu Gln
        115                 120                 125

His Lys Asp Asp Asn Pro Asn Leu Pro Arg Leu Val Arg Pro Glu Val
```

```
            130                 135                 140
Asp Val Met Cys Thr Ala Phe His Asp Asn Glu Glu Thr Phe Leu Lys
145                 150                 155                 160

Lys Tyr Leu Tyr Glu Ile Ala Arg Arg His Pro Tyr Phe Tyr Ala Pro
                165                 170                 175

Glu Leu Leu Phe Phe Ala Lys Arg Tyr Lys Ala Ala Phe Thr Glu Cys
            180                 185                 190

Cys Gln Ala Ala Asp Lys Ala Ala Cys Leu Leu Pro Lys Leu Asp Glu
        195                 200                 205

Leu Arg Asp Glu Gly Lys Ala Ser Ser Ala Lys Gln Arg Leu Lys Cys
    210                 215                 220

Ala Ser Leu Gln Lys Phe Gly Glu Arg Ala Phe Lys Ala Trp Ala Val
225                 230                 235                 240

Ala Arg Leu Ser Gln Arg Phe Pro Lys Ala Glu Phe Ala Glu Val Ser
                245                 250                 255

Lys Leu Val Thr Asp Leu Thr Lys Val His Thr Glu Cys Cys His Gly
            260                 265                 270

Asp Leu Leu Glu Cys Ala Asp Asp Arg Ala Asp Leu Ala Lys Tyr Ile
        275                 280                 285

Cys Glu Asn Gln Asp Ser Ile Ser Ser Lys Leu Lys Glu Cys Cys Glu
    290                 295                 300

Lys Pro Leu Leu Glu Lys Ser His Cys Ile Ala Glu Val Glu Asn Asp
305                 310                 315                 320

Glu Met Pro Ala Asp Leu Pro Ser Leu Ala Ala Asp Phe Val Glu Ser
                325                 330                 335

Lys Asp Val Cys Lys Asn Tyr Ala Glu Ala Lys Asp Val Phe Leu Gly
            340                 345                 350

Met Phe Leu Tyr Glu Tyr Ala Arg Arg His Pro Asp Tyr Ser Val Val
        355                 360                 365

Leu Leu Leu Arg Leu Ala Lys Thr Tyr Glu Thr Thr Leu Glu Lys Cys
    370                 375                 380

Cys Ala Ala Ala Asp Pro His Glu Cys Tyr Ala Lys Val Phe Asp Glu
385                 390                 395                 400

Phe Lys Pro Leu Val Glu Glu Pro Gln Asn Leu Ile Lys Gln Asn Cys
                405                 410                 415

Glu Leu Phe Glu Gln Leu Gly Glu Tyr Lys Phe Gln Asn Ala Leu Leu
            420                 425                 430

Val Arg Tyr Thr Lys Lys Val Pro Gln Val Ser Thr Pro Thr Leu Val
        435                 440                 445

Glu Val Ser Arg Asn Leu Gly Lys Val Gly Ser Lys Cys Cys Lys His
    450                 455                 460

Pro Glu Ala Lys Arg Met Pro Cys Ala Glu Asp Tyr Leu Ser Val Val
465                 470                 475                 480

Leu Asn Gln Leu Cys Val Leu His Glu Lys Thr Pro Val Ser Asp Arg
                485                 490                 495

Val Thr Lys Cys Cys Thr Glu Ser Leu Val Asn Arg Arg Pro Cys Phe
            500                 505                 510

Ser Ala Leu Glu Val Asp Glu Thr Tyr Val Pro Lys Glu Phe Asn Ala
        515                 520                 525

Glu Thr Phe Thr Phe His Ala Asp Ile Cys Thr Leu Ser Glu Lys Glu
    530                 535                 540

Arg Gln Ile Lys Lys Gln Thr Ala Leu Val Glu Leu Val Lys His Lys
545                 550                 555                 560
```

Pro Lys Ala Thr Lys Glu Gln Leu Lys Ala Val Met Asp Asp Phe Ala
            565                 570                 575

Ala Phe Val Glu Lys Cys Cys Lys Ala Asp Asp Lys Glu Thr Cys Phe
            580                 585                 590

Ala Glu Glu Gly Lys Lys Leu Val Ala Ala Ser Gln Ala Ala Leu Gly
            595                 600                 605

Leu Gly Gly Ser Gly Gly Gly Ser Gly Gly Ala Pro Thr Ser Ser
    610                 615                 620

Ser Thr Lys Lys Thr Gln Leu Gln Leu Glu His Leu Leu Leu Asp Leu
625                 630                 635                 640

Gln Met Ile Leu Asn Gly Ile Asn Asn Tyr Lys Asn Pro Lys Leu Thr
            645                 650                 655

Ala Met Leu Thr Ala Lys Phe Ala Met Pro Lys Lys Ala Thr Glu Leu
            660                 665                 670

Lys His Leu Gln Cys Leu Glu Glu Ala Leu Lys Pro Leu Glu Glu Val
            675                 680                 685

Leu Asn Leu Ala Gln Ser Lys Asn Phe His Leu Arg Pro Arg Asp Leu
            690                 695                 700

Ile Ser Asn Ile Asn Val Ile Val Leu Glu Leu Lys Gly Ser Glu Thr
705                 710                 715                 720

Thr Phe Met Cys Glu Tyr Ala Asp Glu Thr Ala Thr Ile Val Glu Phe
            725                 730                 735

Leu Asn Arg Trp Ile Thr Phe Cys Gln Ser Ile Ile Ser Thr Leu Thr
            740                 745                 750

<210> SEQ ID NO 10
<211> LENGTH: 752
<212> TYPE: PRT
<213> ORGANISM: Artificial Sequence
<220> FEATURE:
<223> OTHER INFORMATION: IL2 Variant

<400> SEQUENCE: 10

Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
            20                  25                  30

His Arg Phe Lys Asp Leu Gly Glu Glu Asn Phe Lys Ala Leu Val Leu
        35                  40                  45

Ile Ala Phe Ala Gln Tyr Leu Gln Gln Cys Pro Phe Glu Asp His Val
    50                  55                  60

Lys Leu Val Asn Glu Val Thr Glu Phe Ala Lys Thr Cys Val Ala Asp
65                  70                  75                  80

Glu Ser Ala Glu Asn Cys Asp Lys Ser Leu His Thr Leu Phe Gly Asp
            85                  90                  95

Lys Leu Cys Thr Val Ala Thr Leu Arg Glu Thr Tyr Gly Glu Met Ala
        100                 105                 110

Asp Cys Cys Ala Lys Gln Glu Pro Glu Arg Asn Glu Cys Phe Leu Gln
    115                 120                 125

His Lys Asp Asp Asn Pro Asn Leu Pro Arg Leu Val Arg Pro Glu Val
    130                 135                 140

Asp Val Met Cys Thr Ala Phe His Asp Asn Glu Glu Thr Phe Leu Lys
145                 150                 155                 160

Lys Tyr Leu Tyr Glu Ile Ala Arg Arg His Pro Tyr Phe Tyr Ala Pro
            165                 170                 175

```
Glu Leu Leu Phe Phe Ala Lys Arg Tyr Lys Ala Ala Phe Thr Glu Cys
            180                 185                 190

Cys Gln Ala Ala Asp Lys Ala Ala Cys Leu Leu Pro Lys Leu Asp Glu
        195                 200                 205

Leu Arg Asp Glu Gly Lys Ala Ser Ser Ala Lys Gln Arg Leu Lys Cys
    210                 215                 220

Ala Ser Leu Gln Lys Phe Gly Glu Arg Ala Phe Lys Ala Trp Ala Val
225                 230                 235                 240

Ala Arg Leu Ser Gln Arg Phe Pro Lys Ala Glu Phe Ala Glu Val Ser
            245                 250                 255

Lys Leu Val Thr Asp Leu Thr Lys Val His Thr Glu Cys Cys His Gly
        260                 265                 270

Asp Leu Leu Glu Cys Ala Asp Asp Arg Ala Asp Leu Ala Lys Tyr Ile
    275                 280                 285

Cys Glu Asn Gln Asp Ser Ile Ser Ser Lys Leu Lys Glu Cys Cys Glu
        290                 295                 300

Lys Pro Leu Leu Glu Lys Ser His Cys Ile Ala Glu Val Glu Asn Asp
305                 310                 315                 320

Glu Met Pro Ala Asp Leu Pro Ser Leu Ala Ala Asp Phe Val Glu Ser
            325                 330                 335

Lys Asp Val Cys Lys Asn Tyr Ala Glu Ala Lys Asp Val Phe Leu Gly
        340                 345                 350

Met Phe Leu Tyr Glu Tyr Ala Arg Arg His Pro Asp Tyr Ser Val Val
    355                 360                 365

Leu Leu Leu Arg Leu Ala Lys Thr Tyr Glu Thr Thr Leu Glu Lys Cys
        370                 375                 380

Cys Ala Ala Ala Asp Pro His Glu Cys Tyr Ala Lys Val Phe Asp Glu
385                 390                 395                 400

Phe Lys Pro Leu Val Glu Glu Pro Gln Asn Leu Ile Lys Gln Asn Cys
            405                 410                 415

Glu Leu Phe Glu Gln Leu Gly Glu Tyr Lys Phe Gln Asn Ala Leu Leu
        420                 425                 430

Val Arg Tyr Thr Lys Lys Val Pro Gln Val Ser Thr Pro Thr Leu Val
    435                 440                 445

Glu Val Ser Arg Asn Leu Gly Lys Val Gly Ser Lys Cys Cys Lys His
        450                 455                 460

Pro Glu Ala Lys Arg Met Pro Cys Ala Glu Asp Tyr Leu Ser Val Val
465                 470                 475                 480

Leu Asn Gln Leu Cys Val Leu His Glu Lys Thr Pro Val Ser Asp Arg
            485                 490                 495

Val Thr Lys Cys Cys Thr Glu Ser Leu Val Asn Arg Arg Pro Cys Phe
        500                 505                 510

Ser Ala Leu Glu Val Asp Glu Thr Tyr Val Pro Lys Glu Phe Asn Ala
    515                 520                 525

Glu Thr Phe Thr Phe His Ala Asp Ile Cys Thr Leu Ser Glu Lys Glu
        530                 535                 540

Arg Gln Ile Lys Lys Gln Thr Ala Leu Val Glu Leu Val Lys His Lys
545                 550                 555                 560

Pro Lys Ala Thr Lys Glu Gln Leu Lys Ala Val Met Asp Asp Phe Ala
            565                 570                 575

Ala Phe Val Glu Lys Cys Cys Lys Ala Asp Asp Lys Glu Thr Cys Phe
        580                 585                 590
```

Ala Glu Glu Gly Lys Lys Leu Val Ala Ala Ser Gln Ala Leu Gly
                595                 600                 605

Leu Gly Gly Ser Gly Gly Gly Ser Gly Gly Ala Pro Thr Ser Ser
        610                 615                 620

Ser Thr Lys Lys Thr Gln Leu Gln Leu Glu His Leu Leu Asp Leu
625                 630                 635                 640

Gln Met Ile Leu Asn Gly Ile Asn Asn Tyr Lys Asn Pro Ala Leu Thr
                    645                 650                 655

Arg Met Leu Thr Phe Ala Phe Tyr Met Pro Lys Lys Ala Thr Glu Leu
                660                 665                 670

Lys His Leu Gln Cys Leu Glu Ala Glu Leu Lys Pro Leu Glu Glu Val
            675                 680                 685

Leu Asn Leu Ala Gln Ser Lys Asn Phe His Leu Arg Pro Arg Asp Leu
        690                 695                 700

Ile Ser Asn Ile Asn Val Ile Val Leu Glu Leu Lys Gly Ser Glu Thr
705                 710                 715                 720

Thr Phe Met Cys Glu Tyr Ala Asp Glu Thr Ala Thr Ile Val Glu Phe
                725                 730                 735

Leu Asn Arg Trp Ile Thr Phe Cys Gln Ser Ile Ile Ser Thr Leu Thr
            740                 745                 750

<210> SEQ ID NO 11
<211> LENGTH: 752
<212> TYPE: PRT
<213> ORGANISM: Artificial Sequence
<220> FEATURE:
<223> OTHER INFORMATION: IL2 Variant

<400> SEQUENCE: 11

Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
                20                  25                  30

His Arg Phe Lys Asp Leu Gly Glu Glu Asn Phe Lys Ala Leu Val Leu
            35                  40                  45

Ile Ala Phe Ala Gln Tyr Leu Gln Gln Cys Pro Phe Glu Asp His Val
        50                  55                  60

Lys Leu Val Asn Glu Val Thr Glu Phe Ala Lys Thr Cys Val Ala Asp
65                  70                  75                  80

Glu Ser Ala Glu Asn Cys Asp Lys Ser Leu His Thr Leu Phe Gly Asp
                85                  90                  95

Lys Leu Cys Thr Val Ala Thr Leu Arg Glu Thr Tyr Gly Glu Met Ala
            100                 105                 110

Asp Cys Cys Ala Lys Gln Glu Pro Glu Arg Asn Glu Cys Phe Leu Gln
        115                 120                 125

His Lys Asp Asp Asn Pro Asn Leu Pro Arg Leu Val Arg Pro Glu Val
130                 135                 140

Asp Val Met Cys Thr Ala Phe His Asp Asn Glu Glu Thr Phe Leu Lys
145                 150                 155                 160

Lys Tyr Leu Tyr Glu Ile Ala Arg Arg His Pro Tyr Phe Tyr Ala Pro
                165                 170                 175

Glu Leu Leu Phe Phe Ala Lys Arg Tyr Lys Ala Ala Phe Thr Glu Cys
            180                 185                 190

Cys Gln Ala Ala Asp Lys Ala Ala Cys Leu Leu Pro Lys Leu Asp Glu
        195                 200                 205

-continued

Leu Arg Asp Glu Gly Lys Ala Ser Ser Ala Lys Gln Arg Leu Lys Cys
210                 215                 220

Ala Ser Leu Gln Lys Phe Gly Glu Arg Ala Phe Lys Ala Trp Ala Val
225                 230                 235                 240

Ala Arg Leu Ser Gln Arg Phe Pro Lys Ala Glu Phe Ala Glu Val Ser
                245                 250                 255

Lys Leu Val Thr Asp Leu Thr Lys Val His Thr Glu Cys Cys His Gly
                260                 265                 270

Asp Leu Leu Glu Cys Ala Asp Asp Arg Ala Asp Leu Ala Lys Tyr Ile
            275                 280                 285

Cys Glu Asn Gln Asp Ser Ile Ser Ser Lys Leu Lys Glu Cys Cys Glu
290                 295                 300

Lys Pro Leu Leu Glu Lys Ser His Cys Ile Ala Glu Val Glu Asn Asp
305                 310                 315                 320

Glu Met Pro Ala Asp Leu Pro Ser Leu Ala Ala Asp Phe Val Glu Ser
                325                 330                 335

Lys Asp Val Cys Lys Asn Tyr Ala Glu Ala Lys Asp Val Phe Leu Gly
                340                 345                 350

Met Phe Leu Tyr Glu Tyr Ala Arg Arg His Pro Asp Tyr Ser Val Val
            355                 360                 365

Leu Leu Leu Arg Leu Ala Lys Thr Tyr Glu Thr Thr Leu Glu Lys Cys
370                 375                 380

Cys Ala Ala Ala Asp Pro His Glu Cys Tyr Ala Lys Val Phe Asp Glu
385                 390                 395                 400

Phe Lys Pro Leu Val Glu Glu Pro Gln Asn Leu Ile Lys Gln Asn Cys
                405                 410                 415

Glu Leu Phe Glu Gln Leu Gly Glu Tyr Lys Phe Gln Asn Ala Leu Leu
                420                 425                 430

Val Arg Tyr Thr Lys Lys Val Pro Gln Val Ser Thr Pro Thr Leu Val
            435                 440                 445

Glu Val Ser Arg Asn Leu Gly Lys Val Gly Ser Lys Cys Cys Lys His
450                 455                 460

Pro Glu Ala Lys Arg Met Pro Cys Ala Glu Asp Tyr Leu Ser Val Val
465                 470                 475                 480

Leu Asn Gln Leu Cys Val Leu His Glu Lys Thr Pro Val Ser Asp Arg
                485                 490                 495

Val Thr Lys Cys Cys Thr Glu Ser Leu Val Asn Arg Arg Pro Cys Phe
                500                 505                 510

Ser Ala Leu Glu Val Asp Glu Thr Tyr Val Pro Lys Glu Phe Asn Ala
            515                 520                 525

Glu Thr Phe Thr Phe His Ala Asp Ile Cys Thr Leu Ser Glu Lys Glu
530                 535                 540

Arg Gln Ile Lys Lys Gln Thr Ala Leu Val Glu Leu Val Lys His Lys
545                 550                 555                 560

Pro Lys Ala Thr Lys Glu Gln Leu Lys Ala Val Met Asp Asp Phe Ala
                565                 570                 575

Ala Phe Val Glu Lys Cys Cys Lys Ala Asp Asp Lys Glu Thr Cys Phe
                580                 585                 590

Ala Glu Glu Gly Lys Lys Leu Val Ala Ala Ser Gln Ala Ala Leu Gly
            595                 600                 605

Leu Gly Gly Ser Gly Gly Gly Ser Gly Gly Ala Pro Thr Ser Ser
610                 615                 620

Ser Thr Lys Lys Thr Gln Leu Gln Leu Glu His Leu Leu Leu Asp Leu

```
                625                 630                 635                 640
        Gln Met Ile Leu Asn Gly Ile Asn Asn Tyr Lys Asn Pro Glu Leu Thr
                                645                 650                 655

Arg Met Leu Thr Phe Glu Phe Tyr Met Pro Lys Lys Ala Thr Glu Leu
                        660                 665                 670

Lys His Leu Gln Cys Leu Glu Lys Glu Leu Lys Pro Leu Glu Glu Val
                        675                 680                 685

Leu Asn Leu Ala Gln Ser Lys Asn Phe His Leu Arg Pro Arg Asp Leu
                        690                 695                 700

Ile Ser Asn Ile Asn Val Ile Val Leu Glu Leu Lys Gly Ser Glu Thr
        705                 710                 715                 720

Thr Phe Met Cys Glu Tyr Ala Asp Glu Thr Ala Thr Ile Val Glu Phe
                        725                 730                 735

Leu Asn Arg Trp Ile Thr Phe Cys Gln Ser Ile Ile Ser Thr Leu Thr
                        740                 745                 750

<210> SEQ ID NO 12
<211> LENGTH: 752
<212> TYPE: PRT
<213> ORGANISM: Artificial Sequence
<220> FEATURE:
<223> OTHER INFORMATION: IL2 Variant

<400> SEQUENCE: 12

Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
                20                  25                  30

His Arg Phe Lys Asp Leu Gly Glu Glu Asn Phe Lys Ala Leu Val Leu
            35                  40                  45

Ile Ala Phe Ala Gln Tyr Leu Gln Gln Cys Pro Phe Glu Asp His Val
        50                  55                  60

Lys Leu Val Asn Glu Val Thr Glu Phe Ala Lys Thr Cys Val Ala Asp
65                  70                  75                  80

Glu Ser Ala Glu Asn Cys Asp Lys Ser Leu His Thr Leu Phe Gly Asp
                85                  90                  95

Lys Leu Cys Thr Val Ala Thr Leu Arg Glu Thr Tyr Gly Glu Met Ala
            100                 105                 110

Asp Cys Cys Ala Lys Gln Glu Pro Glu Arg Asn Glu Cys Phe Leu Gln
        115                 120                 125

His Lys Asp Asp Asn Pro Asn Leu Pro Arg Leu Val Arg Pro Glu Val
130                 135                 140

Asp Val Met Cys Thr Ala Phe His Asp Asn Glu Glu Thr Phe Leu Lys
145                 150                 155                 160

Lys Tyr Leu Tyr Glu Ile Ala Arg Arg His Pro Tyr Phe Tyr Ala Pro
                165                 170                 175

Glu Leu Leu Phe Phe Ala Lys Arg Tyr Lys Ala Ala Phe Thr Glu Cys
            180                 185                 190

Cys Gln Ala Ala Asp Lys Ala Ala Cys Leu Leu Pro Lys Leu Asp Glu
        195                 200                 205

Leu Arg Asp Glu Gly Lys Ala Ser Ser Ala Lys Gln Arg Leu Lys Cys
        210                 215                 220

Ala Ser Leu Gln Lys Phe Gly Glu Arg Ala Phe Lys Ala Trp Ala Val
225                 230                 235                 240

Ala Arg Leu Ser Gln Arg Phe Pro Lys Ala Glu Phe Ala Glu Val Ser
```

-continued

```
                245                 250                 255
Lys Leu Val Thr Asp Leu Thr Lys Val His Thr Glu Cys Cys His Gly
            260                 265                 270
Asp Leu Leu Glu Cys Ala Asp Asp Arg Ala Asp Leu Ala Lys Tyr Ile
            275                 280                 285
Cys Glu Asn Gln Asp Ser Ile Ser Ser Lys Leu Lys Glu Cys Cys Glu
            290                 295                 300
Lys Pro Leu Leu Glu Lys Ser His Cys Ile Ala Glu Val Glu Asn Asp
305                 310                 315                 320
Glu Met Pro Ala Asp Leu Pro Ser Leu Ala Ala Asp Phe Val Glu Ser
            325                 330                 335
Lys Asp Val Cys Lys Asn Tyr Ala Glu Ala Lys Asp Val Phe Leu Gly
            340                 345                 350
Met Phe Leu Tyr Glu Tyr Ala Arg Arg His Pro Asp Tyr Ser Val Val
            355                 360                 365
Leu Leu Leu Arg Leu Ala Lys Thr Tyr Glu Thr Thr Leu Glu Lys Cys
            370                 375                 380
Cys Ala Ala Ala Asp Pro His Glu Cys Tyr Ala Lys Val Phe Asp Glu
385                 390                 395                 400
Phe Lys Pro Leu Val Glu Glu Pro Gln Asn Leu Ile Lys Gln Asn Cys
            405                 410                 415
Glu Leu Phe Glu Gln Leu Gly Glu Tyr Lys Phe Gln Asn Ala Leu Leu
            420                 425                 430
Val Arg Tyr Thr Lys Lys Val Pro Gln Val Ser Thr Pro Thr Leu Val
            435                 440                 445
Glu Val Ser Arg Asn Leu Gly Lys Val Gly Ser Lys Cys Cys Lys His
            450                 455                 460
Pro Glu Ala Lys Arg Met Pro Cys Ala Glu Asp Tyr Leu Ser Val Val
465                 470                 475                 480
Leu Asn Gln Leu Cys Val Leu His Glu Lys Thr Pro Val Ser Asp Arg
            485                 490                 495
Val Thr Lys Cys Cys Thr Glu Ser Leu Val Asn Arg Arg Pro Cys Phe
            500                 505                 510
Ser Ala Leu Glu Val Asp Glu Thr Tyr Val Pro Lys Glu Phe Asn Ala
            515                 520                 525
Glu Thr Phe Thr Phe His Ala Asp Ile Cys Thr Leu Ser Glu Lys Glu
            530                 535                 540
Arg Gln Ile Lys Lys Gln Thr Ala Leu Val Glu Leu Val Lys His Lys
545                 550                 555                 560
Pro Lys Ala Thr Lys Glu Gln Leu Lys Ala Val Met Asp Asp Phe Ala
            565                 570                 575
Ala Phe Val Glu Lys Cys Cys Lys Ala Asp Asp Lys Glu Thr Cys Phe
            580                 585                 590
Ala Glu Glu Gly Lys Lys Leu Val Ala Ala Ser Gln Ala Ala Leu Gly
            595                 600                 605
Leu Gly Gly Ser Gly Gly Gly Ser Gly Gly Ala Pro Thr Ser Ser
            610                 615                 620
Ser Thr Lys Lys Thr Gln Leu Gln Leu Glu His Leu Leu Leu Asp Leu
625                 630                 635                 640
Gln Met Ile Leu Asn Gly Ile Asn Asn Tyr Lys Asn Pro Lys Leu Thr
            645                 650                 655
Arg Met Leu Thr Phe Glu Phe Tyr Met Pro Lys Lys Ala Thr Glu Leu
            660                 665                 670
```

-continued

Lys His Leu Gln Cys Leu Glu Lys Glu Leu Pro Leu Glu Glu Val
            675                 680                 685

Leu Asn Leu Ala Gln Ser Lys Asn Phe His Leu Arg Pro Arg Asp Leu
        690                 695                 700

Ile Ser Asn Ile Asn Val Ile Val Leu Glu Leu Lys Gly Ser Glu Thr
705                 710                 715                 720

Thr Phe Met Cys Glu Tyr Ala Asp Glu Thr Ala Thr Ile Val Glu Phe
                725                 730                 735

Leu Asn Arg Trp Ile Thr Phe Cys Gln Ser Ile Ile Ser Thr Leu Thr
                740                 745                 750

<210> SEQ ID NO 13
<211> LENGTH: 752
<212> TYPE: PRT
<213> ORGANISM: Artificial Sequence
<220> FEATURE:
<223> OTHER INFORMATION: IL2 Variant

<400> SEQUENCE: 13

Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
                20                  25                  30

His Arg Phe Lys Asp Leu Gly Glu Glu Asn Phe Lys Ala Leu Val Leu
            35                  40                  45

Ile Ala Phe Ala Gln Tyr Leu Gln Gln Cys Pro Phe Glu Asp His Val
        50                  55                  60

Lys Leu Val Asn Glu Val Thr Glu Phe Ala Lys Thr Cys Val Ala Asp
65                  70                  75                  80

Glu Ser Ala Glu Asn Cys Asp Lys Ser Leu His Thr Leu Phe Gly Asp
                85                  90                  95

Lys Leu Cys Thr Val Ala Thr Leu Arg Glu Thr Tyr Gly Glu Met Ala
            100                 105                 110

Asp Cys Cys Ala Lys Gln Glu Pro Glu Arg Asn Glu Cys Phe Leu Gln
        115                 120                 125

His Lys Asp Asp Asn Pro Asn Leu Pro Arg Leu Val Arg Pro Glu Val
    130                 135                 140

Asp Val Met Cys Thr Ala Phe His Asp Asn Glu Glu Thr Phe Leu Lys
145                 150                 155                 160

Lys Tyr Leu Tyr Glu Ile Ala Arg Arg His Pro Tyr Phe Tyr Ala Pro
                165                 170                 175

Glu Leu Leu Phe Phe Ala Lys Arg Tyr Lys Ala Ala Phe Thr Glu Cys
            180                 185                 190

Cys Gln Ala Ala Asp Lys Ala Ala Cys Leu Leu Pro Lys Leu Asp Glu
        195                 200                 205

Leu Arg Asp Glu Gly Lys Ala Ser Ser Ala Lys Gln Arg Leu Lys Cys
    210                 215                 220

Ala Ser Leu Gln Lys Phe Gly Glu Arg Ala Phe Lys Ala Trp Ala Val
225                 230                 235                 240

Ala Arg Leu Ser Gln Arg Phe Pro Lys Ala Glu Phe Ala Glu Val Ser
                245                 250                 255

Lys Leu Val Thr Asp Leu Thr Lys Val His Thr Glu Cys Cys His Gly
            260                 265                 270

Asp Leu Leu Glu Cys Ala Asp Asp Arg Ala Asp Leu Ala Lys Tyr Ile
        275                 280                 285

```
Cys Glu Asn Gln Asp Ser Ile Ser Ser Lys Leu Lys Glu Cys Cys Glu
    290                 295                 300
Lys Pro Leu Leu Glu Lys Ser His Cys Ile Ala Glu Val Glu Asn Asp
305                 310                 315                 320
Glu Met Pro Ala Asp Leu Pro Ser Leu Ala Ala Asp Phe Val Glu Ser
                325                 330                 335
Lys Asp Val Cys Lys Asn Tyr Ala Glu Ala Lys Asp Val Phe Leu Gly
                340                 345                 350
Met Phe Leu Tyr Glu Tyr Ala Arg Arg His Pro Asp Tyr Ser Val Val
            355                 360                 365
Leu Leu Leu Arg Leu Ala Lys Thr Tyr Glu Thr Thr Leu Glu Lys Cys
370                 375                 380
Cys Ala Ala Ala Asp Pro His Glu Cys Tyr Ala Lys Val Phe Asp Glu
385                 390                 395                 400
Phe Lys Pro Leu Val Glu Glu Pro Gln Asn Leu Ile Lys Gln Asn Cys
                405                 410                 415
Glu Leu Phe Glu Gln Leu Gly Glu Tyr Lys Phe Gln Asn Ala Leu Leu
            420                 425                 430
Val Arg Tyr Thr Lys Lys Val Pro Gln Val Ser Thr Pro Thr Leu Val
        435                 440                 445
Glu Val Ser Arg Asn Leu Gly Lys Val Gly Ser Lys Cys Cys Lys His
450                 455                 460
Pro Glu Ala Lys Arg Met Pro Cys Ala Glu Asp Tyr Leu Ser Val Val
465                 470                 475                 480
Leu Asn Gln Leu Cys Val Leu His Glu Lys Thr Pro Val Ser Asp Arg
                485                 490                 495
Val Thr Lys Cys Cys Thr Glu Ser Leu Val Asn Arg Arg Pro Cys Phe
            500                 505                 510
Ser Ala Leu Glu Val Asp Glu Thr Tyr Val Pro Lys Glu Phe Asn Ala
        515                 520                 525
Glu Thr Phe Thr Phe His Ala Asp Ile Cys Thr Leu Ser Glu Lys Glu
530                 535                 540
Arg Gln Ile Lys Lys Gln Thr Ala Leu Val Glu Leu Val Lys His Lys
545                 550                 555                 560
Pro Lys Ala Thr Lys Glu Gln Leu Lys Ala Val Met Asp Asp Phe Ala
                565                 570                 575
Ala Phe Val Glu Lys Cys Cys Lys Ala Asp Asp Lys Glu Thr Cys Phe
            580                 585                 590
Ala Glu Glu Gly Lys Lys Leu Val Ala Ala Ser Gln Ala Ala Leu Gly
        595                 600                 605
Leu Gly Gly Ser Gly Gly Gly Ser Gly Ala Pro Thr Ser Ser
610                 615                 620
Ser Thr Lys Lys Thr Gln Leu Gln Leu Glu His Leu Leu Leu Asp Leu
625                 630                 635                 640
Gln Met Ile Leu Asn Gly Ile Asn Asn Tyr Lys Asn Pro Lys Leu Thr
                645                 650                 655
Arg Met Leu Thr Phe Lys Phe Tyr Met Pro Lys Lys Ala Thr Glu Leu
            660                 665                 670
Lys His Leu Gln Cys Leu Glu Lys Glu Leu Lys Pro Leu Glu Glu Val
        675                 680                 685
Leu Asn Leu Ala Gln Ser Lys Asn Phe His Leu Arg Pro Arg Asp Leu
690                 695                 700
```

```
Ile Ser Asn Ile Asn Val Ile Val Leu Glu Leu Lys Gly Ser Glu Thr
705                 710                 715                 720

Thr Phe Met Cys Glu Tyr Ala Asp Glu Thr Ala Thr Ile Val Glu Phe
            725                 730                 735

Leu Asn Arg Trp Ile Thr Phe Cys Gln Ser Ile Ile Ser Thr Leu Thr
            740                 745                 750

<210> SEQ ID NO 14
<211> LENGTH: 752
<212> TYPE: PRT
<213> ORGANISM: Artificial Sequence
<220> FEATURE:
<223> OTHER INFORMATION: IL2 Variant

<400> SEQUENCE: 14

Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
                20                  25                  30

His Arg Phe Lys Asp Leu Gly Glu Glu Asn Phe Lys Ala Leu Val Leu
            35                  40                  45

Ile Ala Phe Ala Gln Tyr Leu Gln Gln Cys Pro Phe Glu Asp His Val
50                  55                  60

Lys Leu Val Asn Glu Val Thr Glu Phe Ala Lys Thr Cys Val Ala Asp
65                  70                  75                  80

Glu Ser Ala Glu Asn Cys Asp Lys Ser Leu His Thr Leu Phe Gly Asp
                85                  90                  95

Lys Leu Cys Thr Val Ala Thr Leu Arg Glu Thr Tyr Gly Glu Met Ala
            100                 105                 110

Asp Cys Cys Ala Lys Gln Glu Pro Glu Arg Asn Glu Cys Phe Leu Gln
        115                 120                 125

His Lys Asp Asp Asn Pro Asn Leu Pro Arg Leu Val Arg Pro Glu Val
    130                 135                 140

Asp Val Met Cys Thr Ala Phe His Asp Asn Glu Glu Thr Phe Leu Lys
145                 150                 155                 160

Lys Tyr Leu Tyr Glu Ile Ala Arg Arg His Pro Tyr Phe Tyr Ala Pro
                165                 170                 175

Glu Leu Leu Phe Phe Ala Lys Arg Tyr Lys Ala Ala Phe Thr Glu Cys
            180                 185                 190

Cys Gln Ala Ala Asp Lys Ala Ala Cys Leu Leu Pro Lys Leu Asp Glu
        195                 200                 205

Leu Arg Asp Glu Gly Lys Ala Ser Ser Ala Lys Gln Arg Leu Lys Cys
    210                 215                 220

Ala Ser Leu Gln Lys Phe Gly Glu Arg Ala Phe Lys Ala Trp Ala Val
225                 230                 235                 240

Ala Arg Leu Ser Gln Arg Phe Pro Lys Ala Glu Phe Ala Glu Val Ser
                245                 250                 255

Lys Leu Val Thr Asp Leu Thr Lys Val His Thr Glu Cys Cys His Gly
            260                 265                 270

Asp Leu Leu Glu Cys Ala Asp Asp Arg Ala Asp Leu Ala Lys Tyr Ile
        275                 280                 285

Cys Glu Asn Gln Asp Ser Ile Ser Ser Lys Leu Lys Glu Cys Cys Glu
    290                 295                 300

Lys Pro Leu Leu Glu Lys Ser His Cys Ile Ala Glu Val Glu Asn Asp
305                 310                 315                 320
```

```
Glu Met Pro Ala Asp Leu Pro Ser Leu Ala Asp Phe Val Glu Ser
            325                 330                 335

Lys Asp Val Cys Lys Asn Tyr Ala Glu Ala Lys Asp Val Phe Leu Gly
        340                 345                 350

Met Phe Leu Tyr Glu Tyr Ala Arg Arg His Pro Asp Tyr Ser Val Val
            355                 360                 365

Leu Leu Leu Arg Leu Ala Lys Thr Tyr Glu Thr Thr Leu Glu Lys Cys
    370                 375                 380

Cys Ala Ala Ala Asp Pro His Glu Cys Tyr Ala Lys Val Phe Asp Glu
385                 390                 395                 400

Phe Lys Pro Leu Val Glu Glu Pro Gln Asn Leu Ile Lys Gln Asn Cys
                405                 410                 415

Glu Leu Phe Glu Gln Leu Gly Glu Tyr Lys Phe Gln Asn Ala Leu Leu
            420                 425                 430

Val Arg Tyr Thr Lys Lys Val Pro Gln Val Ser Thr Pro Thr Leu Val
                435                 440                 445

Glu Val Ser Arg Asn Leu Gly Lys Val Gly Ser Lys Cys Cys Lys His
    450                 455                 460

Pro Glu Ala Lys Arg Met Pro Cys Ala Glu Asp Tyr Leu Ser Val Val
465                 470                 475                 480

Leu Asn Gln Leu Cys Val Leu His Glu Lys Thr Pro Val Ser Asp Arg
                485                 490                 495

Val Thr Lys Cys Cys Thr Glu Ser Leu Val Asn Arg Arg Pro Cys Phe
            500                 505                 510

Ser Ala Leu Glu Val Asp Glu Thr Tyr Val Pro Lys Glu Phe Asn Ala
    515                 520                 525

Glu Thr Phe Thr Phe His Ala Asp Ile Cys Thr Leu Ser Glu Lys Glu
            530                 535                 540

Arg Gln Ile Lys Lys Gln Thr Ala Leu Val Glu Leu Val Lys His Lys
545                 550                 555                 560

Pro Lys Ala Thr Lys Glu Gln Leu Lys Ala Val Met Asp Asp Phe Ala
                565                 570                 575

Ala Phe Val Glu Lys Cys Cys Lys Ala Asp Asp Lys Glu Thr Cys Phe
            580                 585                 590

Ala Glu Glu Gly Lys Lys Leu Val Ala Ala Ser Gln Ala Ala Leu Gly
    595                 600                 605

Leu Gly Gly Ser Gly Gly Gly Ser Gly Gly Ala Pro Thr Ser Ser
    610                 615                 620

Ser Thr Lys Lys Thr Gln Leu Gln Leu Glu His Leu Leu Leu Asp Leu
625                 630                 635                 640

Gln Met Ile Leu Asn Gly Ile Asn Asn Tyr Lys Asn Pro Lys Leu Thr
                645                 650                 655

Arg Met Leu Thr Phe Lys Phe Tyr Met Pro Lys Lys Ala Thr Glu Leu
            660                 665                 670

Lys His Leu Gln Cys Leu Glu Glu Lys Leu Lys Pro Leu Glu Glu Val
    675                 680                 685

Leu Asn Leu Ala Gln Ser Lys Asn Phe His Leu Arg Pro Arg Asp Leu
    690                 695                 700

Ile Ser Asn Ile Asn Val Ile Val Leu Glu Leu Lys Gly Ser Glu Thr
705                 710                 715                 720

Thr Phe Met Cys Glu Tyr Ala Asp Glu Thr Ala Thr Ile Val Glu Phe
                725                 730                 735

Leu Asn Arg Trp Ile Thr Phe Cys Gln Ser Ile Ile Ser Thr Leu Thr
```

```
                    740                 745                 750

<210> SEQ ID NO 15
<211> LENGTH: 752
<212> TYPE: PRT
<213> ORGANISM: Artificial Sequence
<220> FEATURE:
<223> OTHER INFORMATION: IL2 Variant

<400> SEQUENCE: 15

Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
            20                  25                  30

His Arg Phe Lys Asp Leu Gly Glu Glu Asn Phe Lys Ala Leu Val Leu
        35                  40                  45

Ile Ala Phe Ala Gln Tyr Leu Gln Gln Cys Pro Phe Glu Asp His Val
    50                  55                  60

Lys Leu Val Asn Glu Val Thr Glu Phe Ala Lys Thr Cys Val Ala Asp
65                  70                  75                  80

Glu Ser Ala Glu Asn Cys Asp Lys Ser Leu His Thr Leu Phe Gly Asp
                85                  90                  95

Lys Leu Cys Thr Val Ala Thr Leu Arg Glu Thr Tyr Gly Glu Met Ala
            100                 105                 110

Asp Cys Cys Ala Lys Gln Glu Pro Glu Arg Asn Glu Cys Phe Leu Gln
        115                 120                 125

His Lys Asp Asp Asn Pro Asn Leu Pro Arg Leu Val Arg Pro Glu Val
    130                 135                 140

Asp Val Met Cys Thr Ala Phe His Asp Asn Glu Glu Thr Phe Leu Lys
145                 150                 155                 160

Lys Tyr Leu Tyr Glu Ile Ala Arg Arg His Pro Tyr Phe Tyr Ala Pro
                165                 170                 175

Glu Leu Leu Phe Phe Ala Lys Arg Tyr Lys Ala Ala Phe Thr Glu Cys
            180                 185                 190

Cys Gln Ala Ala Asp Lys Ala Ala Cys Leu Leu Pro Lys Leu Asp Glu
        195                 200                 205

Leu Arg Asp Glu Gly Lys Ala Ser Ser Ala Lys Gln Arg Leu Lys Cys
    210                 215                 220

Ala Ser Leu Gln Lys Phe Gly Glu Arg Ala Phe Lys Ala Trp Ala Val
225                 230                 235                 240

Ala Arg Leu Ser Gln Arg Phe Pro Lys Ala Glu Phe Ala Glu Val Ser
                245                 250                 255

Lys Leu Val Thr Asp Leu Thr Lys Val His Thr Glu Cys Cys His Gly
            260                 265                 270

Asp Leu Leu Glu Cys Ala Asp Asp Arg Ala Asp Leu Ala Lys Tyr Ile
        275                 280                 285

Cys Glu Asn Gln Asp Ser Ile Ser Ser Lys Leu Lys Glu Cys Cys Glu
    290                 295                 300

Lys Pro Leu Leu Glu Lys Ser His Cys Ile Ala Glu Val Glu Asn Asp
305                 310                 315                 320

Glu Met Pro Ala Asp Leu Pro Ser Leu Ala Ala Asp Phe Val Glu Ser
                325                 330                 335

Lys Asp Val Cys Lys Asn Tyr Ala Glu Ala Lys Asp Val Phe Leu Gly
            340                 345                 350

Met Phe Leu Tyr Glu Tyr Ala Arg Arg His Pro Asp Tyr Ser Val Val
```

```
            355                 360                 365
Leu Leu Leu Arg Leu Ala Lys Thr Tyr Glu Thr Thr Leu Glu Lys Cys
    370                 375                 380

Cys Ala Ala Asp Pro His Glu Cys Tyr Ala Lys Val Phe Asp Glu
385                 390                 395                 400

Phe Lys Pro Leu Val Glu Glu Pro Gln Asn Leu Ile Lys Gln Asn Cys
                405                 410                 415

Glu Leu Phe Glu Gln Leu Gly Val Tyr Lys Phe Gln Asn Ala Leu Leu
            420                 425                 430

Val Arg Tyr Thr Lys Lys Val Pro Gln Val Ser Thr Pro Thr Leu Val
        435                 440                 445

Glu Val Ser Arg Asn Leu Gly Lys Val Gly Ser Lys Cys Cys Lys His
    450                 455                 460

Pro Glu Ala Lys Arg Met Pro Cys Ala Glu Asp Tyr Leu Ser Val Val
465                 470                 475                 480

Leu Asn Gln Leu Cys Val Leu His Glu Lys Thr Pro Val Ser Asp Arg
                485                 490                 495

Val Thr Lys Cys Cys Thr Glu Ser Leu Val Asn Arg Arg Pro Cys Phe
            500                 505                 510

Ser Ala Leu Glu Val Asp Glu Thr Tyr Val Pro Lys Glu Phe Asn Ala
        515                 520                 525

Glu Thr Phe Thr Phe His Ala Asp Ile Cys Thr Leu Ser Glu Lys Glu
    530                 535                 540

Arg Gln Ile Lys Lys Gln Thr Ala Leu Val Glu Leu Val Lys His Lys
545                 550                 555                 560

Pro Lys Ala Thr Lys Glu Gln Leu Lys Ala Val Met Asp Asp Phe Ala
                565                 570                 575

Ala Phe Val Glu Lys Cys Cys Lys Ala Asp Asp Lys Glu Thr Cys Phe
            580                 585                 590

Ala Glu Glu Gly Lys Lys Leu Val Ala Ala Ser Gln Ala Ala Leu Gly
        595                 600                 605

Leu Gly Gly Ser Gly Gly Gly Ser Gly Gly Ala Pro Thr Ser Ser
    610                 615                 620

Ser Thr Lys Lys Thr Gln Leu Gln Leu Glu His Leu Leu Leu Asp Leu
625                 630                 635                 640

Gln Met Ile Leu Asn Gly Ile Asn Asn Tyr Lys Asn Pro Lys Leu Thr
                645                 650                 655

Arg Met Leu Thr Phe Glu Phe Tyr Met Pro Lys Lys Ala Thr Glu Leu
            660                 665                 670

Lys His Leu Gln Cys Leu Glu Lys Glu Leu Lys Pro Leu Glu Glu Val
        675                 680                 685

Leu Asn Leu Ala Gln Ser Lys Asn Phe His Phe Asp Pro Arg Asp Val
    690                 695                 700

Val Ser Asn Ile Asn Val Phe Val Leu Glu Leu Lys Gly Ser Glu Thr
705                 710                 715                 720

Thr Phe Met Cys Glu Tyr Ala Asp Glu Thr Ala Thr Ile Val Glu Phe
                725                 730                 735

Leu Asn Arg Trp Ile Thr Phe Cys Gln Ser Ile Ile Ser Thr Leu Thr
            740                 745                 750
```

<210> SEQ ID NO 16
<211> LENGTH: 752
<212> TYPE: PRT
<213> ORGANISM: Artificial Sequence
<220> FEATURE:
<223> OTHER INFORMATION: IL2 Variant

<400> SEQUENCE: 16

Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
            20                  25                  30

His Arg Phe Lys Asp Leu Gly Glu Glu Asn Phe Lys Ala Leu Val Leu
        35                  40                  45

Ile Ala Phe Ala Gln Tyr Leu Gln Gln Cys Pro Phe Glu Asp His Val
    50                  55                  60

Lys Leu Val Asn Glu Val Thr Glu Phe Ala Lys Thr Cys Val Ala Asp
65                  70                  75                  80

Glu Ser Ala Glu Asn Cys Asp Lys Ser Leu His Thr Leu Phe Gly Asp
                85                  90                  95

Lys Leu Cys Thr Val Ala Thr Leu Arg Glu Thr Tyr Gly Glu Met Ala
            100                 105                 110

Asp Cys Cys Ala Lys Gln Glu Pro Glu Arg Asn Glu Cys Phe Leu Gln
        115                 120                 125

His Lys Asp Asp Asn Pro Asn Leu Pro Arg Leu Val Arg Pro Glu Val
    130                 135                 140

Asp Val Met Cys Thr Ala Phe His Asp Asn Glu Glu Thr Phe Leu Lys
145                 150                 155                 160

Lys Tyr Leu Tyr Glu Ile Ala Arg Arg His Pro Tyr Phe Tyr Ala Pro
                165                 170                 175

Glu Leu Leu Phe Phe Ala Lys Arg Tyr Lys Ala Ala Phe Thr Glu Cys
            180                 185                 190

Cys Gln Ala Ala Asp Lys Ala Ala Cys Leu Leu Pro Lys Leu Asp Glu
        195                 200                 205

Leu Arg Asp Glu Gly Lys Ala Ser Ser Ala Lys Gln Arg Leu Lys Cys
    210                 215                 220

Ala Ser Leu Gln Lys Phe Gly Glu Arg Ala Phe Lys Ala Trp Ala Val
225                 230                 235                 240

Ala Arg Leu Ser Gln Arg Phe Pro Lys Ala Glu Phe Ala Glu Val Ser
                245                 250                 255

Lys Leu Val Thr Asp Leu Thr Lys Val His Thr Glu Cys Cys His Gly
            260                 265                 270

Asp Leu Leu Glu Cys Ala Asp Asp Arg Ala Asp Leu Ala Lys Tyr Ile
        275                 280                 285

Cys Glu Asn Gln Asp Ser Ile Ser Ser Lys Leu Lys Glu Cys Cys Glu
    290                 295                 300

Lys Pro Leu Leu Glu Lys Ser His Cys Ile Ala Glu Val Glu Asn Asp
305                 310                 315                 320

Glu Met Pro Ala Asp Leu Pro Ser Leu Ala Ala Asp Phe Val Glu Ser
                325                 330                 335

Lys Asp Val Cys Lys Asn Tyr Ala Glu Ala Lys Asp Val Phe Leu Gly
            340                 345                 350

Met Phe Leu Tyr Glu Tyr Ala Arg Arg His Pro Asp Tyr Ser Val Val
        355                 360                 365

Leu Leu Leu Arg Leu Ala Lys Thr Tyr Glu Thr Thr Leu Glu Lys Cys
    370                 375                 380

Cys Ala Ala Ala Asp Pro His Glu Cys Tyr Ala Lys Val Phe Asp Glu
385                 390                 395                 400

-continued

Phe Lys Pro Leu Val Glu Pro Gln Asn Leu Ile Lys Gln Asn Cys
            405                 410                 415

Glu Leu Phe Glu Gln Leu Gly Glu Tyr Lys Phe Gln Asn Ala Leu Leu
        420                 425                 430

Val Arg Tyr Thr Lys Lys Val Pro Gln Val Ser Thr Pro Thr Leu Val
            435                 440                 445

Glu Val Ser Arg Asn Leu Gly Lys Val Gly Ser Lys Cys Cys Lys His
    450                 455                 460

Pro Glu Ala Lys Arg Met Pro Cys Ala Glu Asp Tyr Leu Ser Val Val
465                 470                 475                 480

Leu Asn Gln Leu Cys Val Leu His Glu Lys Thr Pro Val Ser Asp Arg
                485                 490                 495

Val Thr Lys Cys Cys Thr Glu Ser Leu Val Asn Arg Arg Pro Cys Phe
            500                 505                 510

Ser Ala Leu Glu Val Asp Glu Thr Tyr Val Pro Lys Glu Phe Asn Ala
        515                 520                 525

Glu Thr Phe Thr Phe His Ala Asp Ile Cys Thr Leu Ser Glu Lys Glu
    530                 535                 540

Arg Gln Ile Lys Lys Gln Thr Ala Leu Val Glu Leu Val Lys His Lys
545                 550                 555                 560

Pro Lys Ala Thr Lys Glu Gln Leu Lys Ala Val Met Asp Asp Phe Ala
                565                 570                 575

Ala Phe Val Glu Lys Cys Cys Lys Ala Asp Asp Lys Glu Thr Cys Phe
            580                 585                 590

Ala Glu Glu Gly Lys Lys Leu Val Ala Ala Ser Gln Ala Ala Leu Gly
        595                 600                 605

Leu Gly Gly Ser Gly Gly Gly Ser Gly Gly Ala Pro Thr Ser Ser
    610                 615                 620

Ser Thr Lys Lys Thr Gln Leu Gln Leu Glu His Leu Leu Asp Leu
625                 630                 635                 640

Gln Met Ile Leu Asn Gly Ile Asn Asn Tyr Lys Asn Pro Lys Leu Thr
                645                 650                 655

Arg Met Leu Thr Phe Lys Phe Tyr Met Pro Lys Lys Ala Thr Glu Leu
            660                 665                 670

Lys His Leu Gln Cys Leu Glu Glu Lys Leu Lys Pro Leu Glu Glu Val
        675                 680                 685

Leu Asn Leu Ala Gln Ser Lys Asn Phe His Phe Asp Pro Arg Asp Val
    690                 695                 700

Val Ser Asn Ile Asn Val Phe Val Leu Glu Leu Lys Gly Ser Glu Thr
705                 710                 715                 720

Thr Phe Met Cys Glu Tyr Ala Asp Glu Thr Ala Thr Ile Val Glu Phe
                725                 730                 735

Leu Asn Arg Trp Ile Thr Phe Cys Gln Ser Ile Ile Ser Thr Leu Thr
            740                 745                 750

<210> SEQ ID NO 17
<211> LENGTH: 133
<212> TYPE: PRT
<213> ORGANISM: Homo sapiens

<400> SEQUENCE: 17

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys

```
                    20                  25                  30

Asn Pro Lys Leu Thr Arg Met Leu Thr Phe Lys Phe Tyr Met Pro Lys
            35                  40                  45

Lys Ala Thr Glu Leu Lys His Leu Gln Cys Leu Glu Glu Glu Leu Lys
        50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
            130

<210> SEQ ID NO 18
<211> LENGTH: 133
<212> TYPE: PRT
<213> ORGANISM: Artificial Sequence
<220> FEATURE:
<223> OTHER INFORMATION: IL2 Variant

<400> SEQUENCE: 18

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
            35                  40                  45

Lys Ala Thr Glu Leu Lys His Leu Gln Cys Leu Glu Glu Glu Leu Lys
        50                  55                  60

Pro Leu Glu Glu Val Leu Asn Leu Ala Gln Ser Lys Asn Phe His Phe
65                  70                  75                  80

Asp Pro Arg Asp Val Val Ser Asn Ile Asn Val Phe Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
            130

<210> SEQ ID NO 19
<211> LENGTH: 752
<212> TYPE: PRT
<213> ORGANISM: Artificial Sequence
<220> FEATURE:
<223> OTHER INFORMATION: IL2 Variant

<400> SEQUENCE: 19

Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
            20                  25                  30

His Arg Phe Lys Asp Leu Gly Glu Glu Asn Phe Lys Ala Leu Val Leu
            35                  40                  45
```

```
Ile Ala Phe Ala Gln Tyr Leu Gln Gln Cys Pro Phe Glu Asp His Val
 50                  55                  60

Lys Leu Val Asn Glu Val Thr Glu Phe Ala Lys Thr Cys Val Ala Asp
 65                  70                  75                  80

Glu Ser Ala Glu Asn Cys Asp Lys Ser Leu His Thr Leu Phe Gly Asp
                 85                  90                  95

Lys Leu Cys Thr Val Ala Thr Leu Arg Glu Thr Tyr Gly Glu Met Ala
                100                 105                 110

Asp Cys Cys Ala Lys Gln Glu Pro Glu Arg Asn Glu Cys Phe Leu Gln
            115                 120                 125

His Lys Asp Asp Asn Pro Asn Leu Pro Arg Leu Val Arg Pro Glu Val
130                 135                 140

Asp Val Met Cys Thr Ala Phe His Asp Asn Glu Glu Thr Phe Leu Lys
145                 150                 155                 160

Lys Tyr Leu Tyr Glu Ile Ala Arg Arg His Pro Tyr Phe Tyr Ala Pro
                165                 170                 175

Glu Leu Leu Phe Phe Ala Lys Arg Tyr Lys Ala Ala Phe Thr Glu Cys
            180                 185                 190

Cys Gln Ala Ala Asp Lys Ala Ala Cys Leu Leu Pro Lys Leu Asp Glu
        195                 200                 205

Leu Arg Asp Glu Gly Lys Ala Ser Ser Ala Lys Gln Arg Leu Lys Cys
    210                 215                 220

Ala Ser Leu Gln Lys Phe Gly Glu Arg Ala Phe Lys Ala Trp Ala Val
225                 230                 235                 240

Ala Arg Leu Ser Gln Arg Phe Pro Lys Ala Glu Phe Ala Glu Val Ser
                245                 250                 255

Lys Leu Val Thr Asp Leu Thr Lys Val His Thr Glu Cys Cys His Gly
            260                 265                 270

Asp Leu Leu Glu Cys Ala Asp Asp Arg Ala Asp Leu Ala Lys Tyr Ile
        275                 280                 285

Cys Glu Asn Gln Asp Ser Ile Ser Ser Lys Leu Lys Glu Cys Cys Glu
    290                 295                 300

Lys Pro Leu Leu Glu Lys Ser His Cys Ile Ala Glu Val Glu Asn Asp
305                 310                 315                 320

Glu Met Pro Ala Asp Leu Pro Ser Leu Ala Ala Asp Phe Val Glu Ser
                325                 330                 335

Lys Asp Val Cys Lys Asn Tyr Ala Glu Ala Lys Asp Val Phe Leu Gly
            340                 345                 350

Met Phe Leu Tyr Glu Tyr Ala Arg Arg His Pro Asp Tyr Ser Val Val
        355                 360                 365

Leu Leu Leu Arg Leu Ala Lys Thr Tyr Glu Thr Thr Leu Glu Lys Cys
    370                 375                 380

Cys Ala Ala Ala Asp Pro His Glu Cys Tyr Ala Lys Val Phe Asp Glu
385                 390                 395                 400

Phe Lys Pro Leu Val Glu Glu Pro Gln Asn Leu Ile Lys Gln Asn Cys
                405                 410                 415

Glu Leu Phe Glu Gln Leu Gly Glu Tyr Lys Phe Gln Asn Ala Leu Leu
            420                 425                 430

Val Arg Tyr Thr Lys Lys Val Pro Gln Val Ser Thr Pro Thr Leu Val
        435                 440                 445

Glu Val Ser Arg Asn Leu Gly Lys Val Gly Ser Lys Cys Cys Lys His
    450                 455                 460

Pro Glu Ala Lys Arg Met Pro Cys Ala Glu Asp Tyr Leu Ser Val Val
```

```
                465                 470                 475                 480
Leu Asn Gln Leu Cys Val Leu His Glu Lys Thr Pro Val Ser Asp Arg
                    485                 490                 495

Val Thr Lys Cys Cys Thr Glu Ser Leu Val Asn Arg Arg Pro Cys Phe
                500                 505                 510

Ser Ala Leu Glu Val Asp Glu Thr Tyr Val Pro Lys Glu Phe Asn Ala
                515                 520                 525

Glu Thr Phe Thr Phe His Ala Asp Ile Cys Thr Leu Ser Glu Lys Glu
            530                 535                 540

Arg Gln Ile Lys Lys Gln Thr Ala Leu Val Glu Leu Val Lys His Lys
545                 550                 555                 560

Pro Lys Ala Thr Lys Glu Gln Leu Lys Ala Val Met Asp Asp Phe Ala
                565                 570                 575

Ala Phe Val Glu Lys Cys Cys Lys Ala Asp Asp Lys Glu Thr Cys Phe
                580                 585                 590

Ala Glu Glu Gly Lys Lys Leu Val Ala Ala Ser Gln Ala Ala Leu Gly
            595                 600                 605

Leu Gly Gly Ser Gly Gly Gly Ser Gly Gly Ala Pro Thr Ser Ser
        610                 615                 620

Ser Thr Lys Lys Thr Gln Leu Gln Leu Glu His Leu Leu Leu Asp Leu
625                 630                 635                 640

Gln Met Ile Leu Asn Gly Ile Asn Asn Tyr Lys Asn Pro Lys Leu Thr
                645                 650                 655

Arg Met Leu Thr Phe Lys Phe Tyr Met Pro Lys Lys Ala Thr Glu Leu
                660                 665                 670

Lys His Leu Gln Cys Leu Glu Glu Glu Leu Lys Pro Leu Glu Glu Val
            675                 680                 685

Leu Asn Leu Ala Gln Ser Lys Asn Phe His Leu Arg Pro Arg Asp Leu
        690                 695                 700

Ile Ser Asn Ile Asn Val Ile Val Leu Glu Leu Lys Gly Ser Glu Thr
705                 710                 715                 720

Thr Phe Met Cys Glu Tyr Ala Asp Glu Thr Ala Thr Ile Val Glu Phe
                725                 730                 735

Leu Asn Arg Trp Ile Thr Phe Cys Gln Ser Ile Ile Ser Thr Leu Thr
                740                 745                 750

<210> SEQ ID NO 20
<211> LENGTH: 752
<212> TYPE: PRT
<213> ORGANISM: Artificial Sequence
<220> FEATURE:
<223> OTHER INFORMATION: IL2 Variant

<400> SEQUENCE: 20

Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
                20                  25                  30

His Arg Phe Lys Asp Leu Gly Glu Glu Asn Phe Lys Ala Leu Val Leu
            35                  40                  45

Ile Ala Phe Ala Gln Tyr Leu Gln Gln Cys Pro Phe Glu Asp His Val
        50                  55                  60

Lys Leu Val Asn Glu Val Thr Glu Phe Ala Lys Thr Cys Val Ala Asp
65                  70                  75                  80

Glu Ser Ala Glu Asn Cys Asp Lys Ser Leu His Thr Leu Phe Gly Asp
```

```
                    85                  90                  95
Lys Leu Cys Thr Val Ala Thr Leu Arg Glu Thr Tyr Gly Glu Met Ala
            100                 105                 110

Asp Cys Cys Ala Lys Gln Glu Pro Glu Arg Asn Glu Cys Phe Leu Gln
            115                 120                 125

His Lys Asp Asp Asn Pro Asn Leu Pro Arg Leu Val Arg Pro Glu Val
130                 135                 140

Asp Val Met Cys Thr Ala Phe His Asp Asn Glu Glu Thr Phe Leu Lys
145                 150                 155                 160

Lys Tyr Leu Tyr Glu Ile Ala Arg Arg His Pro Tyr Phe Tyr Ala Pro
                165                 170                 175

Glu Leu Leu Phe Phe Ala Lys Arg Tyr Lys Ala Ala Phe Thr Glu Cys
            180                 185                 190

Cys Gln Ala Ala Asp Lys Ala Ala Cys Leu Leu Pro Lys Leu Asp Glu
            195                 200                 205

Leu Arg Asp Glu Gly Lys Ala Ser Ser Ala Lys Gln Arg Leu Lys Cys
            210                 215                 220

Ala Ser Leu Gln Lys Phe Gly Glu Arg Ala Phe Lys Ala Trp Ala Val
225                 230                 235                 240

Ala Arg Leu Ser Gln Arg Phe Pro Lys Ala Glu Phe Ala Glu Val Ser
                245                 250                 255

Lys Leu Val Thr Asp Leu Thr Lys Val His Thr Glu Cys Cys His Gly
            260                 265                 270

Asp Leu Leu Glu Cys Ala Asp Asp Arg Ala Asp Leu Ala Lys Tyr Ile
            275                 280                 285

Cys Glu Asn Gln Asp Ser Ile Ser Ser Lys Leu Lys Glu Cys Cys Glu
            290                 295                 300

Lys Pro Leu Leu Glu Lys Ser His Cys Ile Ala Glu Val Glu Asn Asp
305                 310                 315                 320

Glu Met Pro Ala Asp Leu Pro Ser Leu Ala Ala Asp Phe Val Glu Ser
                325                 330                 335

Lys Asp Val Cys Lys Asn Tyr Ala Glu Ala Lys Asp Val Phe Leu Gly
            340                 345                 350

Met Phe Leu Tyr Glu Tyr Ala Arg Arg His Pro Asp Tyr Ser Val Val
            355                 360                 365

Leu Leu Leu Arg Leu Ala Lys Thr Tyr Glu Thr Thr Leu Glu Lys Cys
            370                 375                 380

Cys Ala Ala Ala Asp Pro His Glu Cys Tyr Ala Lys Val Phe Asp Glu
385                 390                 395                 400

Phe Lys Pro Leu Val Glu Glu Pro Gln Asn Leu Ile Lys Gln Asn Cys
                405                 410                 415

Glu Leu Phe Glu Gln Leu Gly Glu Tyr Lys Phe Gln Asn Ala Leu Leu
            420                 425                 430

Val Arg Tyr Thr Lys Lys Val Pro Gln Val Ser Thr Pro Thr Leu Val
            435                 440                 445

Glu Val Ser Arg Asn Leu Gly Lys Val Gly Ser Lys Cys Cys Lys His
            450                 455                 460

Pro Glu Ala Lys Arg Met Pro Cys Ala Glu Asp Tyr Leu Ser Val Val
465                 470                 475                 480

Leu Asn Gln Leu Cys Val Leu His Glu Lys Thr Pro Val Ser Asp Arg
                485                 490                 495

Val Thr Lys Cys Cys Thr Glu Ser Leu Val Asn Arg Arg Pro Cys Phe
            500                 505                 510
```

```
Ser Ala Leu Glu Val Asp Glu Thr Tyr Val Pro Lys Glu Phe Asn Ala
        515                 520                 525

Glu Thr Phe Thr Phe His Ala Asp Ile Cys Thr Leu Ser Glu Lys Glu
    530                 535                 540

Arg Gln Ile Lys Lys Gln Thr Ala Leu Val Glu Leu Val Lys His Lys
545                 550                 555                 560

Pro Lys Ala Thr Lys Glu Gln Leu Lys Ala Val Met Asp Asp Phe Ala
                565                 570                 575

Ala Phe Val Glu Lys Cys Cys Lys Ala Asp Asp Lys Glu Thr Cys Phe
                580                 585                 590

Ala Glu Glu Gly Lys Lys Leu Val Ala Ala Ser Gln Ala Ala Leu Gly
        595                 600                 605

Leu Gly Gly Ser Gly Gly Gly Ser Gly Gly Ala Pro Thr Ser Ser
        610                 615                 620

Ser Thr Lys Lys Thr Gln Leu Gln Leu Glu His Leu Leu Asp Leu
625                 630                 635                 640

Gln Met Ile Leu Asn Gly Ile Asn Asn Tyr Lys Asn Pro Lys Leu Thr
                645                 650                 655

Arg Met Leu Thr Phe Lys Phe Tyr Met Pro Lys Ala Thr Glu Leu
                660                 665                 670

Lys His Leu Gln Cys Leu Glu Glu Leu Lys Pro Leu Glu Glu Val
        675                 680                 685

Leu Asn Leu Ala Gln Ser Lys Asn Phe His Phe Asp Pro Arg Asp Val
        690                 695                 700

Val Ser Asn Ile Asn Val Phe Val Leu Glu Leu Lys Gly Ser Glu Thr
705                 710                 715                 720

Thr Phe Met Cys Glu Tyr Ala Asp Glu Thr Ala Thr Ile Val Glu Phe
                725                 730                 735

Leu Asn Arg Trp Ile Thr Phe Cys Gln Ser Ile Ile Ser Thr Leu Thr
                740                 745                 750
```

<210> SEQ ID NO 21
<211> LENGTH: 609
<212> TYPE: PRT
<213> ORGANISM: Homo sapiens

<400> SEQUENCE: 21

```
Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
            20                  25                  30

His Arg Phe Lys Asp Leu Gly Glu Glu Asn Phe Lys Ala Leu Val Leu
        35                  40                  45

Ile Ala Phe Ala Gln Tyr Leu Gln Gln Cys Pro Phe Glu Asp His Val
    50                  55                  60

Lys Leu Val Asn Glu Val Thr Glu Phe Ala Lys Thr Cys Val Ala Asp
65                  70                  75                  80

Glu Ser Ala Glu Asn Cys Asp Lys Ser Leu His Thr Leu Phe Gly Asp
                85                  90                  95

Lys Leu Cys Thr Val Ala Thr Leu Arg Glu Thr Tyr Gly Glu Met Ala
            100                 105                 110

Asp Cys Cys Ala Lys Gln Glu Pro Glu Arg Asn Glu Cys Phe Leu Gln
        115                 120                 125

His Lys Asp Asp Asn Pro Asn Leu Pro Arg Leu Val Arg Pro Glu Val
```

```
             130                 135                 140
Asp Val Met Cys Thr Ala Phe His Asp Asn Glu Glu Thr Phe Leu Lys
145                 150                 155                 160

Lys Tyr Leu Tyr Glu Ile Ala Arg Arg His Pro Tyr Phe Tyr Ala Pro
                    165                 170                 175

Glu Leu Leu Phe Phe Ala Lys Arg Tyr Lys Ala Ala Phe Thr Glu Cys
                180                 185                 190

Cys Gln Ala Ala Asp Lys Ala Ala Cys Leu Leu Pro Lys Leu Asp Glu
            195                 200                 205

Leu Arg Asp Glu Gly Lys Ala Ser Ser Ala Lys Gln Arg Leu Lys Cys
210                 215                 220

Ala Ser Leu Gln Lys Phe Gly Glu Arg Ala Phe Lys Ala Trp Ala Val
225                 230                 235                 240

Ala Arg Leu Ser Gln Arg Phe Pro Lys Ala Glu Phe Ala Glu Val Ser
                    245                 250                 255

Lys Leu Val Thr Asp Leu Thr Lys Val His Thr Glu Cys Cys His Gly
                260                 265                 270

Asp Leu Leu Glu Cys Ala Asp Asp Arg Ala Asp Leu Ala Lys Tyr Ile
            275                 280                 285

Cys Glu Asn Gln Asp Ser Ile Ser Ser Lys Leu Lys Glu Cys Cys Glu
        290                 295                 300

Lys Pro Leu Leu Glu Lys Ser His Cys Ile Ala Glu Val Glu Asn Asp
305                 310                 315                 320

Glu Met Pro Ala Asp Leu Pro Ser Leu Ala Ala Asp Phe Val Glu Ser
                325                 330                 335

Lys Asp Val Cys Lys Asn Tyr Ala Glu Ala Lys Asp Val Phe Leu Gly
                340                 345                 350

Met Phe Leu Tyr Glu Tyr Ala Arg Arg His Pro Asp Tyr Ser Val Val
            355                 360                 365

Leu Leu Leu Arg Leu Ala Lys Thr Tyr Glu Thr Thr Leu Glu Lys Cys
        370                 375                 380

Cys Ala Ala Ala Asp Pro His Glu Cys Tyr Ala Lys Val Phe Asp Glu
385                 390                 395                 400

Phe Lys Pro Leu Val Glu Glu Pro Gln Asn Leu Ile Lys Gln Asn Cys
                405                 410                 415

Glu Leu Phe Glu Gln Leu Gly Glu Tyr Lys Phe Gln Asn Ala Leu Leu
                420                 425                 430

Val Arg Tyr Thr Lys Lys Val Pro Gln Val Ser Thr Pro Thr Leu Val
            435                 440                 445

Glu Val Ser Arg Asn Leu Gly Lys Val Gly Ser Lys Cys Cys Lys His
        450                 455                 460

Pro Glu Ala Lys Arg Met Pro Cys Ala Glu Asp Tyr Leu Ser Val Val
465                 470                 475                 480

Leu Asn Gln Leu Cys Val Leu His Glu Lys Thr Pro Val Ser Asp Arg
                485                 490                 495

Val Thr Lys Cys Cys Thr Glu Ser Leu Val Asn Arg Arg Pro Cys Phe
                500                 505                 510

Ser Ala Leu Glu Val Asp Glu Thr Tyr Val Pro Lys Glu Phe Asn Ala
            515                 520                 525

Glu Thr Phe Thr Phe His Ala Asp Ile Cys Thr Leu Ser Glu Lys Glu
        530                 535                 540

Arg Gln Ile Lys Lys Gln Thr Ala Leu Val Glu Leu Val Lys His Lys
545                 550                 555                 560
```

```
Pro Lys Ala Thr Lys Glu Gln Leu Lys Ala Val Met Asp Asp Phe Ala
            565                 570                 575

Ala Phe Val Glu Lys Cys Cys Lys Ala Asp Asp Lys Glu Thr Cys Phe
            580                 585                 590

Ala Glu Glu Gly Lys Lys Leu Val Ala Ala Ser Gln Ala Ala Leu Gly
        595                 600                 605

Leu
```

IL2 AGONISTS

CROSS-REFERENCE TO RELATED APPLICATIONS

This application is the US national phase under 35 U.S.C. § 371 of International Application No. PCT/EP2019/069541, filed on Jul. 19, 2019, which claims the benefit of International Application No. PCT/EP2018/070068, filed on Jul. 24, 2018, the contents of which are incorporated herein by reference in their entirety.

TECHNICAL FIELD

The invention relates to variants of interleukin-2 (IL2). In particular, the invention relates to a polypeptide comprising a mutein of human IL2 or of a functional variant of human IL2, wherein the human IL2 or functional variant thereof is substituted at at least a position having an acidic or basic amino acid residue in wild type human IL2 that contacts the alpha subunit of the αβγ IL2 receptor complex (IL2Rαβγ). In one embodiment, the substitution reduces the affinity for IL2Rαβγ, preferably to a greater extent than for the βγ IL2 receptor complex (IL2Rβγ). In one embodiment, the polypeptide activates effector T cells over regulatory T cells. The invention also relates to polynucleotides coding for the polypeptides of the invention, host cells comprising the polynucleotides, pharmaceutical compositions comprising the polypeptides, polynucleotides or host cells, therapeutic or prophylactic methods of treatment using the polypeptides, polynucleotides, host cells or pharmaceutical compositions and medical preparations comprising the polypeptides, polynucleotides, host cells or pharmaceutical compositions.

BACKGROUND

The immune system plays an important role in cancer, autoimmunity, allergy as well as in pathogen-associated diseases. T cells and NK cells are important mediators of anti-tumor immune responses. CD8+ T cells and NK cells can directly lyse tumor cells. CD4+ T cells, on the other hand, can mediate the influx of different immune subsets including CD8+ T cells and NK cells into the tumor. CD4+ T cells are able to license dendritic cells (DCs) for the priming of anti-tumor CD8+ T cell responses and can act directly on tumor cells via IFNγ mediated MHC upregulation and growth inhibition. CD8+ as well as CD4+ tumor specific T cell responses can be induced via vaccination or by adoptive transfer of T cells. In the context of an mRNA based vaccine platform, mRNA may be delivered via liposomal formulation (RNA-lipoplexes, RNA-LPX) into antigen-presenting cells located in secondary lymphoid organs without requirement for any additional adjuvant for immune stimulation (Kreiter, S. et al. Nature 520, 692-696 (2015); Kranz, L. M. et al. Nature 534, 396-401 (2016)).

Cytokines play an important role in immunity. For example, interleukin-2 (IL2) is a potent immune stimulator, activating diverse cells of the immune system, including T cells, B cells, monocytes and natural killer (NK) cells. IL2 is known to support the differentiation, proliferation, survival and effector functions of T cells and NK cells (Blattman, J. N. et al. Nat. Med. 9, 540-7 (2003)) and has been used for decades in the treatment of late stage malignant melanoma (Maas, R. A., Dullens, H. F. & Den Otter, W. Cancer Immunol. Immunother. 36, 141-8 (1993)). Hence, immunotherapies such as T cell vaccines or adoptive transfer of (naïve or T cell receptor transgenic or chimeric antigen receptor transgenic) T cells or NK cells can benefit from simultaneous administration of cytokines like IL2. One disadvantage of recombinant IL2, however, is its short plasma half-life (Lotze, M T et al. JAMA 1986, 256, 3117-24; West, W. H. et al. N. Engl. J. Med. 316, 898-905 (1987)). This creates the necessity to frequently inject high amounts of IL2 leading to severe side effects such as vascular leak syndrome (VLS) (Rosenberg, S. A. et al. N. Engl. J. Med. 316, 889-97 (1987)). VLS leads to the accumulation of intravascular fluid in the lungs and liver resulting in pulmonary edema and liver damage. Until recently it was believed that VLS was caused by the release of proinflammatory cytokines from IL2 activated NK cells. However, a recent report points to the direct binding of IL2 to lung endothelial cells, as a purported cause of VLS (Krieg et al, PNAS USA 107(26)11906-11911 (2010)). A second disadvantage of IL2 is its inherent ability to stimulate regulatory T cells (Tregs). Tregs are correlated with reduced survival of cancer patients as they can suppress the function of anti-tumor effector T cells and NK cells (Nishikawa, H. & Sakaguchi. Curr. Opin. Immunol. 27, 1-7 (2014)). IL2 signals via the IL2 receptor which exists as a high- and an intermediate-affinity version. The high-affinity IL2 receptor (IL2Rαβγ) consists of CD25 (IL2Rα), CD122 (IL2Rβ) and CD132 (IL2βγ) and is expressed on Tregs as well as activated CD4+ and CD8+ T cells. Treg activation may exacerbate immune suppression, potentially compromising the intended therapeutic response. The intermediate-affinity receptor (IL2Rβγ) lacks CD25 and is prevalent on naïve and memory T cells as well as NK cells. As a result, IL2 preferentially stimulates CD25 expressing Tregs (Todd, J. A. et al. PLoS Med. 13, e1002139 (2016)) as well as activated CD4+ and CD8+ T cells. Furthermore, high doses of IL2 are needed to activate naïve and memory T cells and NK cells. Attempts to alter IL2 in such a way that it loses preference for CD25 expressing cells, thereby relatively increasing the stimulatory potential of naïve and memory T cells as well as NK cells was shown to improve its anti-tumoral potential (Arenas-Ramirez, N. et al. Sci. Transl. Med. 8, 1-13 (2016)).

There is a need for novel strategies to increase the effectiveness of vaccines, in particular cancer vaccines, and other immunotherapies, in particular cancer immunotherapies, such as adoptive transfer of (naïve or T cell receptor transgenic or chimeric antigen receptor transgenic) T and NK cells.

We have discovered variants of human IL2 that preferentially activate cells which express the intermediate affinity IL2 receptor IL2Rβγ in relation to cells which express the high affinity IL2 receptor IL2Rαβγ.

Disruption of the interactions of IL2 with IL2Rα through appropriate modification of specific binding residues on the binding surface of IL2 was hypothesized to prevent effective binding (and thus activation) to cells expressing IL2Rαβγ. However, on cells expressing IL2Rβγ binding to the cell will still occur. An IL2 variant able to selectively activate the intermediate affinity IL2 receptors on certain T cells such as memory T cells, naïve T cells and effector T cells as well as NK cells in preference to the high affinity IL2 receptors on regulatory T cells is expected to have an improved therapeutic index over wild type IL2 and a reduced toxicity profile. An IL2 variant with an improved therapeutic index would have a significantly expanded range of use in the treatment of disorders requiring immune system stimulation, for example in the treatment of cancer (as a direct and/or adjunct therapy). In particular, administration of IL2 variant RNA is a promising approach to boost the therapeutic efficacy of multiple T and NK cell-based (cancer) immunotherapies.

The present disclosure provides novel IL2 variants. Specifically, variants of IL2 are described that contain mutations affecting CD25 binding ("mutCD25") and optionally further contain mutations enhancing IL2Rβγ ("mutβγ") binding thereby reducing Treg expansion and increasing effector T cell and NK cell stimulation. In vitro, mRNA-encoded IL2 mutCD25 variants induced weaker proliferation of IL2Rαβγ positive T cells than wild type IL2 and demonstrated reduced binding to CD25. Mutβγ variants without mutCD25 mutations strongly increased the potency to expand all T cells but also increased the preferential expansion of Tregs in comparison to wild type IL2. Importantly, combination of mutCD25 and mutβγ mutations resulted in a strong reduction of IL2 mediated Treg expansion while retaining the efficacy to expand CD8+ T cells as well as FoxP3– CD4+ T cells. In vivo, nanoparticle-formulated mRNA encoding IL2 mutCD25 variants targeted to the liver of mice for systemic availability preferentially or solely boosted effector T cell responses induced by RNA-LPX vaccination in comparison to Tregs. Combination of mutCD25 and mutβγ mutations further boosted the potency of mutCD25 IL2 variants and led to preferential expansion of antigen-specific T cells with significantly lower Treg expansion and increased CD8 to Treg ratios compared to wild type IL2.

SUMMARY

In one embodiment, IL2 variants are described herein having amino acid substitutions at the region of IL2 that contacts the alpha (α) subunit of the heterotrimeric IL2 receptor complex, IL2Rαβγ, reducing its ability to bind and activate the heterotrimer (also termed "mutCD25" mutations herein). The IL2Rαβγ complex is constitutively expressed on regulatory T cells (Tregs). Therefore, the IL2 substitutions described herein reduce the affinity for IL2Rαβγ to a greater extent than for IL2Rβγ, the receptor complex predominant on naïve and memory T cells as well as NK cells. Treatment using the IL2 variants described herein in vivo favors activation of T cells such as CD8 T cells over Tregs in the tumor microenvironment to provide anti-tumor efficacy.

In one aspect, the invention relates to a polypeptide comprising a mutein of human interleukin-2 (IL2) or of a functional variant of human IL2, wherein the human IL2 or functional variant thereof is substituted at at least a position having an acidic or basic amino acid residue in wild type human IL2 that contacts the alpha subunit of the αβγ IL2 receptor complex (IL2Rαβγ), wherein if the amino acid residue is an acidic amino acid residue (glutamic acid (Glu/E) or aspartic acid (Asp/D), in particular glutamic acid) in wild type human IL2 the substitution is by a basic amino acid residue (lysine (Lys/K) or arginine (Arg/R), in particular lysine) and if the amino acid residue is a basic amino acid residue (lysine (Lys/K) or arginine (Arg/R), in particular lysine) in wild type human IL2 the substitution is by an acidic amino acid residue (glutamic acid (Glu/E) or aspartic acid (Asp/D), in particular glutamic acid). In different embodiments, the human IL2 or functional variant thereof is substituted at one or more, such as two or more or three or more, such as 2, 3, 4, 5, 6, 7 or 8 such positions having an acidic or basic amino acid residue in wild type human IL2 that contacts the alpha subunit of the αβγ IL2 receptor complex (IL2Rαβγ).

In one embodiment, wild type human IL2 has the amino acid sequence according to SEQ ID NO: 17.

In one embodiment, the acidic amino acid residue in wild type human IL2 contacts a basic amino acid residue in the alpha subunit of IL2Rαβγ. In one embodiment, the basic amino acid residue in wild type human IL2 contacts an acidic amino acid residue in the alpha subunit of IL2Rαβγ.

In one embodiment, the substitution reduces the affinity for IL2Rαβγ. In one embodiment, the substitution reduces the affinity for IL2Rαβγ to a greater extent than for the βγ IL2 receptor complex (IL2Rβγ).

In one embodiment, the polypeptide preferentially activates effector T cells (e.g., CD8+ T cells and/or CD4+ T cells, such as CD4+ T cells being CD25– and/or FoxP3–) over regulatory T cells (e.g., CD4+CD25+FoxP3+ T cells).

In one embodiment, the human IL2 or functional variant thereof is substituted at at least one of positions 35 (lysine), 43 (lysine), 61 (glutamic acid) and 62 (glutamic acid) relative to wild type human IL2 and numbered in accordance with wild type human IL2.

In different embodiments, the human IL2 or functional variant thereof is substituted at at least the following positions:
position 35,
position 43,
position 61,
position 62,
position 35 and position 43,
position 35 and position 61,
position 35 and position 62,
position 43 and position 61,
position 43 and position 62,
position 61 and position 62,
position 35, position 43 and position 61,
position 35, position 43 and position 62,
position 35, position 61 and position 62,
position 43, position 61 and position 62, or
position 35, position 43, position 61 and position 62.

In one embodiment, position 35 is substituted with glutamic acid. In one embodiment, position 43 is substituted with glutamic acid. In one embodiment, position 61 is substituted with lysine. In one embodiment, position 62 is substituted with lysine.

In one embodiment, position 35 is substituted. In one embodiment, position 35 is substituted with glutamic acid.

In one embodiment, position 43 is substituted. In one embodiment, position 43 is substituted with glutamic acid.

In one embodiment, position 61 is substituted. In one embodiment, position 61 is substituted with lysine.

In one embodiment, position 62 is substituted. In one embodiment, position 62 is substituted with lysine.

In one embodiment, positions 43 and 61 are substituted. In one embodiment, position 43 is substituted with glutamic acid and position 61 is substituted with lysine.

In one embodiment, positions 35, 43 and 61 are substituted. In one embodiment, position 35 is substituted with glutamic acid, position 43 is substituted with glutamic acid and position 61 is substituted with lysine.

In one embodiment, positions 61 and 62 are substituted. In one embodiment, position 61 is substituted with lysine and position 62 is substituted with lysine.

In one aspect, the invention relates to a polypeptide comprising a mutein of human interleukin-2 (IL2) or of a functional variant of human IL2, wherein the human IL2 or functional variant thereof is substituted at at least one of positions 35 (lysine), 43 (lysine), 61 (glutamic acid) and 62 (glutamic acid) relative to wild type human IL2 and numbered in accordance with wild type human IL2. In one embodiment, if the amino acid residue is an acidic amino acid residue in wild type human IL2 the substitution is by a basic amino acid residue and if the amino acid residue is a basic amino acid residue in wild type human IL2 the substitution is by an acidic amino acid residue.

In different embodiments, the human IL2 or functional variant thereof is substituted at at least the following positions:
  position 35,
  position 43,
  position 61,
  position 62,
  position 35 and position 43,
  position 35 and position 61,
  position 35 and position 62,
  position 43 and position 61,
  position 43 and position 62,
  position 61 and position 62,
  position 35, position 43 and position 61,
  position 35, position 43 and position 62,
  position 35, position 61 and position 62,
  position 43, position 61 and position 62, or
  position 35, position 43, position 61 and position 62.

In one embodiment, position 35 is substituted with glutamic acid. In one embodiment, position 43 is substituted with glutamic acid. In one embodiment, position 61 is substituted with lysine. In one embodiment, position 62 is substituted with lysine.

In one embodiment, position 35 is substituted. In one embodiment, position 35 is substituted with glutamic acid.

In one embodiment, position 43 is substituted. In one embodiment, position 43 is substituted with glutamic acid.

In one embodiment, position 61 is substituted. In one embodiment, position 61 is substituted with lysine.

In one embodiment, position 62 is substituted. In one embodiment, position 62 is substituted with lysine.

In one embodiment, positions 43 and 61 are substituted. In one embodiment, position 43 is substituted with glutamic acid and position 61 is substituted with lysine.

In one embodiment, positions 35, 43 and 61 are substituted. In one embodiment, position 35 is substituted with glutamic acid, position 43 is substituted with glutamic acid and position 61 is substituted with lysine.

In one embodiment, positions 61 and 62 are substituted. In one embodiment, position 61 is substituted with lysine and position 62 is substituted with lysine.

In one embodiment, wild type human IL2 has the amino acid sequence according to SEQ ID NO: 17.

In one embodiment, the substitution reduces the affinity for IL2Rαβγ. In one embodiment, the substitution reduces the affinity for IL2Rαβγ to a greater extent than for the βγ IL2 receptor complex (IL2Rβγ).

In one embodiment, the polypeptide preferentially activates effector T cells (e.g., CD8+ T cells and/or CD4+ T cells, such as CD4+ T cells being CD25− and/or FoxP3−) over regulatory T cells (e.g., CD4+CD25+FoxP3+ T cells).

In one embodiment, the substituted IL2 or functional variant thereof (IL2 mutein) described above has an amino acid sequence identical to wild type IL2 at the other, non-substituted residues. In one embodiment, the IL2 mutein described above has amino acid modifications such as amino acid substitutions at one or more sites in or at the other residues of wild type human IL2. In one embodiment, such amino acid substitutions result in relatively increased affinity for IL2Rβγ when compared to wild type IL2 (also termed "mutβγ" mutations herein). Such mutants are potent IL2 signaling agonists. In one embodiment, such amino acid substitutions are at amino acid residues that contact IL2Rβ and/or IL2Rγ.

In one embodiment, the human IL2 or functional variant thereof is substituted at at least one of positions 24, 65, 74, 80, 81, 85, 86, 89, 92, and 93 relative to wild type human IL2 and numbered in accordance with wild type human IL2. The substituted amino acid residue(s) can be, but are not necessarily, conservative substitutions. For example, the mutation can be: I24V, P65H, Q74R, Q74H, Q74N, Q74S, L80F, L80V, R81I, R81T, R81D, L85V, I86V, I89V, I92F, V93I.

In one embodiment, the IL2 mutein comprises the following set of amino acid substitutions: 80F/81D/85V/86V/92F. The IL2 mutein may further comprise the amino acid substitution 42A. The IL2 mutein may further comprise one or more of the following amino acid substitutions: 24V, 65H, 74R, 74H, 74N, 74S, 89V, 93I.

In some embodiments, the IL2 mutein comprises a set of amino acid substitutions selected from the group consisting of:
  (i) 74N, 80F, 81D, 85V, 86V, 89V, 92F;
  (ii) 74H, 80F, 81D, 85V, 86V, 92F;
  (iii) 74S, 80F, 81D, 85V, 86V, 92F;
  (iv) 74N, 80F, 81D, 85V, 86V, 92F;
  (v) 80F, 81D, 85V, 86V, 92F;
  (vi) 80F, 81D, 85V, 86V, 89V, 92F, 93I;
  (vii) 18R, 22E, 80F, 81D, 85V, 86V, 89V, 92F, 93I, 126T;
  (viii) 18R, 22E, 74S, 80F, 81T, 85V, 86V, 89V, 92F, 93I, 126T.

In one aspect, the invention relates to a polypeptide comprising a mutein of human interleukin-2 (IL2) or of a functional variant of human IL2, wherein the human IL2 or functional variant thereof comprises at least (i) one or more amino acid substitutions which reduce the affinity for the alpha subunit of IL2Rαβγ (also termed "mutCD25" mutations herein) and (i) one or more amino acid substitutions which enhance the affinity for IL2Rβγ (also termed "mutβγ" mutations herein).

In one embodiment, the polypeptide preferentially activates effector T cells (e.g., CD8+ T cells and/or CD4+ T cells, such as CD4+ T cells being CD25− and/or FoxP3−) over regulatory T cells (e.g., CD4+CD25+FoxP3+ T cells).

In one embodiment, the one or more amino acid substitutions which reduce the affinity for the alpha subunit of IL2Rαβγ are at amino acid residues of IL2 or a functional variant thereof that contact IL2Rα. In one embodiment, the one or more amino acid substitutions which reduce the affinity for the alpha subunit of IL2Rαβγ reduce the affinity for IL2Rαβγ to a greater extent than for IL2Rβγ.

In one embodiment, the one or more amino acid substitutions which reduce the affinity for the alpha subunit of IL2Rαβγ comprise substitutions at one or more positions of IL2 or a functional variant thereof selected from the group consisting of K35, T37, R38, T41, F42, K43, F44, Y45, E61, E62, K64, P65, E68, L72, and Y107.

In one embodiment, the one or more amino acid substitutions which reduce the affinity for the alpha subunit of IL2Rαβγ are at one or more positions of IL2 or a functional variant thereof having an acidic or basic amino acid residue in wild type human IL2 that contacts the alpha subunit of IL2Rαβγ, wherein if the amino acid residue is an acidic amino acid residue (glutamic acid (Glu/E) or aspartic acid (Asp/D), in particular glutamic acid) in wild type human IL2 the substitution is by a basic amino acid residue (lysine (Lys/K) or arginine (Arg/R), in particular lysine) and if the amino acid residue is a basic amino acid residue (lysine (Lys/K) or arginine (Arg/R), in particular lysine) in wild type human IL2 the substitution is by an acidic amino acid residue (glutamic acid (Glu/E) or aspartic acid (Asp/D), in particular glutamic acid). In different embodiments, the human IL2 or functional variant thereof is substituted at one or more, such as two or more or three or more, such as 2, 3, 4, 5, 6, 7 or 8 such positions having an acidic or basic amino acid residue in wild type human IL2 that contacts the alpha subunit of IL2Rαβγ.

In one embodiment, the acidic amino acid residue in wild type human IL2 contacts a basic amino acid residue in the alpha subunit of IL2Rαβγ. In one embodiment, the basic amino acid residue in wild type human IL2 contacts an acidic amino acid residue in the alpha subunit of IL2Rαβγ.

In one embodiment, wild type human IL2 has the amino acid sequence according to SEQ ID NO: 17.

In one embodiment the one or more amino acid substitutions which reduce the affinity for the alpha subunit of IL2Rαβγ comprise a substitution at at least one of positions 35 (lysine), 43 (lysine), 61 (glutamic acid) and 62 (glutamic acid) relative to wild type human IL2 and numbered in accordance with wild type human IL2.

In different embodiments, the one or more amino acid substitutions which reduce the affinity for the alpha subunit of IL2Rαβγ are at one or more positions of IL2 or a functional variant thereof selected from the group consisting of:

position 35,
position 43,
position 61,
position 62,
position 35 and position 43,
position 35 and position 61,
position 35 and position 62,
position 43 and position 61,
position 43 and position 62,
position 61 and position 62,
position 35, position 43 and position 61,
position 35, position 43 and position 62,
position 35, position 61 and position 62,
position 43, position 61 and position 62, or
position 35, position 43, position 61 and position 62.

In one embodiment, position 35 is substituted with glutamic acid. In one embodiment, position 43 is substituted with glutamic acid. In one embodiment, position 61 is substituted with lysine. In one embodiment, position 62 is substituted with lysine.

In one embodiment, position 35 is substituted. In one embodiment, position 35 is substituted with glutamic acid.

In one embodiment, position 43 is substituted. In one embodiment, position 43 is substituted with glutamic acid.

In one embodiment, position 61 is substituted. In one embodiment, position 61 is substituted with lysine.

In one embodiment, position 62 is substituted. In one embodiment, position 62 is substituted with lysine.

In one embodiment, positions 43 and 61 are substituted. In one embodiment, position 43 is substituted with glutamic acid and position 61 is substituted with lysine.

In one embodiment, positions 35, 43 and 61 are substituted. In one embodiment, position 35 is substituted with glutamic acid, position 43 is substituted with glutamic acid and position 61 is substituted with lysine.

In one embodiment, positions 61 and 62 are substituted. In one embodiment, position 61 is substituted with lysine and position 62 is substituted with lysine.

In one embodiment, the one or more amino acid substitutions which enhance the affinity for IL2Rβγ are at amino acid residues of IL2 that contact IL2Rβ and/or IL2Rγ.

In one embodiment, the one or more amino acid substitutions which enhance the affinity for IL2Rβγ comprise substitutions at one or more positions of IL2 selected from the group consisting of K9, L12, Q13, E15, H16, D20, Q74, L80, R81, D84, L85, 186, N88, I92, L94, and E95.

In one embodiment, the one or more amino acid substitutions which enhance the affinity for IL2Rβγ comprise a substitution at at least one of positions 24, 65, 74, 80, 81, 85, 86, 89, 92, and 93 relative to wild type human IL2 and numbered in accordance with wild type human IL2. The substituted amino acid residue(s) can be, but are not necessarily, conservative substitutions. For example, the mutation can be: 124V, P65H, Q74R, Q74H, Q74N, Q74S, L80F, L80V, R81I, R81T, R81D, L85V, I86V, I89V, I92F, V93I.

In one embodiment, the IL2 mutein comprises the following set of amino acid substitutions: 80F/81D/85V/86V/92F. The IL2 mutein may further comprise the amino acid substitution 42A. The IL2 mutein may further comprise one or more of the following amino acid substitutions: 24V, 65H, 74R, 74H, 74N, 74S, 89V, 93I.

In some embodiments, the IL2 mutein comprises a set of amino acid substitutions selected from the group consisting of:

(i) 74N, 80F, 81D, 85V, 86V, 89V, 92F;
(ii) 74H, 80F, 81D, 85V, 86V, 92F;
(iii) 74S, 80F, 81D, 85V, 86V, 92F;
(iv) 74N, 80F, 81D, 85V, 86V, 92F;
(v) 80F, 81D, 85V, 86V, 92F;
(vi) 80F, 81D, 85V, 86V, 89V, 92F, 93I;
(vii) 18R, 22E, 80F, 81D, 85V, 86V, 89V, 92F, 93I, 126T;
(viii) 18R, 22E, 74S, 80F, 81T, 85V, 86V, 89V, 92F, 93I, 126T.

The IL2 mutein described herein may be attached to a pharmacokinetic modifying group and, thus, may be an "extended-pharmacokinetic (PK) IL2".

In one aspect, the invention relates to a polypeptide as described herein, which is an extended pharmacokinetic (PK) IL2 further comprising an amino acid sequence which is heterologous to the IL2 or functional variant thereof fused to the IL2 mutein.

In one embodiment, the amino acid sequence which is heterologous to the IL2 or functional variant thereof is selected from the group consisting of serum albumin, an immunoglobulin fragment, transferrin, and Fn3, or variants thereof. In one embodiment, the serum albumin comprises mouse serum albumin or human serum albumin. In one embodiment, the immunoglobulin fragment comprises an immunoglobulin Fc domain.

In one aspect, the invention relates to a polypeptide comprising an amino acid sequence selected from the group consisting of SEQ ID NOs: 2 to 16, such as SEQ ID NO: 2, 3, 4, 5, 6, 7, 8, 9, 10, 11, 12, 13, 14, 15, or 16 of the sequence listing.

The above described polypeptides are also termed "IL2 variant polypeptide" or simply "IL2 variant" herein.

In one aspect, the invention relates to a polynucleotide encoding the IL2 variant polypeptide described herein. In one embodiment, the polynucleotide is RNA.

In one aspect, the invention relates to a host cell comprising the polynucleotide encoding the IL2 variant polypeptide described herein.

In one aspect, the invention relates to a pharmaceutical composition comprising the IL2 variant polypeptide described herein, the polynucleotide encoding the IL2 variant polypeptide described herein, or the host cell comprising the polynucleotide encoding the IL2 variant polypeptide described herein.

In one aspect, the invention relates to a method of treating a subject comprising administering to the subject the IL2 variant polypeptide described herein, the polynucleotide encoding the IL2 variant polypeptide described herein, the host cell comprising the polynucleotide encoding the IL2 variant polypeptide described herein, or the pharmaceutical composition described herein. In one embodiment, the subject has cancer.

In one embodiment, the subject is further treated using one or more immunotherapies, e.g., using vaccination or adoptive transfer of T cells, such as T cell vaccines or adoptive transfer of (naïve or T cell receptor transgenic or chimeric antigen receptor transgenic) T cells or NK cells.

The effectiveness of vaccines, wherein the antigen is either delivered per se or as a polynucleotide, in particular as RNA encoding the antigen (e.g. RNA encoding a peptide or protein used for vaccination also referred to as "peptide or protein comprising an epitope for inducing an immune response against an antigen" herein) can be increased by co-administering IL2 variant polypeptides described herein, wherein the IL2 variant polypeptide is either delivered per se or as a polynucleotide, in particular RNA encoding the IL2 variant polypeptide. The vaccine is particularly effective if the RNA encoding the IL2 variant polypeptide is targeted to the liver for systemic availability. Liver cells can be efficiently transfected and are able to produce large amounts of protein. Antigen-encoding mRNA is preferably targeted to secondary lymphoid organs. Furthermore, the vaccine is particularly effective if an immune checkpoint inhibitor such as an anti-PD-L1 antibody is further administered.

In one aspect, the invention relates to a method for inducing an immune response in a subject comprising administering to the subject:
  a. the IL2 variant polypeptide described herein, the polynucleotide encoding the IL2 variant polypeptide described herein, the host cell comprising the polynucleotide encoding the IL2 variant polypeptide described herein, or the pharmaceutical composition described herein; and
  b. a peptide or protein comprising an epitope for inducing an immune response against an antigen in the subject or a polynucleotide encoding the peptide or protein.

In one embodiment, the polynucleotide encoding the peptide or protein is RNA.

In one embodiment, the method for inducing an immune response in a subject comprises administering to the subject:
  a. RNA encoding the IL2 variant polypeptide described herein; and
  b. RNA encoding a peptide or protein comprising an epitope for inducing an immune response against an antigen in the subject.

In one embodiment, the polypeptide preferentially activates effector T cells (e.g., CD8+ T cells and/or CD4+ T cells, such as CD4+ T cells being CD25− and/or FoxP3−) over regulatory T cells (e.g., CD4+CD25+FoxP3+ T cells).

In one embodiment, the method is a method for treating or preventing cancer in a subject, wherein the antigen is a tumor-associated antigen.

In one aspect, the invention relates to a method for treating or preventing cancer in a subject comprising administering to the subject:
  a. the IL2 variant polypeptide described herein, the polynucleotide encoding the IL2 variant polypeptide described herein, the host cell comprising the polynucleotide encoding the IL2 variant polypeptide described herein, or the pharmaceutical composition described herein; and
  b. a peptide or protein comprising an epitope for inducing an immune response against a tumor-associated antigen in the subject or a polynucleotide encoding the peptide or protein.

In one embodiment, the polynucleotide encoding the peptide or protein is RNA.

In one embodiment, the method for treating or preventing cancer in a subject comprises administering to the subject:
  a. RNA encoding the IL2 variant polypeptide described herein; and
  b. RNA encoding a peptide or protein comprising an epitope for inducing an immune response against a tumor-associated antigen in the subject.

In one embodiment, the cancer is selected from the group consisting of melanoma, leukemia, lymphoma, lung cancer, breast cancer, prostate cancer, ovarian cancer, colon cancer, mesothelioma, renal cell carcinoma, and brain cancer.

In one embodiment, the methods described herein further comprise administering to the subject an immune checkpoint inhibitor. In one embodiment, the immune checkpoint inhibitor targets the interaction between (i) PD-1 and PD-L1, or (ii) CTLA-4 and CD80 or CD86. In one embodiment, the immune checkpoint inhibitor is an antibody or antibody fragment. In one embodiment, the antibody or antibody fragment targets PD-1, PD-L1, or CTLA-4.

In one embodiment, the RNA encoding the IL2 variant polypeptide described herein, the RNA encoding a peptide or protein comprising an epitope for inducing an immune response against an antigen in the subject, and optionally the immune checkpoint inhibitor are administered simultaneously or sequentially.

In one aspect, the invention relates to a medical preparation comprising:
  a. the IL2 variant polypeptide described herein, the polynucleotide encoding the IL2 variant polypeptide described herein, the host cell comprising the polynucleotide encoding the IL2 variant polypeptide described herein, or the pharmaceutical composition described herein.

In one embodiment, the medical preparation further comprises:
  b. a peptide or protein comprising an epitope for inducing an immune response against an antigen in a subject or a polynucleotide encoding the peptide or protein.

In one embodiment, the polynucleotide encoding the peptide or protein is RNA.

In one embodiment, the medical preparation comprises:
  a. RNA encoding the IL2 variant polypeptide described herein; and
  b. RNA encoding a peptide or protein comprising an epitope for inducing an immune response against an antigen in a subject.

In one embodiment of the medical preparation, the RNA is present in a form selected from a liquid form, a solid form, or a combination thereof. In one embodiment, the solid form is a frozen form or a dehydrated form. In one embodiment, the dehydrated form is a freeze-dried or spray-dried form.

In one embodiment, the medical preparation further comprises an immune checkpoint inhibitor. In one embodiment, the immune checkpoint inhibitor targets the interaction between (i) PD-1 and PD-L1, or (ii) CTLA-4 and CD80 or CD86. In one embodiment, the immune checkpoint inhibitor is an antibody or antibody fragment. In one embodiment, the antibody or antibody fragment targets PD-1, PD-L1, or CTLA-4.

In one embodiment, the medical preparation is a kit. In one embodiment, the medical preparation is a pharmaceutical composition.

In one embodiment, the medical preparation comprises each component a. and b. in a separate container.

In one embodiment, the medical preparation is a pharmaceutical composition. In one embodiment, the pharmaceutical composition further comprises one or more pharmaceutically acceptable carriers, diluents and/or excipients.

In one embodiment, the medical preparation further comprises instructions for use of the medical preparation for treating or preventing cancer wherein the antigen is a tumor-associated antigen.

In one aspect, the invention relates to the medical preparation described herein for pharmaceutical use.

In one embodiment, the pharmaceutical use comprises a therapeutic or prophylactic treatment of a disease or disorder.

In one aspect, the invention relates to the medical preparation described herein for use in a method for treating or preventing cancer in a subject, wherein the antigen is a tumor-associated antigen.

In one embodiment, the cancer is selected from the group consisting of melanoma, leukemia, lymphoma, lung cancer, breast cancer, prostate cancer, ovarian cancer, colon cancer, mesothelioma, renal cell carcinoma, and brain cancer.

In a further aspect, the invention relates to the IL2 variant polypeptide described herein, the polynucleotide encoding the IL2 variant polypeptide described herein, the host cell comprising the polynucleotide encoding the IL2 variant polypeptide described herein, or the pharmaceutical composition described herein for use in a method of treating a subject comprising administering to the subject the polypeptide, the polynucleotide, the host cell, or the pharmaceutical composition.

In one embodiment, the subject has cancer.

In a further aspect, the invention relates to the IL2 variant polypeptide described herein, the polynucleotide encoding the IL2 variant polypeptide described herein, the host cell comprising the polynucleotide encoding the IL2 variant polypeptide described herein, or the pharmaceutical composition described herein for use in a method for inducing an immune response in a subject comprising administering to the subject:
  a. the polypeptide, the polynucleotide, the host cell, or the pharmaceutical composition; and
  b. a peptide or protein comprising an epitope for inducing an immune response against an antigen in the subject or a polynucleotide encoding the peptide or protein.

In one embodiment, the polynucleotide encoding the peptide or protein is RNA.

In one embodiment, the method for inducing an immune response in a subject comprises administering to the subject:
  a. RNA encoding the IL2 variant polypeptide described herein; and
  b. RNA encoding a peptide or protein comprising an epitope for inducing an immune response against an antigen in the subject.

In one embodiment, the polypeptide preferentially activates effector T cells (e.g., CD8+ T cells and/or CD4+ T cells, such as CD4+ T cells being CD25− and/or FoxP3−) over regulatory T cells (e.g., CD4+CD25+FoxP3+ T cells).

In one embodiment, the method is a method for treating or preventing cancer in a subject, wherein the antigen is a tumor-associated antigen.

In a further aspect, the invention relates to the IL2 variant polypeptide described herein, the polynucleotide encoding the IL2 variant polypeptide described herein, the host cell comprising the polynucleotide encoding the IL2 variant polypeptide described herein, or the pharmaceutical composition described herein for use in a method for treating or preventing cancer in a subject comprising administering to the subject:
  a. the polypeptide, the polynucleotide, the host cell, or the pharmaceutical composition; and
  b. a peptide or protein comprising an epitope for inducing an immune response against a tumor-associated antigen in the subject or a polynucleotide encoding the peptide or protein.

In one embodiment, the polynucleotide encoding the peptide or protein is RNA.

In one embodiment, the method for treating or preventing cancer in a subject comprises administering to the subject:
  a. RNA encoding the IL2 variant polypeptide described herein; and
  b. RNA encoding a peptide or protein comprising an epitope for inducing an immune response against a tumor-associated antigen in the subject.

In one embodiment, the cancer is selected from the group consisting of melanoma, leukemia, lymphoma, lung cancer, breast cancer, prostate cancer, ovarian cancer, colon cancer, mesothelioma, renal cell carcinoma, and brain cancer.

In one embodiment, the methods described herein further comprise administering to the subject an immune checkpoint inhibitor. In one embodiment, the immune checkpoint inhibitor targets the interaction between (i) PD-1 and PD-L1, or (ii) CTLA-4 and CD80 or CD86. In one embodiment, the immune checkpoint inhibitor is an antibody or antibody fragment. In one embodiment, the antibody or antibody fragment targets PD-1, PD-1, or CTLA-4.

In one embodiment, the RNA encoding the IL2 variant polypeptide described herein, the RNA encoding a peptide or protein comprising an epitope for inducing an immune response against an antigen in the subject, and optionally the immune checkpoint inhibitor are administered simultaneously or sequentially.

DETAILED DESCRIPTION

Figure 1:
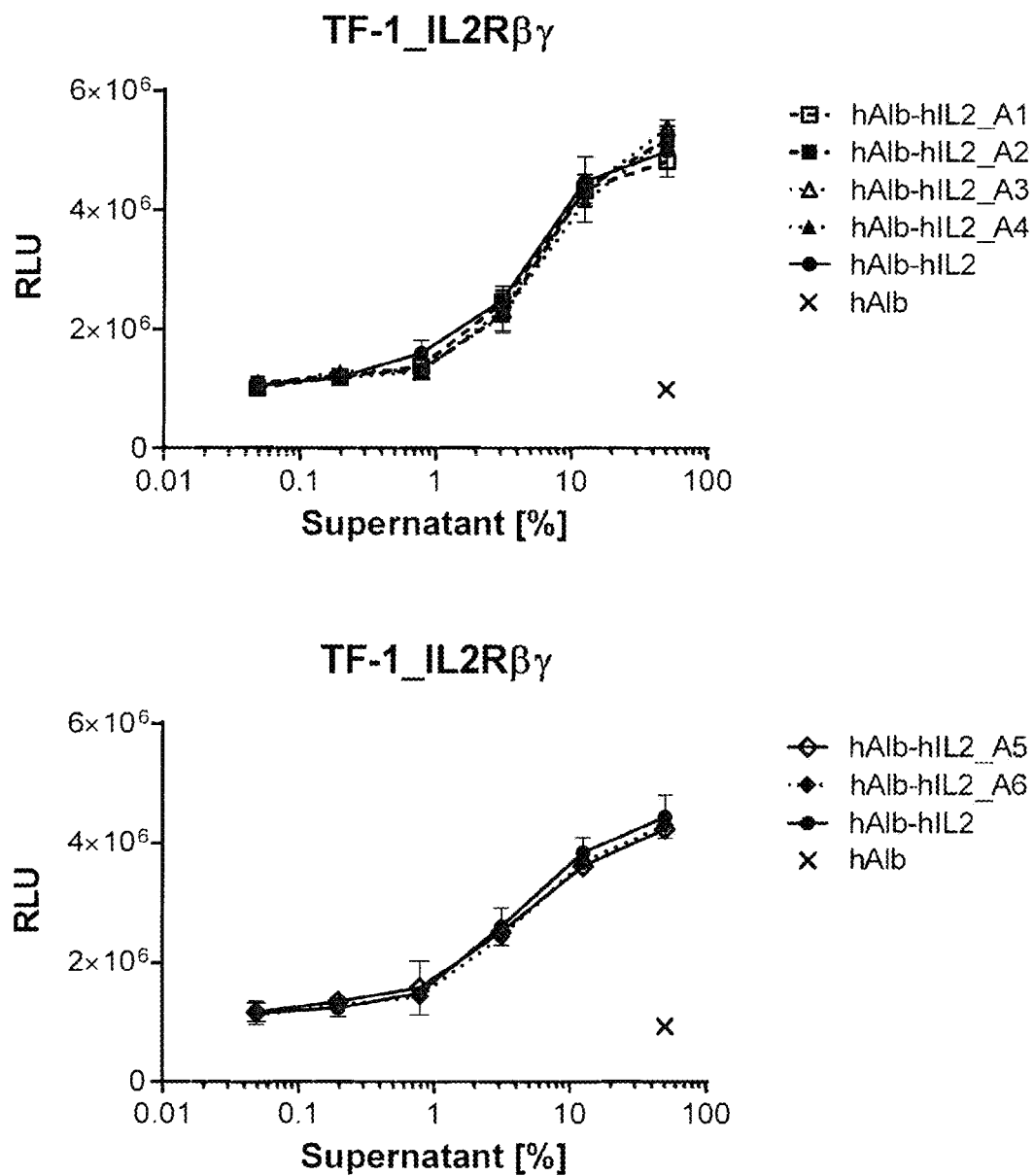
FIG. 1: In vitro expression and IL2Rβγ binding of RNA-encoded IL2 variants. $1.2 \times 10^6$ HEK293T/17 cells were seeded in 6-well plates and after reaching approx. 80% confluency lipofected with 3 µg mRNA (400 ng mRNA complexed per µL Lipofectamine MessengerMAX) in a total volume of 3.25 mL DMEM+10% FBS. After 20 h incubation at 37° C., 5% $CO_2$, supernatants were collected and serial dilutions thereof incubated with intermediate-affinity IL2 receptor (IL2Rβγ) expressing human cell line TF-1_IL2Rβγ. Proliferation responses were measured after three days by quantitating viable cells via ATP amount using the CellTiter-Glo®2.0 Assay. Data shown are mean±standard deviation (SD) of n=2 technical replicates. RLU=relative luminescence units.

Although the present disclosure is described in detail below, it is to be understood that this disclosure is not limited to the particular methodologies, protocols and reagents described herein as these may vary. It is also to be understood that the terminology used herein is for the purpose of describing particular embodiments only, and is not intended to limit the scope of the present disclosure which will be limited only by the appended claims. Unless defined otherwise, all technical and scientific terms used herein have the same meanings as commonly understood by one of ordinary skill in the art.

Preferably, the terms used herein are defined as described in "A multilingual glossary of biotechnological terms: (IUPAC Recommendations)", H. G. W. Leuenberger, B. Nagel, and H. Kölbl, Eds., Helvetica Chimica Acta, CH-4010 Basel, Switzerland, (1995).

The practice of the present disclosure will employ, unless otherwise indicated, conventional methods of chemistry, biochemistry, cell biology, immunology, and recombinant DNA techniques which are explained in the literature in the field (cf., e.g., Molecular Cloning: A Laboratory Manual, 2nd Edition, J. Sambrook et al. eds., Cold Spring Harbor Laboratory Press, Cold Spring Harbor 1989).

In the following, the elements of the present disclosure will be described. These elements are listed with specific embodiments, however, it should be understood that they may be combined in any manner and in any number to create additional embodiments. The variously described examples and embodiments should not be construed to limit the present disclosure to only the explicitly described embodiments. This description should be understood to disclose and encompass embodiments which combine the explicitly described embodiments with any number of the disclosed elements. Furthermore, any permutations and combinations of all described elements should be considered disclosed by this description unless the context indicates otherwise.

The term "about" means approximately or nearly, and in the context of a numerical value or range set forth herein in one embodiment means±20%, 10%, 5%, or ±3% of the numerical value or range recited or claimed.

The terms "a" and "an" and "the" and similar reference used in the context of describing the disclosure (especially in the context of the claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it was individually recited herein. All methods described herein can be performed in any suitable order unless otherwise indicated herein or otherwise clearly contradicted by context. The use of any and all examples, or exemplary language (e.g., "such as"), provided herein is intended merely to better illustrate the disclosure and does not pose a limitation on the scope of the claims. No language in the specification should be construed as indicating any non-claimed element essential to the practice of the disclosure.

Unless expressly specified otherwise, the term "comprising" is used in the context of the present document to indicate that further members may optionally be present in addition to the members of the list introduced by "comprising". It is, however, contemplated as a specific embodiment of the present disclosure that the term "comprising" encompasses the possibility of no further members being present, i.e., for the purpose of this embodiment "comprising" is to be understood as having the meaning of "consisting of".

Several documents are cited throughout the text of this specification. Each of the documents cited herein (including all patents, patent applications, scientific publications, manufacturer's specifications, instructions, etc.), whether supra or infra, are hereby incorporated by reference in their entirety. Nothing herein is to be construed as an admission that the present disclosure was not entitled to antedate such disclosure.

In the following, definitions will be provided which apply to all aspects of the present disclosure. The following terms have the following meanings unless otherwise indicated. Any undefined terms have their art recognized meanings.

Definitions

"Reduce", "decrease" or "inhibit" as used herein means an overall decrease or the ability to cause an overall decrease, preferably of 5% or greater, 10% or greater, 20% or greater, more preferably of 50% or greater, and most preferably of 75% or greater, in the level, e.g. in the level of binding.

Terms such as "increase" or "enhance" preferably relate to an increase or enhancement by about at least 10%, preferably at least 20%, preferably at least 30%, more preferably at least 40%, more preferably at least 50%, even more preferably at least 80%, and most preferably at least 100%, at least 200%, at least 500%, or even more.

According to the disclosure, the term "peptide" comprises oligo- and polypeptides and refers to substances which comprise about two or more, about 3 or more, about 4 or more, about 6 or more, about 8 or more, about 10 or more, about 13 or more, about 16 or more, about 20 or more, and up to about 50, about 100 or about 150, consecutive amino acids linked to one another via peptide bonds. The term "protein" or "polypeptide" refers to large peptides, in particular peptides having at least about 50 amino acids, but the terms "peptide", "protein" and "polypeptide" are used herein usually as synonyms.

A "therapeutic protein" has a positive or advantageous effect on a condition or disease state of a subject when provided to the subject in a therapeutically effective amount. In one embodiment, a therapeutic protein has curative or palliative properties and may be administered to ameliorate, relieve, alleviate, reverse, delay onset of or lessen the severity of one or more symptoms of a disease or disorder. A therapeutic protein may have prophylactic properties and may be used to delay the onset of a disease or to lessen the severity of such disease or pathological condition. The term "therapeutic protein" includes entire proteins or peptides, and can also refer to therapeutically active fragments thereof. It can also include therapeutically active variants of a protein. Examples of therapeutically active proteins include, but are not limited to, cytokines.

"Fragment", with reference to an amino acid sequence (peptide or protein), relates to a part of an amino acid sequence, i.e. a sequence which represents the amino acid sequence shortened at the N-terminus and/or C-terminus. A fragment shortened at the C-terminus (N-terminal fragment) is obtainable e.g. by translation of a truncated open reading frame that lacks the 3'-end of the open reading frame. A fragment shortened at the N-terminus (C-terminal fragment) is obtainable e.g. by translation of a truncated open reading frame that lacks the 5'-end of the open reading frame, as long as the truncated open reading frame comprises a start codon that serves to initiate translation. A fragment of an amino acid sequence comprises e.g. at least 50%, at least 60%, at least 70%, at least 80%, at least 90% of the amino acid residues from an amino acid sequence. A fragment of an amino acid sequence preferably comprises at least 6, in particular at least 8, at least 12, at least 15, at least 20, at least 30, at least 50, or at least 100 consecutive amino acids from an amino acid sequence.

By "variant" or "variant protein" or "variant polypeptide" herein is meant a protein that differs from a wild type protein by virtue of at least one amino acid modification. The parent polypeptide may be a naturally occurring or wild type (WT) polypeptide, or may be a modified version of a wild type polypeptide. Preferably, the variant polypeptide has at least one amino acid modification compared to the parent polypeptide, e.g. from 1 to about 20 amino acid modifications, and preferably from 1 to about 10 or from 1 to about 5 amino acid modifications compared to the parent.

By "parent polypeptide", "parent protein", "precursor polypeptide", or "precursor protein" as used herein is meant an unmodified polypeptide that is subsequently modified to generate a variant. A parent polypeptide may be a wild type polypeptide, or a variant or engineered version of a wild type polypeptide.

By "wild type" or "WT" or "native" herein is meant an amino acid sequence that is found in nature, including allelic variations. A wild type protein or polypeptide has an amino acid sequence that has not been intentionally modified.

For the purposes of the present disclosure, "variants" of an amino acid sequence (peptide, protein or polypeptide) comprise amino acid insertion variants, amino acid addition variants, amino acid deletion variants and/or amino acid substitution variants. The term "variant" includes all splice variants, posttranslationally modified variants, conformations, isoforms and species homologs, in particular those which are naturally expressed by cells.

Amino acid insertion variants comprise insertions of single or two or more amino acids in a particular amino acid sequence. In the case of amino acid sequence variants having an insertion, one or more amino acid residues are inserted into a particular site in an amino acid sequence, although random insertion with appropriate screening of the resulting product is also possible. Amino acid addition variants comprise amino- and/or carboxy-terminal fusions of one or more amino acids, such as 1, 2, 3, 5, 10, 20, 30, 50, or more amino acids. Amino acid deletion variants are characterized by the removal of one or more amino acids from the sequence, such as by removal of 1, 2, 3, 5, 10, 20, 30, 50, or more amino acids. The deletions may be in any position of the protein. Amino acid deletion variants that comprise the deletion at the N-terminal and/or C-terminal end of the protein are also called N-terminal and/or C-terminal truncation variants. Amino acid substitution variants are characterized by at least one residue in the sequence being removed and another residue being inserted in its place. Preference is given to the modifications being in positions in the amino acid sequence which are not conserved between homologous proteins or peptides and/or to replacing amino acids with other ones having similar properties. Preferably, amino acid changes in peptide and protein variants are conservative amino acid changes, i.e., substitutions of similarly charged or uncharged amino acids. A conservative amino acid change involves substitution of one of a family of amino acids which are related in their side chains. Naturally occurring amino acids are generally divided into four families: acidic (aspartate, glutamate), basic (lysine, arginine, histidine), non-polar (alanine, valine, leucine, isoleucine, proline, phenylalanine, methionine, tryptophan), and uncharged polar (glycine, asparagine, glutamine, cysteine, serine, threonine, tyrosine) amino acids. Phenylalanine, tryptophan, and tyrosine are sometimes classified jointly as aromatic amino acids. In one embodiment, conservative amino acid substitutions include substitutions within the following groups:

glycine, alanine;
valine, isoleucine, leucine;
aspartic acid, glutamic acid;
asparagine, glutamine;
serine, threonine;
lysine, arginine; and
phenylalanine, tyrosine.

Preferably the degree of similarity, preferably identity between a given amino acid sequence and an amino acid sequence which is a variant of said given amino acid sequence will be at least about 60%, 65%, 70%, 80%, 81%, 82%, 83%, 84%, 85%, 86%, 87%, 88%, 89%, 90%, 91%, 92%, 93%, 94%, 95%, 96%, 97%, 98%, or 99%. The degree of similarity or identity is given preferably for an amino acid region which is at least about 10%, at least about 20%, at least about 30%, at least about 40%, at least about 50%, at least about 60%, at least about 70%, at least about 80%, at least about 90% or about 100% of the entire length of the reference amino acid sequence. For example, if the reference amino acid sequence consists of 200 amino acids, the degree of similarity or identity is given preferably for at least about 20, at least about 40, at least about 60, at least about 80, at least about 100, at least about 120, at least about 140, at least about 160, at least about 180, or about 200 amino acids, preferably continuous amino acids. In preferred embodiments, the degree of similarity or identity is given for the entire length of the reference amino acid sequence. The alignment for determining sequence similarity, preferably sequence identity can be done with art known tools, preferably using the best sequence alignment, for example, using Align, using standard settings, preferably EMBOSS::needle, Matrix: Blosum62, Gap Open 10.0, Gap Extend 0.5.

"Sequence similarity" indicates the percentage of amino acids that either are identical or that represent conservative amino acid substitutions. "Sequence identity" between two amino acid sequences indicates the percentage of amino acids that are identical between the sequences.

The term "percentage identity" is intended to denote a percentage of amino acid residues which are identical between the two sequences to be compared, obtained after the best alignment, this percentage being purely statistical and the differences between the two sequences being distributed randomly and over their entire length. Sequence comparisons between two amino acid sequences are conventionally carried out by comparing these sequences after having aligned them optimally, said comparison being carried out by segment or by "window of comparison" in order to identify and compare local regions of sequence similarity. The optimal alignment of the sequences for comparison may be produced, besides manually, by means of the local homology algorithm of Smith and Waterman, 1981, Ads App. Math. 2, 482, by means of the local homology algorithm of Neddleman and Wunsch, 1970, J. Mol. Biol. 48, 443, by means of the similarity search method of Pearson and Lipman, 1988, Proc. Natl Acad. Sci. USA 85, 2444, or by means of computer programs which use these algorithms (GAP, BESTFIT, FASTA, BLAST P, BLAST N and TFASTA in Wisconsin Genetics Software Package, Genetics Computer Group, 575 Science Drive, Madison, Wis.).

The percentage identity is calculated by determining the number of identical positions between the two sequences being compared, dividing this number by the number of positions compared and multiplying the result obtained by 100 so as to obtain the percentage identity between these two sequences.

Homologous amino acid sequences exhibit according to the disclosure at least 40%, in particular at least 50%, at least 60%, at least 70%, at least 80%, at least 90% and preferably at least 95%, at least 98 or at least 99% identity of the amino acid residues.

The amino acid sequence variants described herein may readily be prepared by the skilled person, for example, by recombinant DNA manipulation. The manipulation of DNA sequences for preparing peptides or proteins having substitutions, additions, insertions or deletions, is described in detail in Sambrook et al. (1989), for example. Furthermore, the peptides and amino acid variants described herein may be readily prepared with the aid of known peptide synthesis techniques such as, for example, by solid phase synthesis and similar methods.

In one embodiment, a fragment or variant of an amino acid sequence (peptide or protein) is preferably a "functional fragment" or "functional variant". The term "functional fragment" or "functional variant" of an amino acid sequence relates to any fragment or variant exhibiting one or more functional properties identical or similar to those of the amino acid sequence from which it is derived, i.e., it is functionally equivalent. With respect to cytokines, one particular function is one or more immunomodulatory activities displayed by the amino acid sequence from which the fragment or variant is derived and/or binding to the receptor(s) the amino acid sequence from which the fragment or variant is derived binds to.

An amino acid sequence (peptide, protein or polypeptide) "derived from" a designated amino acid sequence (peptide, protein or polypeptide) refers to the origin of the first amino acid sequence. Preferably, the amino acid sequence which is derived from a particular amino acid sequence has an amino acid sequence that is identical, essentially identical or homologous to that particular sequence or a fragment thereof. Amino acid sequences derived from a particular amino acid sequence may be variants of that particular sequence or a fragment thereof.

The term "polynucleotide" is used herein as to be interpreted broadly, and includes DNA and RNA, including modified DNA and RNA.

In the present disclosure, the term "RNA" relates to a nucleic acid molecule which includes ribonucleotide residues. In preferred embodiments, the RNA contains all or a majority of ribonucleotide residues. As used herein, "ribonucleotide" refers to a nucleotide with a hydroxyl group at the 2'-position of a R-D-ribofuranosyl group. RNA encompasses without limitation, double stranded RNA, single stranded RNA, isolated RNA such as partially purified RNA, essentially pure RNA, synthetic RNA, recombinantly produced RNA, as well as modified RNA that differs from naturally occurring RNA by the addition, deletion, substitution and/or alteration of one or more nucleotides. Such alterations may refer to addition of non-nucleotide material to internal RNA nucleotides or to the end(s) of RNA. It is also contemplated herein that nucleotides in RNA may be non-standard nucleotides, such as chemically synthesized nucleotides or deoxynucleotides. For the present disclosure, these altered RNAs are considered analogs of naturally-occurring RNA.

In certain embodiments of the present disclosure, the RNA is messenger RNA (mRNA) that relates to a RNA transcript which encodes a peptide or protein. As established in the art, mRNA generally contains a 5' untranslated region (5'-UTR), a peptide coding region and a 3' untranslated region (3'-UTR). In some embodiments, the RNA is produced by in vitro transcription or chemical synthesis. In one embodiment, the mRNA is produced by in vitro transcription using a DNA template where DNA refers to a nucleic acid that contains deoxyribonucleotides.

In one embodiment, RNA is in vitro transcribed RNA (IVT-RNA) and may be obtained by in vitro transcription of an appropriate DNA template. The promoter for controlling transcription can be any promoter for any RNA polymerase. A DNA template for in vitro transcription may be obtained by cloning of a nucleic acid, in particular cDNA, and introducing it into an appropriate vector for in vitro transcription. The cDNA may be obtained by reverse transcription of RNA.

In one embodiment, the RNA may have modified ribonucleotides. Examples of modified ribonucleotides include, without limitation, 5-methylcytidine, pseudouridine and/or 1-methyl-pseudouridine.

In some embodiments, the RNA according to the present disclosure comprises a 5'-cap. In one embodiment, the RNA of the present disclosure does not have uncapped 5'-triphosphates. In one embodiment, the RNA may be modified by a 5'-cap analog. The term "5'-cap" refers to a structure found on the 5'-end of an mRNA molecule and generally consists of a guanosine nucleotide connected to the mRNA via a 5' to 5' triphosphate linkage. In one embodiment, this guanosine is methylated at the 7-position. Providing an RNA with a 5'-cap or 5'-cap analog may be achieved by in vitro transcription, in which the 5'-cap is co-transcriptionally expressed into the RNA strand, or may be attached to RNA post-transcriptionally using capping enzymes.

In some embodiments, RNA according to the present disclosure comprises a 5'-UTR and/or a 3'-UTR. The term "untranslated region" or "UTR" relates to a region in a DNA molecule which is transcribed but is not translated into an amino acid sequence, or to the corresponding region in an RNA molecule, such as an mRNA molecule. An untranslated region (UTR) can be present 5' (upstream) of an open reading frame (5'-UTR) and/or 3' (downstream) of an open reading frame (3'-UTR). A 5'-UTR, if present, is located at the 5' end, upstream of the start codon of a protein-encoding region. A 5'-UTR is downstream of the 5'-cap (if present), e.g. directly adjacent to the 5'-cap. A 3'-UTR, if present, is located at the 3' end, downstream of the termination codon of a protein-encoding region, but the term "3'-UTR" does preferably not include the poly(A) tail. Thus, the 3'-UTR is upstream of the poly(A) sequence (if present), e.g. directly adjacent to the poly(A) sequence.

In some embodiments, the RNA according to the present disclosure comprises a 3'-poly(A) sequence. The term "poly (A) sequence" relates to a sequence of adenyl (A) residues which typically is located at the 3'-end of a RNA molecule. According to the disclosure, in one embodiment, a poly(A) sequence comprises at least about 20, at least about 40, at least about 80, or at least about 100, and up to about 500, up to about 400, up to about 300, up to about 200, or up to about 150 A nucleotides, and in particular about 120 A nucleotides.

In the context of the present disclosure, the term "transcription" relates to a process, wherein the genetic code in a DNA sequence is transcribed into RNA. Subsequently, the RNA may be translated into peptide or protein.

With respect to RNA, the term "expression" or "translation" relates to the process in the ribosomes of a cell by which a strand of mRNA directs the assembly of a sequence of amino acids to make a peptide or protein.

According to the disclosure, the term "RNA encodes" means that the RNA, if present in the appropriate environment, such as within cells of a target tissue, can direct the assembly of amino acids to produce the peptide or protein it encodes during the process of translation. In one embodiment, RNA is able to interact with the cellular translation machinery allowing translation of the peptide or protein. A cell may produce the encoded peptide or protein intracellularly (e.g. in the cytoplasm and/or in the nucleus), may secrete the encoded peptide or protein, or may produce it on the surface.

As used herein, the terms "linked," "fused", or "fusion" are used interchangeably. These terms refer to the joining together of two or more elements or components or domains.

As used herein, "half-life" refers to the time taken for the serum or plasma concentration of a compound such as a peptide or protein to reduce by 50%, in vivo, for example due to degradation and/or clearance or sequestration by natural mechanisms. An extended-PK interleukin (IL) suitable for use herein is stabilized in vivo and its half-life increased by, e.g., fusion to serum albumin (e.g., HSA or MSA), which resist degradation and/or clearance or sequestration. The half-life can be determined in any manner known perse, such as by pharmacokinetic analysis. Suitable techniques will be clear to the person skilled in the art, and may for example generally involve the steps of suitably administering a suitable dose of the amino acid sequence or compound to a subject; collecting blood samples or other samples from said subject at regular intervals; determining the level or concentration of the amino acid sequence or compound in said blood sample; and calculating, from (a plot of) the data thus obtained, the time until the level or concentration of the amino acid sequence or compound has been reduced by 50% compared to the initial level upon dosing. Further details are provided in, e.g., standard handbooks, such as Kenneth, A. et al., Chemical Stability of Pharmaceuticals: A Handbook for Pharmacists and in Peters et al., Pharmacokinetic Analysis: A Practical Approach (1996). Reference is also made to Gibaldi, M. et al., Pharmacokinetics, 2nd Rev. Edition, Marcel Dekker (1982).

Cytokines are a category of small proteins (~5-20 kDa) that are important in cell signalling. Their release has an effect on the behavior of cells around them. Cytokines are involved in autocrine signalling, paracrine signalling and endocrine signalling as immunomodulating agents. Cytokines include chemokines, interferons, interleukins, lymphokines, and tumour necrosis factors but generally not hormones or growth factors (despite some overlap in the terminology). Cytokines are produced by a broad range of cells, including immune cells like macrophages, B lymphocytes, T lymphocytes and mast cells, as well as endothelial cells, fibroblasts, and various stromal cells. A given cytokine may be produced by more than one type of cell. Cytokines act through receptors, and are especially important in the immune system; cytokines modulate the balance between humoral and cell-based immune responses, and they regulate the maturation, growth, and responsiveness of particular cell populations. Some cytokines enhance or inhibit the action of other cytokines in complex ways.

Interleukin-2 (IL2) is a cytokine that induces proliferation of antigen-activated T cells and stimulates natural killer (NK) cells. The biological activity of IL2 is mediated through a multi-subunit IL2 receptor complex (IL2R) of three polypeptide subunits that span the cell membrane: p55 (IL2Rα, the alpha subunit, also known as CD25 in humans), p75 (IL2Rβ, the beta subunit, also known as CD122 in humans) and p64 (IL2Rγ, the gamma subunit, also known as CD132 in humans). T cell response to IL2 depends on a variety of factors, including: (1) the concentration of IL2; (2) the number of IL2R molecules on the cell surface; and (3) the number of IL2R occupied by IL2 (i.e., the affinity of the binding interaction between IL2 and IL2R (Smith, "Cell Growth Signal Transduction is Quantal" In Receptor Activation by Antigens, Cytokines, Hormones, and Growth Factors 766:263-271, 1995)). The IL2:IL2R complex is internalized upon ligand binding and the different components undergo differential sorting. When administered as an intravenous (i.v.) bolus, IL2 has a rapid systemic clearance (an initial clearance phase with a half-life of 12.9 minutes followed by a slower clearance phase with a half-life of 85 minutes) (Konrad et al., Cancer Res. 50:2009-2017, 1990).

In eukaryotic cells human IL2 is synthesized as a precursor polypeptide of 153 amino acids, from which 20 amino acids are removed to generate mature secreted IL2. Recombinant human IL2 has been produced in *E. coli*, in insect cells and in mammalian COS cells.

Outcomes of systemic IL2 administration in cancer patients are far from ideal. While 15 to 20 percent of patients respond objectively to high-dose IL2, the great majority do not, and many suffer severe, life-threatening side effects, including nausea, confusion, hypotension, and septic shock. Attempts to reduce serum concentration by reducing dose and adjusting dosing regimen have been attempted, and while less toxic, such treatments were also less efficacious.

According to the disclosure, in certain embodiments, the IL2 variant polypeptides described herein comprise a pharmacokinetic modifying group. In one embodiment, the IL2 variant portion or mutein described herein is attached to a pharmacokinetic modifying group. The resulting molecule, hereafter referred to as "extended-pharmacokinetic (PK) IL2," has a prolonged circulation half-life relative to free IL2. The prolonged circulation half-life of extended-PK IL2 permits in vivo serum IL2 concentrations to be maintained within a therapeutic range, potentially leading to the enhanced activation of many types of immune cells, including T cells. Because of its favorable pharmacokinetic profile, extended-PK IL2 can be dosed less frequently and for longer periods of time when compared with unmodified IL2.

As used herein, "human IL2" or "wild type human IL2" means IL2, whether native or recombinant, having the normally occurring 133 amino acid sequence of native human IL2 (less the signal peptide, consisting of an additional 20 N-terminal amino acids), whose amino acid sequence is described in Fujita, et. al, PNAS USA, 80, 7437-7441 (1983), with or without an additional N-terminal Methionine which is necessarily included when the protein is expressed as an intracellular fraction in *E. coli*. In one embodiment, human IL2 comprises the amino acid sequence of SEQ ID NO: 17. In one embodiment, a functional variant of human IL2 comprises an amino acid sequence that is at least 80%, 81%, 82%, 83%, 84%, 85%, 86%, 87%, 88%, 89%, 90%, 91%, 92%, 93%, 94%, 95%, 96%, 97%, 98%, or 99% identical to SEQ ID NO: 17. In one embodiment, a functional variant of human IL2 binds to the IL2 receptor, in particular to the alpha subunit of the IL2 receptor.

In certain embodiments described herein, the IL2 variant portion or mutein is fused to a heterologous polypeptide (i.e., a polypeptide that is not IL2 and preferably is not a variant of IL2). The heterologous polypeptide can increase the circulating half-life of IL2. As discussed in further detail infra, the polypeptide that increases the circulating half-life may be serum albumin, such as human or mouse serum albumin.

As used herein, "IL2 mutein" means a variant of IL2 (including functional variants thereof), in particular a polypeptide wherein specific substitutions to the IL2 protein have been made. In one embodiment, substitutions to the human IL2 protein have been made at least a position that contacts the alpha subunit of the αβγ IL2 receptor complex (IL2Rαβγ). In one embodiment, such position has an acidic or basic amino acid residue in wild type human IL2, wherein if the amino acid residue is an acidic amino acid residue in wild type human IL2 the substitution is by a basic amino acid residue and if the amino acid residue is a basic amino acid residue in wild type human IL2 the substitution is by an acidic amino acid residue. Particularly preferred embodiments include the following: lysine (Lys) residue at position 35, lysine (Lys) residue at position 43, glutamic acid (Glu) residue at position 61 and glutamic acid (Glu) residue at position 62, relative to wild type human IL2 and numbered in accordance with wild type human IL2, or any combination thereof.

IL2 muteins may have an amino acid sequence identical to wild type IL2 at the other, non-substituted residues (i.e., the IL2 muteins comprise "mutCD25" mutations, e.g., those mutations in which the sequences of any one of SEQ ID NOs: 2 to 6 differ from the sequence of SEQ ID NO: 17). However, the IL2 muteins may also be characterized by amino acid insertions, deletions, substitutions and modifications at one or more sites in or at the other residues of the native IL2 polypeptide chain. In accordance with this invention any such insertions, deletions, substitutions and modifications may result in an IL2 mutein that retains affinity for IL2Rβγ while having reduced affinity for IL2Rαβγ.

For example, the IL2 muteins may also be characterized by amino acid substitutions at one or more sites in or at the other residues of the native IL2 polypeptide chain such amino acid substitutions resulting, for example, in relatively increased affinity for IL2Rβγ when compared to wild type IL2, such that IL2 mediated stimulation no longer requires engagement of the IL2Rα (i.e., the IL2 muteins in addition to the mutCD25 mutations also comprise "mutβγ" mutations, e.g., those mutations in which the sequence of SEQ ID NO: 18 differs from the sequence of SEQ ID NO: 17). Such mutants are potent IL2 signaling agonists. These mutations can be at amino acid residues that contact IL2Rβ and/or IL2Rγ.

In various embodiments, the IL2 muteins described herein can differ from wild type IL2 by a substitution of one or more of the residues at positions 24, 65, 74, 80, 81, 85, 86, 89, 92, and 93 of wild type IL2. The substituted amino acid residue(s) can be, but are not necessarily, conservative substitutions.

For example, the mutation can be: I24V, P65H, Q74R, Q74H, Q74N, Q74S, L80F, L80V, R81I, R81T, R81D, L85V, I86V, I89V, I92F, V93I.

In one embodiment, an IL2 mutein is provided wherein the mutein comprises the following set of amino acid substitutions: 80F/81D/85V/86V/92F. The mutein may further comprise the amino acid substitution 42A. The mutein may further comprise one or more of the following amino acid substitutions: 24V, 65H, 74R, 74H, 74N, 74S, 89V, 93I.

In some embodiments, an IL2 mutein is provided wherein the mutein comprises a set of amino acid substitutions selected from the group consisting of:
(i) 74N, 80F, 81D, 85V, 86V, 89V, 92F;
(ii) 74H, 80F, 81D, 85V, 86V, 92F;
(iii) 74S, 80F, 81D, 85V, 86V, 92F;
(iv) 74N, 80F, 81D, 85V, 86V, 92F;
(v) 80F, 81D, 85V, 86V, 92F;
(vi) 80F, 81D, 85V, 86V, 89V, 92F, 93I;
(vii) 18R, 22E, 80F, 81D, 85V, 86V, 89V, 92F, 93I, 126T;
(viii) 18R, 22E, 74S, 80F, 81T, 85V, 86V, 89V, 92F, 93I, 126T.

By "numbered in accordance with wild type IL2" we mean identifying a chosen amino acid with reference to the position at which that amino acid normally occurs in the mature sequence of wild type IL2. Where insertions or deletions are made to the IL2 mutein, one of skill in the art will appreciate that an amino acid normally occurring at a certain position may be shifted in position in the mutein. However, the location of the shifted amino acid can be readily determined by inspection and correlation of the flanking amino acids with those flanking the amino acid in wild type IL2.

The IL2 variant polypeptides described herein and polynucleotides coding therefor can be produced by any suitable method known in the art. Such methods include introducing appropriate nucleotide changes into the nucleic acid encoding IL2 or by in vitro synthesis of the IL2 polynucleotide or protein. For example, a DNA sequence encoding the IL2 variant polypeptide described herein may be constructed and those sequences may be expressed in a suitably transformed host or in any other suitable expression system. This method will produce the IL2 variant polypeptides described herein and/or RNA encoding therefor. However, the IL2 variant polypeptides described herein and polynucleotides coding therefor may also be produced, albeit less preferably, by chemical synthesis.

IL2 variant polypeptides described herein may bind IL2Rαβγ with an affinity that is lower than the affinity with which wild type IL2 binds IL2Rαβγ. In one embodiment, IL2 variant polypeptides described herein may bind IL2Rβγ with an affinity that is greater than the affinity with which wild type IL2 binds IL2Rβγ.

Affinity of IL2 variant polypeptides described herein to IL2Rαβγ may be at least 2-fold, at least 5-fold, at least 10-fold, at least 20-fold, at least 50-fold, or at least 100-fold lower than the affinity with which wild type IL2 binds IL2Rαβγ. Further, affinity of IL2 variant polypeptides described herein to IL2Rβγ may be at least 2-fold, at least 5-fold, at least 10-fold, at least 20-fold, at least 50-fold, or at least 100-fold greater than the affinity with which wild type IL2 binds IL2Rβγ.

IL2 variant polypeptides described herein may have an affinity towards IL2Rβγ that is at least 2-fold, at least 5-fold, at least 10-fold, at least 20-fold, at least 50-fold, or at least 100-fold higher than affinity towards IL2Rαβγ.

IL2 variant polypeptides described herein may have a decreased ability to stimulate regulatory T cells than wild type IL2, in particular when compared to the ability to stimulate effector T cells and/or NK cells.

IL2 variant polypeptides described herein may have a mutation (e.g., a deletion, addition, or substitution) of 1, 2, 3, 4, 5, 6, 7, 8, 9, 10, 1 1, 12, 13, 14, 15, 16, 17, 18, 19, 20, or more amino acid residues relative to wild type IL2.

IL2 variant polypeptides described herein may include an amino acid sequence that is at least about 50%, at least about 65%, at least about 70%, at least about 80%, at least about 85%, at least about 87%, at least about 90%, at least about 95%, at least about 97%, at least about 98%, or at least about 99% identical to wild type IL2.

In one embodiment, the IL2 variant polypeptides described herein have one or more, preferably all of the following properties:

1) Agonist action at IL2Rβγ. This property can be evaluated directly in in vitro proliferation assays with cell lines dependent on IL2.
2) Loss of capacity, as compared to wild type IL2, to stimulate in vitro and/or in vivo populations of regulatory T cells. This property can be assessed, for instance, by studying the ability of the muteins, as compared to those of wild type IL2, to induce expansion of regulatory T cells.
3) Increased therapeutic effect with respect to the native IL2 in animal models. This property can be assessed, for example, by comparing the antitumor or anti-metastatic effect of the IL2 variant polypeptides described herein and the wild type IL2 as monotherapy in transplantable tumor models (e.g. B16 melanoma). It can also be evaluated through the potentiating effect of the cellular and/or humoral response to a vaccine of interest.

Many immune cells transiently up-regulate IL2Rαβγ upon activation to increase IL2 sensitivity when mounting an immunological response, including priming of CD8 T cells. Since some IL2Rαβγ binding by IL2 may be necessary, the present invention envisions the use of a mixture of IL2Rβγ-selective IL2 variant polypeptides described herein in combination with IL2 (including functional variants thereof) that does not demonstrate preferential affinity towards IL2Rβγ, such as wild type IL2. In certain embodiments, the molar ratio of IL2Rβγ-selective IL2 variant polypeptides described herein to IL2 that does not demonstrate preferential affinity towards IL2Rβγ is from 50:1 to 1:1, 20:1 to 2:1, 10:1 to 5:1, or 5:1 to 3:1.

IL2 variant polypeptides described herein can be prepared as fusion or chimeric polypeptides that include a IL2 variant portion and a heterologous polypeptide (i.e., a polypeptide that is not IL2 or a variant thereof). The IL2 variants may be fused to an extended-PK group, which increases circulation half-life. Non-limiting examples of extended-PK groups are described infra. It should be understood that other PK groups that increase the circulation half-life of cytokines, or variants thereof, are also applicable to the present disclosure. In certain embodiments, the extended-PK group is a serum albumin domain (e.g., mouse serum albumin, human serum albumin).

As used herein, the term "PK" is an acronym for "pharmacokinetic" and encompasses properties of a compound including, by way of example, absorption, distribution, metabolism, and elimination by a subject. As used herein, an "extended-PK group" refers to a protein, peptide, or moiety that increases the circulation half-life of a biologically active molecule when fused to or administered together with the biologically active molecule. Examples of an extended-PK group include serum albumin (e.g., HSA), Fc or Fc fragments and variants thereof, transferrin and variants thereof, and human serum albumin (HSA) binders (as disclosed in U.S. Publication Nos. 2005/0287153 and 2007/0003549). Other exemplary extended-PK groups are disclosed in Kontermann, Current Opinion in Biotechnology 2011; 22: 868-876 and Kontermann, Expert Opin Biol Ther. 2016; 16: 903-15 which are herein incorporated by reference in its entirety. As used herein, an "extended-PK IL" refers to an interleukin (IL) moiety (including an IL variant moiety) in combination with an extended-PK group. In one embodiment, the extended-PK IL is a fusion protein in which an IL moiety is linked or fused to an extended-PK group. An exemplary fusion protein is an HSA/IL2 fusion in which an IL2 moiety is fused with HSA.

In certain embodiments, the serum half-life of an extended-PK IL is increased relative to the IL alone (i.e., the IL not fused to an extended-PK group). In certain embodiments, the serum half-life of the extended-PK IL is at least 20, 40, 60, 80, 100, 120, 150, 180, 200, 400, 600, 800, or 1000% longer relative to the serum half-life of the IL alone. In certain embodiments, the serum half-life of the extended-PK IL is at least 1.5-fold, 2-fold, 2.5-fold, 3-fold, 3.5 fold, 4-fold, 4.5-fold, 5-fold, 6-fold, 7-fold, 8-fold, 10-fold, 12-fold, 13-fold, 15-fold, 17-fold, 20-fold, 22-fold, 25-fold, 27-fold, 30-fold, 35-fold, 40-fold, or 50-fold greater than the serum half-life of the IL alone. In certain embodiments, the serum half-life of the extended-PK IL is at least 10 hours, 15 hours, 20 hours, 25 hours, 30 hours, 35 hours, 40 hours, 50 hours, 60 hours, 70 hours, 80 hours, 90 hours, 100 hours, 110 hours, 120 hours, 130 hours, 135 hours, 140 hours, 150 hours, 160 hours, or 200 hours.

In certain embodiments, the extended-PK group includes serum albumin, or fragments thereof or variants of the serum albumin or fragments thereof (all of which for the purpose of the present disclosure are comprised by the term "albumin"). Polypeptides described herein may be fused to albumin (or a fragment or variant thereof) to form albumin fusion proteins. Such albumin fusion proteins are described in U.S. Publication No. 20070048282.

As used herein, "albumin fusion protein" refers to a protein formed by the fusion of at least one molecule of albumin (or a fragment or variant thereof) to at least one molecule of a protein such as a therapeutic protein, in particular IL2 (or variant thereof). The albumin fusion protein may be generated by translation of a nucleic acid in which a polynucleotide encoding a therapeutic protein is joined in-frame with a polynucleotide encoding an albumin. The therapeutic protein and albumin, once part of the albumin fusion protein, may each be referred to as a "portion", "region" or "moiety" of the albumin fusion protein (e.g., a "therapeutic protein portion" or an "albumin protein portion"). In a highly preferred embodiment, an albumin fusion protein comprises at least one molecule of a therapeutic protein (including, but not limited to a mature form of the therapeutic protein) and at least one molecule of albumin (including but not limited to a mature form of albumin). In one embodiment, an albumin fusion protein is processed by a host cell such as a cell of the target organ for administered RNA, e.g. a liver cell, and secreted into the circulation. Processing of the nascent albumin fusion protein that occurs in the secretory pathways of the host cell used for expression of the RNA may include, but is not limited to signal peptide cleavage; formation of disulfide bonds; proper folding; addition and processing of carbohydrates (such as for example, N- and O-linked glycosylation); specific proteolytic cleavages; and/or assembly into multimeric proteins. An albumin fusion protein is preferably encoded by RNA in a non-processed form which in particular has a signal peptide at its N-terminus and following secretion by a cell is preferably present in the processed form wherein in particular the signal peptide has been cleaved off. In a most preferred embodiment, the "processed form of an albumin fusion protein" refers to an albumin fusion protein product which has undergone N-terminal signal peptide cleavage, herein also referred to as a "mature albumin fusion protein".

In preferred embodiments, albumin fusion proteins comprising a therapeutic protein have a higher plasma stability compared to the plasma stability of the same therapeutic protein when not fused to albumin. Plasma stability typically refers to the time period between when the therapeutic protein is administered in vivo and carried into the bloodstream and when the therapeutic protein is degraded and cleared from the bloodstream, into an organ, such as the kidney or liver, that ultimately clears the therapeutic protein from the body. Plasma stability is calculated in terms of the half-life of the therapeutic protein in the bloodstream. The half-life of the therapeutic protein in the bloodstream can be readily determined by common assays known in the art.

As used herein, "albumin" refers collectively to albumin protein or amino acid sequence, or an albumin fragment or variant, having one or more functional activities (e.g., biological activities) of albumin. In particular, "albumin" refers to human albumin or fragments or variants thereof especially the mature form of human albumin, or albumin from other vertebrates or fragments thereof, or variants of these molecules.

The albumin may be derived from any vertebrate, especially any mammal, for example human, cow, sheep, or pig. Non-mammalian albumins include, but are not limited to, hen and salmon. The albumin portion of the albumin fusion protein may be from a different animal than the therapeutic protein portion.

In certain embodiments, the albumin is human serum albumin (HSA), or fragments or variants thereof, such as those disclosed in U.S. Pat. No. 5,876,969, WO 2011/124718, WO 2013/075066, and WO 2011/0514789.

The terms, human serum albumin (HSA) and human albumin (HA) are used interchangeably herein. The terms, "albumin and "serum albumin" are broader, and encompass human serum albumin (and fragments and variants thereof) as well as albumin from other species (and fragments and variants thereof).

As used herein, a fragment of albumin sufficient to prolong the therapeutic activity or plasma stability of the therapeutic protein refers to a fragment of albumin sufficient in length or structure to stabilize or prolong the therapeutic activity or plasma stability of the protein so that the plasma stability of the therapeutic protein portion of the albumin fusion protein is prolonged or extended compared to the plasma stability in the non-fusion state.

The albumin portion of the albumin fusion proteins may comprise the full length of the albumin sequence, or may include one or more fragments thereof that are capable of stabilizing or prolonging the therapeutic activity or plasma stability. Such fragments may be of 10 or more amino acids in length or may include about 15, 20, 25, 30, 50, or more contiguous amino acids from the albumin sequence or may include part or all of specific domains of albumin. For instance, one or more fragments of HSA spanning the first two immunoglobulin-like domains may be used. In a preferred embodiment, the HSA fragment is the mature form of HSA.

Generally speaking, an albumin fragment or variant will be at least 100 amino acids long, preferably at least 150 amino acids long.

According to the disclosure, albumin may be naturally occurring albumin or a fragment or variant thereof. Albumin may be human albumin and may be derived from any vertebrate, especially any mammal. In one embodiment, albumin comprises the amino acid sequence of SEQ ID NO: 21 or an amino acid sequence that is at least 80%, 81%, 82%, 83%, 84%, 85%, 86%, 87%, 88%, 89%, 90%, 91%, 92%, 93%, 94%, 95%, 96%, 97%, 98%, or 99% identical to SEQ ID NO: 21.

Preferably, the albumin fusion protein comprises albumin as the N-terminal portion, and a therapeutic protein as the C-terminal portion. Alternatively, an albumin fusion protein comprising albumin as the C-terminal portion, and a therapeutic protein as the N-terminal portion may also be used. In other embodiments, the albumin fusion protein has a therapeutic protein fused to both the N-terminus and the C-terminus of albumin. In a preferred embodiment, the therapeutic proteins fused at the N- and C-termini are the same therapeutic proteins. In another preferred embodiment, the therapeutic proteins fused at the N- and C-termini are different therapeutic proteins. In one embodiment, the different therapeutic proteins may be useful to treat or prevent the same or a related disease, disorder, or condition. In one embodiment, the different therapeutic proteins are both cytokines, wherein one of the different therapeutic proteins is an IL2 variant and the other is preferably an interferon such as IFNβ. In one embodiment, the albumin fusion protein has IFNβ fused to the N-terminus and an IL2 variant fused to the C-terminus of albumin.

In one embodiment, the therapeutic protein(s) is (are) joined to the albumin through (a) peptide linker(s). A linker peptide between the fused portions may provide greater physical separation between the moieties and thus maximize the accessibility of the therapeutic protein portion, for instance, for binding to its cognate receptor. The linker peptide may consist of amino acids such that it is flexible or more rigid. The linker sequence may be cleavable by a protease or chemically.

As used herein, the term "Fc region" refers to the portion of a native immunoglobulin formed by the respective Fc domains (or Fc moieties) of its two heavy chains. As used herein, the term "Fc domain" refers to a portion or fragment of a single immunoglobulin (Ig) heavy chain wherein the Fc domain does not comprise an Fv domain. In certain embodiments, an Fc domain begins in the hinge region just upstream of the papain cleavage site and ends at the C-terminus of the antibody. Accordingly, a complete Fc domain comprises at least a hinge domain, a CH2 domain, and a CH3 domain. In certain embodiments, an Fc domain comprises at least one of: a hinge (e.g., upper, middle, and/or lower hinge region) domain, a CH2 domain, a CH3 domain, a CH4 domain, or a variant, portion, or fragment thereof. In certain embodiments, an Fc domain comprises a complete Fc domain (i.e., a hinge domain, a CH2 domain, and a CH3 domain). In certain embodiments, an Fc domain comprises a hinge domain (or portion thereof) fused to a CH3 domain (or portion thereof). In certain embodiments, an Fc domain comprises a CH2 domain (or portion thereof) fused to a CH3 domain (or portion thereof). In certain embodiments, an Fc domain consists of a CH3 domain or portion thereof. In certain embodiments, an Fc domain consists of a hinge domain (or portion thereof) and a CH3 domain (or portion thereof). In certain embodiments, an Fc domain consists of a CH2 domain (or portion thereof) and a CH3 domain. In certain embodiments, an Fc domain consists of a hinge domain (or portion thereof) and a CH2 domain (or portion thereof). In certain embodiments, an Fc domain lacks at least a portion of a CH2 domain (e.g., all or part of a CH2 domain). An Fc domain herein generally refers to a polypeptide comprising all or part of the Fc domain of an immunoglobulin heavy-chain. This includes, but is not limited to, polypeptides comprising the entire CH1, hinge, CH2, and/or CH3 domains as well as fragments of such peptides comprising only, e.g., the hinge, CH2, and CH3 domain. The Fc domain may be derived from an immunoglobulin of any species and/or any subtype, including, but not limited to, a human IgG1, IgG2, IgG3, IgG4, IgD, IgA, IgE, or IgM antibody.

The Fc domain encompasses native Fc and Fc variant molecules. As set forth herein, it will be understood by one of ordinary skill in the art that any Fc domain may be modified such that it varies in amino acid sequence from the native Fc domain of a naturally occurring immunoglobulin molecule. In certain embodiments, the Fc domain has reduced effector function (e.g., FcγR binding).

The Fc domains of a polypeptide described herein may be derived from different immunoglobulin molecules. For example, an Fc domain of a polypeptide may comprise a CH2 and/or CH3 domain derived from an IgG1 molecule and a hinge region derived from an IgG3 molecule. In another example, an Fc domain can comprise a chimeric hinge region derived, in part, from an IgG1 molecule and, in part, from an IgG3 molecule. In another example, an Fc domain can comprise a chimeric hinge derived, in part, from an IgG1 molecule and, in part, from an IgG4 molecule.

In certain embodiments, an extended-PK group includes an Fc domain or fragments thereof or variants of the Fc domain or fragments thereof (all of which for the purpose of the present disclosure are comprised by the term "Fc domain"). The Fc domain does not contain a variable region that binds to antigen. Fc domains suitable for use in the present disclosure may be obtained from a number of different sources. In certain embodiments, an Fc domain is derived from a human immunoglobulin. In certain embodiments, the Fc domain is from a human IgG1 constant region. It is understood, however, that the Fc domain may be derived from an immunoglobulin of another mammalian species, including for example, a rodent (e.g. a mouse, rat, rabbit, guinea pig) or non-human primate (e.g. chimpanzee, macaque) species.

Moreover, the Fc domain (or a fragment or variant thereof) may be derived from any immunoglobulin class, including IgM, IgG, IgD, IgA, and IgE, and any immunoglobulin isotype, including IgG1, IgG2, IgG3, and IgG4.

A variety of Fc domain gene sequences (e.g., mouse and human constant region gene sequences) are available in the form of publicly accessible deposits. Constant region domains comprising an Fc domain sequence can be selected lacking a particular effector function and/or with a particular modification to reduce immunogenicity. Many sequences of antibodies and antibody-encoding genes have been published and suitable Fc domain sequences (e.g. hinge, CH2, and/or CH3 sequences, or fragments or variants thereof) can be derived from these sequences using art recognized techniques.

In certain embodiments, the extended-PK group is a serum albumin binding protein such as those described in US2005/0287153, US2007/0003549, US2007/0178082, US2007/0269422, US2010/0113339, WO2009/083804, and WO2009/133208, which are herein incorporated by reference in their entirety. In certain embodiments, the extended-PK group is transferrin, as disclosed in U.S. Pat. Nos. 7,176,278 and 8,158,579, which are herein incorporated by reference in their entirety. In certain embodiments, the extended-PK group is a serum immunoglobulin binding protein such as those disclosed in US2007/0178082, which is herein incorporated by reference in its entirety. In certain embodiments, the extended-PK group is a fibronectin (Fn)-based scaffold domain protein that binds to serum albumin, such as those disclosed in US2012/0094909, which is herein incorporated by reference in its entirety. Methods of making fibronectin-based scaffold domain proteins are also disclosed in US2012/0094909. A non-limiting example of a Fn3-based extended-PK group is Fn3(HSA), i.e., a Fn3 protein that binds to human serum albumin.

In certain aspects, the extended-PK IL, suitable for use according to the disclosure, can employ one or more peptide linkers. As used herein, the term "peptide linker" refers to a peptide or polypeptide sequence which connects two or more domains (e.g., the extended-PK moiety and an IL moiety such as IL2) in a linear amino acid sequence of a polypeptide chain. For example, peptide linkers may be used to connect an IL2 moiety to a HSA domain.

Linkers suitable for fusing the extended-PK group to e.g. IL2 are well known in the art. Exemplary linkers include glycine-serine-polypeptide linkers, glycine-proline-polypeptide linkers, and proline-alanine polypeptide linkers. In certain embodiments, the linker is a glycine-serine-polypeptide linker, i.e., a peptide that consists of glycine and serine residues.

In addition to, or in place of, the heterologous polypeptides described above, an IL2 variant polypeptide described herein can contain sequences encoding a "marker" or "reporter". Examples of marker or reporter genes include R-lactamase, chloramphenicol acetyltransferase (CAT), adenosine deaminase (ADA), aminoglycoside phosphotransferase, dihydrofolate reductase (DHFR), hygromycin-B-hosphotransferase (HPH), thymidine kinase (TK), β-galactosidase, and xanthine guanine phosphoribosyltransferase (XGPRT).

The peptide and protein antigens suitable for use according to the disclosure typically include a peptide or protein comprising an epitope for inducing an immune response. The peptide or protein or epitope may be derived from a target antigen, i.e. the antigen against which an immune response is to be elicited. For example, the peptide or protein antigen or the epitope contained within the peptide or protein antigen may be a target antigen or a fragment or variant of a target antigen.

A peptide and protein antigen administered according to the disclosure (either perse or as RNA encoding the peptide and protein antigen), i.e., a vaccine antigen, preferably results in stimulation, priming and/or expansion of T cells in the subject being administered the antigen. Said stimulated, primed and/or expanded T cells are preferably directed against a target antigen, in particular a target antigen expressed by diseased cells, tissues and/or organs, i.e., a disease-associated antigen. Thus, a vaccine antigen may comprise the disease-associated antigen, or a fragment or variant thereof. In one embodiment, such fragment or variant is immunologically equivalent to the disease-associated antigen. In the context of the present disclosure, the term "fragment of an antigen" or "variant of an antigen" means an agent which results in stimulation, priming and/or expansion of T cells which stimulated, primed and/or expanded T cells target the antigen, i.e. a disease-associated antigen, in particular when presented by diseased cells, tissues and/or organs. Thus, the vaccine antigen administered according to the disclosure may correspond to or may comprise the disease-associated antigen, may correspond to or may comprise a fragment of the disease-associated antigen or may correspond to or may comprise an antigen which is homologous to the disease-associated antigen or a fragment thereof. If the vaccine antigen administered according to the disclosure comprises a fragment of the disease-associated antigen or an amino acid sequence which is homologous to a fragment of the disease-associated antigen said fragment or amino acid sequence may comprise an epitope such as a T cell epitope of the disease-associated antigen or a sequence which is homologous to an epitope such as a T cell epitope of the disease-associated antigen. Thus, according to the disclosure, an antigen administered may comprise an immunogenic fragment of a disease-associated antigen or an amino acid sequence being homologous to an immunogenic fragment of a disease-associated antigen. An "immunogenic fragment of an antigen" according to the disclosure preferably relates to a fragment of an antigen which is capable of stimulating, priming and/or expanding T cells when presented in the context of MHC molecules. It is preferred that the vaccine antigen (similar to the disease-associated antigen) can be presented by a cell such as an antigen-presenting cell so as to provide the relevant epitope for binding by T cells. The vaccine antigen administered according to the disclosure may be a recombinant antigen.

The term "immunologically equivalent" means that the immunologically equivalent molecule such as the immunologically equivalent amino acid sequence exhibits the same or essentially the same immunological properties and/or exerts the same or essentially the same immunological effects, e.g., with respect to the type of the immunological effect. In the context of the present disclosure, the term "immunologically equivalent" is preferably used with respect to the immunological effects or properties of antigens or antigen variants used for immunization. For example, an amino acid sequence is immunologically equivalent to a reference amino acid sequence if said amino acid sequence when exposed to the immune system of a subject such as T cells binding to the reference amino acid sequence or cells expressing the reference amino acid sequence induces an immune reaction having a specificity of reacting with the reference amino acid sequence. Thus, a molecule which is immunologically equivalent to an antigen exhibits the same or essentially the same properties and/or exerts the same or essentially the same effects regarding the stimulation, priming and/or expansion of T cells as the antigen to which the T cells are targeted.

The term "priming" refers to a process wherein a T cell has its first contact with its specific antigen and causes differentiation into effector T cells.

The term "clonal expansion" or "expansion" refers to a process wherein a specific entity is multiplied. In the context of the present disclosure, the term is preferably used in the context of an immunological response in which lymphocytes are stimulated by an antigen, proliferate, and the specific lymphocyte recognizing said antigen is amplified. Preferably, clonal expansion leads to differentiation of the lymphocytes.

The term "antigen" relates to an agent comprising an epitope against which an immune response can be generated. The term "antigen" includes, in particular, proteins and peptides. In one embodiment, an antigen is presented by cells of the immune system such as antigen presenting cells like dendritic cells or macrophages. An antigen or a processing product thereof such as a T cell epitope is in one embodiment bound by a T or B cell receptor, or by an immunoglobulin molecule such as an antibody. Accordingly, an antigen or a processing product thereof may react specifically with antibodies or T-lymphocytes (T cells). In one embodiment, an antigen is a disease-associated antigen, such as a tumor antigen, a viral antigen, or a bacterial antigen and an epitope is derived from such antigen.

The term "disease-associated antigen" is used in its broadest sense to refer to any antigen associated with a disease. A disease-associated antigen is a molecule which contains epitopes that will stimulate a host's immune system to make a cellular antigen-specific immune response and/or a humoral antibody response against the disease. The disease-associated antigen or an epitope thereof may therefore be used for therapeutic purposes. Disease-associated antigens may be associated with infection by microbes, typically microbial antigens, or associated with cancer, typically tumors.

The term "tumor antigen" refers to a constituent of cancer cells which may be derived from the cytoplasm, the cell surface and the cell nucleus. In particular, it refers to those antigens which are produced intracellularly or as surface antigens on tumor cells. A tumor antigen is typically expressed preferentially by cancer cells (e.g., it is expressed at higher levels in cancer cells than on non-cancer cells) and in some instances it is expressed solely by cancer cells. Examples of tumor antigens include, without limitation, p53, ART-4, BAGE, beta-catenin/m, Bcr-abL CAMEL, CAP-1, CASP-8, CDC27/m, CDK4/m, CEA, the cell surface proteins of the claudin family, such as CLAUDIN-6, CLAUDIN-18.2 and CLAUDIN-12, c-MYC, CT, Cyp-B, DAM, ELF2M, ETV6-AML1, G250, GAGE, GnT-V, Gap 100, HAGE, HER-2/neu, HPV-E7, HPV-E6, HAST-2, hTERT (or hTRT), LAGE, LDLR/FUT, MAGE-A, preferably MAGE-A1, MAGE-A2, MAGE-A3, MAGE-A4, MAGE-A5, MAGE-A6, MAGE-A7, MAGE-A8, MAGE-A9, MAGE-A 10, MAGE-A 1 1, or MAGE-A12, MAGE-B, MAGE-C, MART-1/Melan-A, MC1R, Myosin/m, MUC1, MUM-1, MUM-2, MUM-3, NA88-A, NF1, NY-ESO-1, NY-BR-1, pI90 minor BCR-abL, Pml/RARa, PRAME, proteinase 3, PSA, PSM, RAGE, RU1 or RU2, SAGE, SART-1 or SART-3, SCGB3A2, SCP1, SCP2, SCP3, SSX, SURVIVIN, TEL/AML1, TPI/m, TRP-1, TRP-2, TRP-2/INT2, TPTE, WT, and WT-1.

The term "viral antigen" refers to any viral component having antigenic properties, i.e. being able to provoke an immune response in an individual. The viral antigen may be a viral ribonucleoprotein or an envelope protein.

The term "bacterial antigen" refers to any bacterial component having antigenic properties, i.e. being able to provoke an immune response in an individual. The bacterial antigen may be derived from the cell wall or cytoplasm membrane of the bacterium.

The term "epitope" refers to a part or fragment a molecule such as an antigen that is recognized by the immune system. For example, the epitope may be recognized by T cells, B cells or antibodies. An epitope of an antigen may include a continuous or discontinuous portion of the antigen and may be between about 5 and about 100, such as between about 5 and about 50, more preferably between about 8 and about 30, most preferably between about 10 and about 25 amino acids in length, for example, the epitope may be preferably 9, 10, 11, 12, 13, 14, 15, 16, 17, 18, 19, 20, 21, 22, 23, 24, or 25 amino acids in length. In one embodiment, an epitope is between about 10 and about 25 amino acids in length. The term "epitope" includes T cell epitopes.

The term "T cell epitope" refers to a part or fragment of a protein that is recognized by a T cell when presented in the context of MHC molecules. The term "major histocompatibility complex" and the abbreviation "MHC" includes MHC class I and MHC class II molecules and relates to a complex of genes which is present in all vertebrates. MHC proteins or molecules are important for signaling between lymphocytes and antigen presenting cells or diseased cells in immune reactions, wherein the MHC proteins or molecules bind peptide epitopes and present them for recognition by T cell receptors on T cells. The proteins encoded by the MHC are expressed on the surface of cells, and display both self-antigens (peptide fragments from the cell itself) and non-self-antigens (e.g., fragments of invading microorganisms) to a T cell. In the case of class I MHC/peptide complexes, the binding peptides are typically about 8 to about 10 amino acids long although longer or shorter peptides may be effective. In the case of class II MHC/peptide complexes, the binding peptides are typically about 10 to about 25 amino acids long and are in particular about 13 to about 18 amino acids long, whereas longer and shorter peptides may be effective.

The terms "T cell" and "T lymphocyte" are used interchangeably herein and include T helper cells (CD4+ T cells) and cytotoxic T cells (CTLs, CD8+ T cells) which comprise cytolytic T cells. The term "antigen-specific T cell" or similar terms relate to a T cell which recognizes the antigen to which the T cell is targeted, in particular when presented on the surface of antigen presenting cells or diseased cells such as cancer cells in the context of MHC molecules and preferably exerts effector functions of T cells. T cells are considered to be specific for antigen if the cells kill target cells expressing an antigen. T cell specificity may be evaluated using any of a variety of standard techniques, for example, within a chromium release assay or proliferation assay. Alternatively, synthesis of lymphokines (such as interferon-γ) can be measured.

"Regulatory T cells" or "Tregs" are a subpopulation of T cells that modulate the immune system, maintain tolerance to self-antigens, and prevent autoimmune disease. Tregs are immunosuppressive and generally suppress or downregulate induction and proliferation of effector T cells. Tregs express the biomarkers CD4, FoxP3, and CD25.

As used herein, the term "naive T cell" refers to mature T cells that, unlike activated or memory T cells, have not encountered their cognate antigen within the periphery. Naïve T cells are commonly characterized by the surface expression of L-selectin (CD62L), the absence of the activation markers CD25, CD44 or CD69 and the absence of the memory CD45RO isoform.

As used herein, the term "memory T cells" refers to a subgroup or subpopulation of T cells that have previously encountered and responded to their cognate antigen. At a second encounter with the antigen, memory T cells can reproduce to mount a faster and stronger immune response than the first time the immune system responded to the antigen. Memory T cells may be either CD4+ or CD8+ and usually express CD45RO.

As used herein, the term "NK cell" or "Natural Killer cell" refer to a subset of peripheral blood lymphocytes defined by the expression of CD56 or CD16 and the absence of the T cell receptor (CD3). As provided herein, the NK cell can also be differentiated from a stem cell or progenitor cell.

In one embodiment, the target antigen is a tumor antigen and the peptide or protein comprising an epitope or a fragment thereof (e.g., an epitope) is derived from the tumor antigen. The tumor antigen may be a "standard" antigen, which is generally known to be expressed in various cancers. The tumor antigen may also be a "neo-antigen", which is specific to an individual's tumor and has not been previously recognized by the immune system. A neo-antigen or neo-epitope may result from one or more cancer-specific mutations in the genome of cancer cells resulting in amino acid changes. If the tumor antigen is a neo-antigen, the peptide or protein comprising an epitope preferably comprises an epitope or a fragment of said neo-antigen comprising one or more amino acid changes.

Cancer mutations vary with each individual. Thus, cancer mutations that encode novel epitopes (neo-epitopes) represent attractive targets in the development of vaccine compositions and immunotherapies. The efficacy of tumor immunotherapy relies on the selection of cancer-specific antigens and epitopes capable of inducing a potent immune response within a host. RNA can be used to deliver patient-specific tumor epitopes to a patient. Dendritic cells (DCs) residing in the spleen represent antigen-presenting cells of particular interest for RNA expression of immunogenic epitopes or antigens such as tumor epitopes.

The use of multiple epitopes has been shown to promote therapeutic efficacy in tumor vaccine compositions. Rapid sequencing of the tumor mutanome may provide multiple epitopes for individualized vaccines which can be encoded by RNA described herein, e.g., as a single polypeptide wherein the epitopes are optionally separated by linkers. In certain embodiments of the present disclosure, the RNA encodes at least one epitope, at least two epitopes, at least three epitopes, at least four epitopes, at least five epitopes, at least six epitopes, at least seven epitopes, at least eight epitopes, at least nine epitopes, or at least ten epitopes. Exemplary embodiments include RNA that encodes at least five epitopes (termed a "pentatope") and RNA that encodes at least ten epitopes (termed a "decatope").

The peptide and protein antigen can be 2-100 amino acids, including for example, 5 amino acids, 10 amino acids, 15 amino acids, 20 amino acids, 25 amino acids, 30 amino acids, 35 amino acids, 40 amino acids, 45 amino acids, or 50 amino acids in length. In some embodiments, a peptide can be greater than 50 amino acids. In some embodiments, the peptide can be greater than 100 amino acids.

The peptide or protein antigen can be any peptide or protein that can induce or increase the ability of the immune system to develop antibodies and T cell responses to the peptide or protein.

In certain embodiments, immune checkpoint inhibitors are used in combination with other therapeutic agents described herein (e.g., RNA encoding an interleukin (IL)-2 variant polypeptide and optionally RNA encoding a peptide or protein comprising an epitope).

As used herein, "immune checkpoint" refers to co-stimulatory and inhibitory signals that regulate the amplitude and quality of T cell receptor recognition of an antigen. In certain embodiments, the immune checkpoint is an inhibitory signal. In certain embodiments, the inhibitory signal is the interaction between PD-1 and PD-L1. In certain embodiments, the inhibitory signal is the interaction between CTLA-4 and CD80 or CD86 to displace CD28 binding. In certain embodiments the inhibitory signal is the interaction between LAG3 and MHC class II molecules. In certain embodiments, the inhibitory signal is the interaction between TIM3 and galectin 9.

As used herein, "immune checkpoint inhibitor" refers to a molecule that totally or partially reduces, inhibits, interferes with or modulates one or more checkpoint proteins. In certain embodiments, the immune checkpoint inhibitor prevents inhibitory signals associated with the immune checkpoint. In certain embodiments, the immune checkpoint inhibitor is an antibody, or fragment thereof that disrupts inhibitory signaling associated with the immune checkpoint. In certain embodiments, the immune checkpoint inhibitor is a small molecule that disrupts inhibitory signaling. In certain embodiments, the immune checkpoint inhibitor is an antibody, fragment thereof, or antibody mimic, that prevents the interaction between checkpoint blocker proteins, e.g., an antibody, or fragment thereof, that prevents the interaction between PD-1 and PD-L1. In certain embodiments, the immune checkpoint inhibitor is an antibody, or fragment thereof, that prevents the interaction between CTLA-4 and CD80 or CD86. In certain embodiments, the immune checkpoint inhibitor is an antibody, or fragment thereof, that prevents the interaction between LAG3 and its ligands, or TIM-3 and its ligands. The checkpoint inhibitor may also be in the form of the soluble form of the molecules (or variants thereof) themselves, e.g., a soluble PD-L1 or PD-L1 fusion.

The "Programmed Death-1 (PD-1)" receptor refers to an immuno-inhibitory receptor belonging to the CD28 family. PD-1 is expressed predominantly on previously activated T cells in vivo, and binds to two ligands, PD-L1 and PD-L2. The term "PD-1" as used herein includes human PD-1 (hPD-1), variants, isoforms, and species homologs of hPD-1, and analogs having at least one common epitope with hPD-1.

"Programmed Death Ligand-1 (PD-L1)" is one of two cell surface glycoprotein ligands for PD-1 (the other being PD-L2) that downregulates T cell activation and cytokine secretion upon binding to PD-1. The term "PD-L1" as used herein includes human PD-L1 (hPD-L1), variants, isoforms, and species homologs of hPD-L1, and analogs having at least one common epitope with hPD-L1.

"Cytotoxic T Lymphocyte Associated Antigen-4 (CTLA-4)" is a T cell surface molecule and is a member of the immunoglobulin superfamily. This protein downregulates the immune system by binding to CD80 and CD86. The term "CTLA-4" as used herein includes human CTLA-4 (hCTLA-4), variants, isoforms, and species homologs of hCTLA-4, and analogs having at least one common epitope with hCTLA-4.

"Lymphocyte Activation Gene-3 (LAG3)" is an inhibitory receptor associated with inhibition of lymphocyte activity by binding to MHC class II molecules. This receptor enhances the function of Treg cells and inhibits CD8+ effector T cell function. The term "LAG3" as used herein includes human LAG3 (hLAG3), variants, isoforms, and species homologs of hLAG3, and analogs having at least one common epitope.

"T Cell Membrane Protein-3 (TIM3)" is an inhibitory receptor involved in the inhibition of lymphocyte activity by inhibition of TH1 cells responses. Its ligand is galectin 9, which is upregulated in various types of cancers. The term "TIM3" as used herein includes human TIM3 (hTIM3), variants, isoforms, and species homologs of hTIM3, and analogs having at least one common epitope.

The "B7 family" refers to inhibitory ligands with undefined receptors. The B7 family encompasses B7-H3 and B7-H4, both upregulated on tumor cells and tumor infiltrating cells.

In certain embodiments, the immune checkpoint inhibitor suitable for use in the methods disclosed herein, is an antagonist of inhibitory signals, e.g., an antibody which targets, for example, PD-1, PD-L1, CTLA-4, LAG3, B7-H3, B7-H4, or TIM3. These ligands and receptors are reviewed in Pardoll, D., Nature. 12: 252-264, 2012.

In certain embodiments, the immune checkpoint inhibitor is an antibody or an antigen-binding portion thereof, that disrupts or inhibits signaling from an inhibitory immunoregulator. In certain embodiments, the immune checkpoint inhibitor is a small molecule that disrupts or inhibits signaling from an inhibitory immunoregulator.

In certain embodiments, the inhibitory immunoregulator is a component of the PD-1/PD-L1 signaling pathway. Accordingly, certain embodiments of the disclosure provide for administering to a subject an antibody or an antigen-binding portion thereof that disrupts the interaction between the PD-1 receptor and its ligand, PD-L1. Antibodies which bind to PD-1 and disrupt the interaction between the PD-1 and its ligand, PD-L1, are known in the art. In certain embodiments, the antibody or antigen-binding portion thereof binds specifically to PD-1. In certain embodiments, the antibody or antigen-binding portion thereof binds specifically to PD-L1 and inhibits its interaction with PD-1, thereby increasing immune activity.

In certain embodiments, the inhibitory immunoregulator is a component of the CTLA4 signaling pathway. Accordingly, certain embodiments of the disclosure provide for administering to a subject an antibody or an antigen-binding portion thereof that targets CTLA4 and disrupts its interaction with CD80 and CD86.

In certain embodiments, the inhibitory immunoregulator is a component of the LAG3 (lymphocyte activation gene 3) signaling pathway. Accordingly, certain embodiments of the disclosure provide for administering to a subject an antibody or an antigen-binding portion thereof that targets LAG3 and disrupts its interaction with MHC class II molecules.

In certain embodiments, the inhibitory immunoregulator is a component of the B7 family signaling pathway. In certain embodiments, the B7 family members are B7-H3 and B7-H4. Accordingly, certain embodiments of the disclosure provide for administering to a subject an antibody or an antigen-binding portion thereof that targets B7-H3 or H4. The B7 family does not have any defined receptors but these ligands are upregulated on tumor cells or tumor-infiltrating cells. Preclinical mouse models have shown that blockade of these ligands can enhance anti-tumor immunity.

In certain embodiments, the inhibitory immunoregulator is a component of the TIM3 (T cell membrane protein 3) signaling pathway. Accordingly, certain embodiments of the disclosure provide for administering to a subject an antibody or an antigen-binding portion thereof that targets TIM3 and disrupts its interaction with galectin 9.

It will be understood by one of ordinary skill in the art that other immune checkpoint targets can also be targeted by antagonists or antibodies, provided that the targeting results in the stimulation of an immune response such as an anti-tumor immune response as reflected in, e.g., an increase in T cell proliferation, enhanced T cell activation, and/or increased cytokine production (e.g., IFN-γ, IL2).

According to the disclosure, the term "antibody" refers to a glycoprotein comprising at least two heavy (H) chains and two light (L) chains inter-connected by disulfide bonds. The term "antibody" includes monoclonal antibodies, recombinant antibodies, human antibodies, humanized antibodies and chimeric antibodies. Each heavy chain is comprised of a heavy chain variable region (abbreviated herein as VH) and a heavy chain constant region. Each light chain is comprised of a light chain variable region (abbreviated herein as VL) and a light chain constant region. The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, FR4. The variable regions of the heavy and light chains contain a binding domain that interacts with an antigen. The constant regions of the antibodies may mediate the binding of the immunoglobulin to host tissues or factors, including various cells of the immune system (e.g., effector cells) and the first component (Clq) of the classical complement system.

Antibodies may be derived from different species, including but not limited to mouse, rat, rabbit, guinea pig and human.

Antibodies described herein include IgA such as IgA1 or IgA2, IgG1, IgG2, IgG3, IgG4, IgE, IgM, and IgD antibodies. In various embodiments, the antibody is an IgG1 antibody, more particularly an IgG1, kappa or IgG1, lambda isotype (i.e. IgG1, K, A), an IgG2a antibody (e.g. IgG2a, K, A), an IgG2b antibody (e.g. IgG2b, K, A), an IgG3 antibody (e.g. IgG3, K, A) or an IgG4 antibody (e.g. IgG4, K, A).

The terms "antigen-binding portion" of an antibody (or simply "binding portion") or "antigen-binding fragment" of an antibody (or simply "binding fragment") or similar terms refer to one or more fragments of an antibody that retain the ability to specifically bind to an antigen. It has been shown that the antigen-binding function of an antibody can be performed by fragments of a full-length antibody. Examples of binding fragments encompassed within the term "antigen-binding portion" of an antibody include (i) Fab fragments, monovalent fragments consisting of the VL, VH, CL and CH domains; (ii) F(ab')2 fragments, bivalent fragments comprising two Fab fragments linked by a disulfide bridge at the hinge region; (iii) Fd fragments consisting of the VH and CH domains; (iv) Fv fragments consisting of the VL and VH domains of a single arm of an antibody, (v) dAb fragments (Ward et al., (1989) Nature 341: 544-546), which consist of a VH domain; (vi) isolated complementarity determining regions (CDR), and (vii) combinations of two or more isolated CDRs which may optionally be joined by a synthetic linker. Furthermore, although the two domains of the Fv fragment, VL and VH, are coded for by separate genes, they can be joined, using recombinant methods, by a synthetic linker that enables them to be made as a single protein chain in which the VL and VH regions pair to form monovalent molecules (known as single chain Fv (scFv); see e.g., Bird et al. (1988) Science 242: 423-426; and Huston et al. (1988) Proc. Natl. Acad. Sci. USA 85: 5879-5883). Such single chain antibodies are also intended to be encompassed within the term "antigen-binding fragment" of an antibody. A further example is binding-domain immunoglobulin fusion proteins comprising (i) a binding domain polypeptide that is fused to an immunoglobulin hinge region polypeptide, (ii) an immunoglobulin heavy chain CH2 constant region fused to the hinge region, and (iii) an immunoglobulin heavy chain CH3 constant region fused to the CH2 constant region. The binding domain polypeptide can be a heavy chain variable region or a light chain variable region. The binding-domain immunoglobulin fusion proteins are further disclosed in US 2003/0118592 and US 2003/0133939. These antibody fragments are obtained using conventional techniques known to those with skill in the art, and the fragments are screened for utility in the same manner as are intact antibodies.

It is particularly preferred according to the invention that the peptides, proteins or polypeptides described herein, in particular the IL2 variant polypeptides and/or antigens, are administered in the form of RNA encoding the peptides, proteins or polypeptides described herein. In one embodiment, different peptides, proteins or polypeptides described herein are encoded by different RNA molecules.

According to the disclosure, after administration of the RNA described herein, at least a portion of the RNA is delivered to a target cell. In one embodiment, at least a portion of the RNA is delivered to the cytosol of the target cell. In one embodiment, the RNA is translated by the target cell to produce the encoded peptide or protein.

Some aspects of the disclosure involve the targeted delivery of the RNA disclosed herein (RNA encoding an IL2 variant polypeptide and optionally RNA encoding a peptide or protein comprising an epitope) to certain tissues.

In one embodiment, the disclosure involves targeting the lymphatic system, in particular secondary lymphoid organs, more specifically spleen. Targeting the lymphatic system, in particular secondary lymphoid organs, more specifically spleen is in particular preferred if the RNA administered is RNA encoding a peptide or protein comprising an epitope.

In one embodiment, the target cell is a spleen cell. In one embodiment, the target cell is an antigen presenting cell such as a professional antigen presenting cell in the spleen. In one embodiment, the target cell is a dendritic cell in the spleen.

The "lymphatic system" is part of the circulatory system and an important part of the immune system, comprising a network of lymphatic vessels that carry lymph. The lymphatic system consists of lymphatic organs, a conducting network of lymphatic vessels, and the circulating lymph. The primary or central lymphoid organs generate lymphocytes from immature progenitor cells. The thymus and the bone marrow constitute the primary lymphoid organs. Secondary or peripheral lymphoid organs, which include lymph nodes and the spleen, maintain mature naive lymphocytes and initiate an adaptive immune response.

RNA may be delivered to spleen by so-called lipoplex formulations, in which the RNA is bound to liposomes comprising a cationic lipid and optionally an additional or helper lipid to form injectable nanoparticle formulations. The liposomes may be obtained by injecting a solution of the lipids in ethanol into water or a suitable aqueous phase. RNA lipoplex particles may be prepared by mixing the liposomes with RNA. Spleen targeting RNA lipoplex particles are described in WO 2013/143683, herein incorporated by reference. It has been found that RNA lipoplex particles having a net negative charge may be used to preferentially target spleen tissue or spleen cells such as antigen-presenting cells, in particular dendritic cells. Accordingly, following administration of the RNA lipoplex particles, RNA accumulation and/or RNA expression in the spleen occurs. Thus, RNA lipoplex particles of the disclosure may be used for expressing RNA in the spleen. In an embodiment, after administration of the RNA lipoplex particles, no or essentially no RNA accumulation and/or RNA expression in the lung and/or liver occurs. In one embodiment, after administration of the RNA lipoplex particles, RNA accumulation and/or RNA expression in antigen presenting cells, such as professional antigen presenting cells in the spleen occurs. Thus, RNA lipoplex particles of the disclosure may be used for expressing RNA in such antigen presenting cells. In one embodiment, the antigen presenting cells are dendritic cells and/or macrophages.

In the context of the present disclosure, the term "RNA lipoplex particle" relates to a particle that contains lipid, in particular cationic lipid, and RNA. Electrostatic interactions between positively charged liposomes and negatively charged RNA results in complexation and spontaneous formation of RNA lipoplex particles. Positively charged liposomes may be generally synthesized using a cationic lipid, such as DOTMA, and additional lipids, such as DOPE. In one embodiment, a RNA lipoplex particle is a nanoparticle.

As used herein, a "cationic lipid" refers to a lipid having a net positive charge. Cationic lipids bind negatively charged RNA by electrostatic interaction to the lipid matrix. Generally, cationic lipids possess a lipophilic moiety, such as a sterol, an acyl or diacyl chain, and the head group of the lipid typically carries the positive charge. Examples of cationic lipids include, but are not limited to 1,2-di-O-octadecenyl-3-trimethylammonium propane (DOTMA), dimethyldioctadecylammonium (DDAB); 1,2-dioleoyl-3-trimethylammonium propane (DOTAP); 1,2-dioleoyl-3-dimethylammonium-propane (DODAP); 1,2-diacyloxy-3-dimethylammonium propanes; 1,2-dialkyloxy-3-dimethylammonium propanes; dioctadecyldimethyl ammonium chloride (DODAC), 2,3-di(tetradecoxy)propyl-(2-hydroxyethyl)-dimethylazanium (DMRIE), 1,2-dimyristoyl-sn-glycero-3-ethylphosphocholine (DMEPC), I,2-dimyristoyl-3-trimethylammonium propane (DMTAP), 1,2-dioleyloxypropyl-3-dimethyl-hydroxyethyl ammonium bromide (DORIE), and 2,3-dioleoyloxy-N-[2(spermine carboxamide)ethyl]-N,N-dimethyl-I-propanamium trifluoroacetate (DOSPA). Preferred are DOTMA, DOTAP, DODAC, and DOSPA. In specific embodiments, the cationic lipid is DOTMA and/or DOTAP.

An additional lipid may be incorporated to adjust the overall positive to negative charge ratio and physical stability of the RNA lipoplex particles. In certain embodiments, the additional lipid is a neutral lipid. As used herein, a "neutral lipid" refers to a lipid having a net charge of zero. Examples of neutral lipids include, but are not limited to, 1,2-di-(9Z-octadecenoyl)-sn-glycero-3-phosphoethanolamine (DOPE), 1,2-dioleoyl-sn-glycero-3-phosphocholine (DOPC), diacylphosphatidyl choline, diacylphosphatidyl ethanol amine, ceramide, sphingoemyelin, cephalin, cholesterol, and cerebroside. In specific embodiments, the additional lipid is DOPE, cholesterol and/or DOPC.

In certain embodiments, the RNA lipoplex particles include both a cationic lipid and an additional lipid. In an exemplary embodiment, the cationic lipid is DOTMA and the additional lipid is DOPE.

In some embodiments, the molar ratio of the at least one cationic lipid to the at least one additional lipid is from about 10:0 to about 1:9, about 4:1 to about 1:2, or about 3:1 to about 1:1. In specific embodiments, the molar ratio may be about 3:1, about 2.75:1, about 2.5:1, about 2.25:1, about 2:1, about 1.75:1, about 1.5:1, about 1.25:1, or about 1:1. In an exemplary embodiment, the molar ratio of the at least one cationic lipid to the at least one additional lipid is about 2:1.

RNA lipoplex particles described herein have an average diameter that in one embodiment ranges from about 200 nm to about 1000 nm, from about 200 nm to about 800 nm, from about 250 to about 700 nm, from about 400 to about 600 nm, from about 300 nm to about 500 nm, or from about 350 nm to about 400 nm. In specific embodiments, the RNA lipoplex particles have an average diameter of about 200 nm, about 225 nm, about 250 nm, about 275 nm, about 300 nm, about 325 nm, about 350 nm, about 375 nm, about 400 nm, about 425 nm, about 450 nm, about 475 nm, about 500 nm, about 525 nm, about 550 nm, about 575 nm, about 600 nm, about 625 nm, about 650 nm, about 700 nm, about 725 nm, about 750 nm, about 775 nm, about 800 nm, about 825 nm, about 850 nm, about 875 nm, about 900 nm, about 925 nm, about 950 nm, about 975 nm, or about 1000 nm. In an embodiment, the RNA lipoplex particles have an average diameter that ranges from about 250 nm to about 700 nm. In another embodiment, the RNA lipoplex particles have an average diameter that ranges from about 300 nm to about 500 nm. In an exemplary embodiment, the RNA lipoplex particles have an average diameter of about 400 nm.

The electric charge of the RNA lipoplex particles of the present disclosure is the sum of the electric charges present in the at least one cationic lipid and the electric charges present in the RNA. The charge ratio is the ratio of the positive charges present in the at least one cationic lipid to the negative charges present in the RNA. The charge ratio of the positive charges present in the at least one cationic lipid to the negative charges present in the RNA is calculated by the following equation: charge ratio=[(cationic lipid concentration (mol))*(the total number of positive charges in the cationic lipid)]/[(RNA concentration (mol))*(the total number of negative charges in RNA)].

The spleen targeting RNA lipoplex particles described herein at physiological pH preferably have a net negative charge such as a charge ratio of positive charges to negative charges from about 1.9:2 to about 1:2. In specific embodiments, the charge ratio of positive charges to negative charges in the RNA lipoplex particles at physiological pH is about 1.9:2.0, about 1.8:2.0, about 1.7:2.0, about 1.6:2.0, about 1.5:2.0, about 1.4:2.0, about 1.3:2.0, about 1.2:2.0, about 1.1:2.0, or about 1:2.0.

RNA delivery systems have an inherent preference to the liver. This pertains to lipid-based particles, cationic and neutral nanoparticles, in particular lipid nanoparticles such as liposomes, nanomicelles and lipophilic ligands in bioconjugates. Liver accumulation is caused by the discontinuous nature of the hepatic vasculature or the lipid metabolism (liposomes and lipid or cholesterol conjugates).

In one embodiment of the targeted delivery of an IL2 variant polypeptide described herein, the target organ is liver and the target tissue is liver tissue. The delivery to such target tissue is preferred, in particular, if presence of the IL2 variant polypeptide in this organ or tissue is desired and/or if it is desired to express large amounts of the IL2 variant polypeptide and/or if systemic presence of the IL2 variant polypeptide, in particular in significant amounts, is desired or required.

In one embodiment, RNA encoding an IL2 variant polypeptide is administered in a formulation for targeting liver. Such formulations are described herein above.

For in vivo delivery of RNA to the liver, a drug delivery system may be used to transport the RNA into the liver by preventing its degradation. For example, polyplex nanomicelles consisting of a poly(ethylene glycol) (PEG)-coated surface and an mRNA-containing core is a useful system because the nanomicelles provide excellent in vivo stability of the RNA, under physiological conditions. Furthermore, the stealth property provided by the polyplex nanomicelle surface, composed of dense PEG palisades, effectively evades host immune defenses.

The peptides, proteins, polypeptides, RNA, RNA particles and further agents, e.g., immune checkpoint inhibitors, described herein may be administered in pharmaceutical compositions or medicaments for therapeutic or prophylactic treatments and may be administered in the form of any suitable pharmaceutical composition.

The term "pharmaceutical composition" relates to a formulation comprising a therapeutically effective agent, preferably together with pharmaceutically acceptable carriers, diluents and/or excipients. Said pharmaceutical composition is useful for treating, preventing, or reducing the severity of a disease or disorder by administration of said pharmaceutical composition to a subject. A pharmaceutical composition is also known in the art as a pharmaceutical formulation. In the context of the present disclosure, the pharmaceutical composition comprises peptides, proteins, polypeptides, RNA, RNA particles and/or further agents as described herein.

The pharmaceutical compositions of the present disclosure may comprise one or more adjuvants or may be administered with one or more adjuvants. The term "adjuvant" relates to a compound which prolongs, enhances or accelerates an immune response. Adjuvants comprise a heterogeneous group of compounds such as oil emulsions (e.g., Freund's adjuvants), mineral compounds (such as alum), bacterial products (such as *Bordetella pertussis* toxin), or immune-stimulating complexes. Examples of adjuvants include, without limitation, LPS, GP96, CpG oligodeoxynucleotides, growth factors, and cytokines, such as monokines, lymphokines, interleukins, chemokines. The chemokines may be IL1, IL2, IL3, IL4, IL5, IL6, IL7, IL8, IL9, IL10, IL12, IFNα, IFNγ, GM-CSF, LT-a. Further known adjuvants are aluminium hydroxide, Freund's adjuvant or oil such as Montanide® ISA51. Other suitable adjuvants for use in the present disclosure include lipopeptides, such as Pam3Cys.

The pharmaceutical compositions according to the present disclosure are generally applied in a "pharmaceutically effective amount" and in "a pharmaceutically acceptable preparation".

The term "pharmaceutically acceptable" refers to the non-toxicity of a material which does not interact with the action of the active component of the pharmaceutical composition.

The term "pharmaceutically effective amount" or "therapeutically effective amount" refers to the amount which achieves a desired reaction or a desired effect alone or together with further doses. In the case of the treatment of a particular disease, the desired reaction preferably relates to inhibition of the course of the disease. This comprises slowing down the progress of the disease and, in particular, interrupting or reversing the progress of the disease. The desired reaction in a treatment of a disease may also be delay of the onset or a prevention of the onset of said disease or said condition. An effective amount of the compositions described herein will depend on the condition to be treated, the severeness of the disease, the individual parameters of the patient, including age, physiological condition, size and weight, the duration of treatment, the type of an accompanying therapy (if present), the specific route of administration and similar factors. Accordingly, the doses administered of the compositions described herein may depend on various of such parameters. In the case that a reaction in a patient is insufficient with an initial dose, higher doses (or effectively higher doses achieved by a different, more localized route of administration) may be used.

The pharmaceutical compositions of the present disclosure may contain salts, buffers, preservatives, and optionally other therapeutic agents. In one embodiment, the pharmaceutical compositions of the present disclosure comprise one or more pharmaceutically acceptable carriers, diluents and/or excipients.

Suitable preservatives for use in the pharmaceutical compositions of the present disclosure include, without limitation, benzalkonium chloride, chlorobutanol, paraben and thimerosal.

The term "excipient" as used herein refers to a substance which may be present in a pharmaceutical composition of the present disclosure but is not an active ingredient. Examples of excipients, include without limitation, carriers, binders, diluents, lubricants, thickeners, surface active agents, preservatives, stabilizers, emulsifiers, buffers, flavoring agents, or colorants.

The term "diluent" relates a diluting and/or thinning agent. Moreover, the term "diluent" includes any one or more of fluid, liquid or solid suspension and/or mixing media. Examples of suitable diluents include ethanol, glycerol and water.

The term "carrier" refers to a component which may be natural, synthetic, organic, inorganic in which the active component is combined in order to facilitate, enhance or enable administration of the pharmaceutical composition. A carrier as used herein may be one or more compatible solid or liquid fillers, diluents or encapsulating substances, which are suitable for administration to subject. Suitable carrier include, without limitation, sterile water, Ringer, Ringer lactate, sterile sodium chloride solution, isotonic saline, polyalkylene glycols, hydrogenated naphthalenes and, in particular, biocompatible lactide polymers, lactide/glycolide copolymers or polyoxyethylene/polyoxy-propylene copolymers. In one embodiment, the pharmaceutical composition of the present disclosure includes isotonic saline.

Pharmaceutically acceptable carriers, excipients or diluents for therapeutic use are well known in the pharmaceutical art, and are described, for example, in Remington's Pharmaceutical Sciences, Mack Publishing Co. (A. R Gennaro edit. 1985).

Pharmaceutical carriers, excipients or diluents can be selected with regard to the intended route of administration and standard pharmaceutical practice.

In one embodiment, pharmaceutical compositions described herein may be administered intravenously, intraarterially, subcutaneously, intradermally or intramuscularly. In certain embodiments, the pharmaceutical composition is formulated for local administration or systemic administration. Systemic administration may include enteral administration, which involves absorption through the gastrointestinal tract, or parenteral administration. As used herein, "parenteral administration" refers to the administration in any manner other than through the gastrointestinal tract, such as by intravenous injection. In a preferred embodiment, the pharmaceutical compositions is formulated for systemic administration. In another preferred embodiment, the systemic administration is by intravenous administration.

The term "co-administering" as used herein means a process whereby different compounds or compositions (e.g., RNA encoding an IL2 variant polypeptide, RNA encoding a peptide or protein comprising an epitope and optionally an immune checkpoint inhibitor) are administered to the same patient. The RNA encoding an IL2 variant polypeptide and the RNA encoding a peptide or protein comprising an epitope may be administered simultaneously, at essentially the same time, or sequentially. If administration takes place sequentially, the RNA encoding an IL2 variant polypeptide may be administered before or after administration of the RNA encoding a peptide or protein comprising an epitope. If administration takes place simultaneously the RNA encoding an IL2 variant polypeptide and the RNA encoding a peptide or protein comprising an epitope need not be administered within the same composition. The RNA encoding an IL2 variant polypeptide and the RNA encoding a peptide or protein comprising an epitope may be administered one or more times and the number of administrations of each component may be the same or different. In addition, the RNA encoding an IL2 variant polypeptide and the RNA encoding a peptide or protein comprising an epitope need not be administered at the same site.

The IL2 variant polypeptides, the polynucleotides encoding IL2 variant polypeptides, the host cells comprising the polynucleotide encoding the IL2 variant polypeptide, the pharmaceutical compositions and the methods of treatment described herein may be used in the therapeutic or prophylactic treatment of various diseases, in particular diseases in which provision of IL2, specifically of the IL2 variant polypeptides described herein, to a subject results in a therapeutic or prophylactic effect, such as cancer, autoimmune diseases, infectious diseases, vaccine adjuvant in cancer vaccine and conventional vaccine therapy, for immune stimulation in the elderly or otherwise immunocompromised individuals, as well as in HIV or human SCID patients, or other therapeutic application requiring general stimulation of the immune system in any suitable animal, preferably a mammal, most preferably human. IL2 has many effects. Some of these are stimulation of T cells, in particular memory T cells, naïve T cells and/or effector T cells, and/or NK cells. IL2 variant polypeptides described herein will have activities on cell types expressing only the intermediate affinity IL2 receptor, such as memory T cells, naïve T cells and/or effector T cells, but not the high affinity IL2 receptor, such as regulatory T cells. Accordingly, contemplated is use of the IL2 variant polypeptides, the polynucleotides encoding IL2 variant polypeptides, the host cells comprising the polynucleotide encoding the IL2 variant polypeptide, the pharmaceutical compositions and the methods of treatment described herein in the treatment of those diseases in which IL2 is expected to provide an effective therapy due to its T cell activity.

Alternatively, or in addition to methods of direct administration to patients, in some embodiments, IL2 variant polypeptides can be used in ex vivo methods. For example, cells (e.g., peripheral blood lymphocytes or purified populations of lymphocytes isolated from a patient and placed or maintained in culture) can be cultured in vitro in culture medium and the contacting step can be affected by adding the IL2 variant polypeptides, and/or polynucleotides encoding them to the culture medium. The culture step can include further steps in which the cells are stimulated or treated with other agents, e.g., to stimulate proliferation, or to expand a population of cells that is reactive to an antigen of interest (e.g., a cancer antigen or a viral antigen). The cells are then administered to the patient after they have been treated.

The term "disease" refers to an abnormal condition that affects the body of an individual. A disease is often construed as a medical condition associated with specific symptoms and signs. A disease may be caused by factors originally from an external source, such as infectious disease, or it may be caused by internal dysfunctions, such as autoimmune diseases. In humans, "disease" is often used more broadly to refer to any condition that causes pain, dysfunction, distress, social problems, or death to the individual afflicted, or similar problems for those in contact with the individual. In this broader sense, it sometimes includes injuries, disabilities, disorders, syndromes, infections, isolated symptoms, deviant behaviors, and atypical variations of structure and function, while in other contexts and for other purposes these may be considered distinguishable categories. Diseases usually affect individuals not only physically, but also emotionally, as contracting and living with many diseases can alter one's perspective on life, and one's personality.

In the present context, the term "treatment", "treating" or "therapeutic intervention" relates to the management and care of a subject for the purpose of combating a condition such as a disease or disorder. The term is intended to include the full spectrum of treatments for a given condition from which the subject is suffering, such as administration of the therapeutically effective compound to alleviate the symptoms or complications, to delay the progression of the disease, disorder or condition, to alleviate or relief the symptoms and complications, and/or to cure or eliminate the disease, disorder or condition as well as to prevent the condition, wherein prevention is to be understood as the management and care of an individual for the purpose of combating the disease, condition or disorder and includes the administration of the active compounds to prevent the onset of the symptoms or complications.

The term "therapeutic treatment" relates to any treatment which improves the health status and/or prolongs (increases) the lifespan of an individual. Said treatment may eliminate the disease in an individual, arrest or slow the development of a disease in an individual, inhibit or slow the development of a disease in an individual, decrease the frequency or severity of symptoms in an individual, and/or decrease the recurrence in an individual who currently has or who previously has had a disease.

The terms "prophylactic treatment" or "preventive treatment" relate to any treatment that is intended to prevent a disease from occurring in an individual. The terms "prophylactic treatment" or "preventive treatment" are used herein interchangeably.

The terms "individual" and "subject" are used herein interchangeably. They refer to a human or another mammal (e.g. mouse, rat, rabbit, dog, cat, cattle, swine, sheep, horse or primate) that can be afflicted with or is susceptible to a disease or disorder (e.g., cancer) but may or may not have the disease or disorder. In many embodiments, the individual is a human being. Unless otherwise stated, the terms "individual" and "subject" do not denote a particular age, and thus encompass adults, elderlies, children, and newborns. In embodiments of the present disclosure, the "individual" or "subject" is a "patient".

The term "patient" means an individual or subject for treatment, in particular a diseased individual or subject.

In one embodiment of the disclosure, the aim is to provide an immune response against diseased cells expressing an antigen such as cancer cells expressing a tumor antigen, and to treat a disease such as a cancer disease involving cells expressing an antigen such as a tumor antigen.

A pharmaceutical composition comprising RNA encoding a peptide or protein comprising an epitope may be administered to a subject to elicit an immune response against an antigen comprising said epitope in the subject which may be therapeutic or partially or fully protective. A person skilled in the art will know that one of the principles of immunotherapy and vaccination is based on the fact that an immunoprotective reaction to a disease is produced by immunizing a subject with an antigen or an epitope, which is immunologically relevant with respect to the disease to be treated. Accordingly, pharmaceutical compositions described herein are applicable for inducing or enhancing an immune response. Pharmaceutical compositions described herein are thus useful in a prophylactic and/or therapeutic treatment of a disease involving an antigen or epitope.

As used herein, "immune response" refers to an integrated bodily response to an antigen or a cell expressing an antigen and refers to a cellular immune response and/or a humoral immune response. A cellular immune response includes, without limitation, a cellular response directed to cells expressing an antigen and being characterized by presentation of an antigen with class I or class II MHC molecule. The cellular response relates to T lymphocytes, which may be classified as helper T cells (also termed CD4+ T cells) that play a central role by regulating the immune response or killer cells (also termed cytotoxic T cells, CD8+ T cells, or CTLs) that induce apoptosis in infected cells or cancer cells. In one embodiment, administering a pharmaceutical composition of the present disclosure involves stimulation of an anti-tumor CD8+ T cell response against cancer cells expressing one or more tumor antigens. In as specific embodiment, the tumor antigens are presented with class I MHC molecule.

The present disclosure contemplates an immune response that may be protective, preventive, prophylactic and/or therapeutic. As used herein, "induces [or inducing] an immune response" may indicate that no immune response against a particular antigen was present before induction or it may indicate that there was a basal level of immune response against a particular antigen before induction, which was enhanced after induction. Therefore, "induces [or inducing] an immune response" includes "enhances [or enhancing] an immune response".

The term "immunotherapy" relates to the treatment of a disease or condition by inducing, or enhancing an immune response. The term "immunotherapy" includes antigen immunization or antigen vaccination.

The terms "immunization" or "vaccination" describe the process of administering an antigen to an individual with the purpose of inducing an immune response, for example, for therapeutic or prophylactic reasons.

The peptides, proteins, polypeptides, RNA, RNA particles and further agents, e.g., immune checkpoint inhibitors, described herein may be used in the therapeutic or prophylactic treatment of diseases in which provision of a peptide or protein comprising an epitope for inducing an immune response against an antigen in a subject to said subject results in a therapeutic or prophylactic effect. For example, provision of an antigen or epitope which is derived from a virus may be useful in the treatment of a viral disease caused by said virus. Provision of a tumor antigen or epitope may be useful in the treatment of a cancer disease wherein cancer cells express said tumor antigen.

In one embodiment, the present disclosure envisions embodiments wherein RNA formulations such as RNA lipoplex particles as described herein targeting spleen tissue are administered. The RNA encodes, for example, a peptide or protein comprising an epitope as described, for example, herein. The RNA is taken up by antigen-presenting cells in the spleen such as dendritic cells to express the peptide or protein. Following optional processing and presentation by the antigen-presenting cells an immune response may be generated against the epitope resulting in a prophylactic and/or therapeutic treatment of a disease involving the epitope or an antigen comprising the epitope. In one embodiment, the immune response induced by the RNA described herein comprises presentation of an antigen or fragment thereof, such as an epitope, by antigen presenting cells, such as dendritic cells and/or macrophages, and activation of cytotoxic T cells due to this presentation. For example, peptides or proteins encoded by the RNAs or procession products thereof may be presented by major histocompatibility complex (MHC) proteins expressed on antigen presenting cells. The MHC peptide complex can then be recognized by immune cells such as T cells or B cells leading to their activation.

Accordingly, the present disclosure relates to RNA as described herein for use in a prophylactic and/or therapeutic treatment of a disease involving an antigen, preferably a cancer disease.

The term "macrophage" refers to a subgroup of phagocytic cells produced by the differentiation of monocytes. Macrophages which are activated by inflammation, immune cytokines or microbial products nonspecifically engulf and kill foreign pathogens within the macrophage by hydrolytic and oxidative attack resulting in degradation of the pathogen. Peptides from degraded proteins are displayed on the macrophage cell surface where they can be recognized by T cells, and they can directly interact with antibodies on the B cell surface, resulting in T and B cell activation and further stimulation of the immune response. Macrophages belong to the class of antigen presenting cells. In one embodiment, the macrophages are splenic macrophages.

The term "dendritic cell" (DC) refers to another subtype of phagocytic cells belonging to the class of antigen presenting cells. In one embodiment, dendritic cells are derived from hematopoietic bone marrow progenitor cells. These progenitor cells initially transform into immature dendritic cells. These immature cells are characterized by high phagocytic activity and low T cell activation potential. Immature dendritic cells constantly sample the surrounding environment for pathogens such as viruses and bacteria. Once they have come into contact with a presentable antigen, they become activated into mature dendritic cells and begin to migrate to the spleen or to the lymph node. Immature dendritic cells phagocytose pathogens and degrade their proteins into small pieces and upon maturation present those fragments at their cell surface using MHC molecules. Simultaneously, they upregulate cell-surface receptors that act as co-receptors in T cell activation such as CD80, CD86, and CD40 greatly enhancing their ability to activate T cells. They also upregulate CCR7, a chemotactic receptor that induces the dendritic cell to travel through the blood stream to the spleen or through the lymphatic system to a lymph node. Here they act as antigen-presenting cells and activate helper T cells and killer T cells as well as B cells by presenting them antigens, alongside non-antigen specific co-stimulatory signals. Thus, dendritic cells can actively induce a T cell- or B cell-related immune response. In one embodiment, the dendritic cells are splenic dendritic cells.

The term "antigen presenting cell" (APC) is a cell of a variety of cells capable of displaying, acquiring, and/or presenting at least one antigen or antigenic fragment on (or at) its cell surface. Antigen-presenting cells can be distinguished in professional antigen presenting cells and non-professional antigen presenting cells.

The term "professional antigen presenting cells" relates to antigen presenting cells which constitutively express the Major Histocompatibility Complex class II (MHC class II) molecules required for interaction with naive T cells. If a T cell interacts with the MHC class II molecule complex on the membrane of the antigen presenting cell, the antigen presenting cell produces a co-stimulatory molecule inducing activation of the T cell. Professional antigen presenting cells comprise dendritic cells and macrophages.

The term "non-professional antigen presenting cells" relates to antigen presenting cells which do not constitutively express MHC class II molecules, but upon stimulation by certain cytokines such as interferon-gamma. Exemplary, non-professional antigen presenting cells include fibroblasts, thymic epithelial cells, thyroid epithelial cells, glial cells, pancreatic beta cells or vascular endothelial cells.

"Antigen processing" refers to the degradation of an antigen into procession products, which are fragments of said antigen (e.g., the degradation of a protein into peptides) and the association of one or more of these fragments (e.g., via binding) with MHC molecules for presentation by cells, such as antigen presenting cells to specific T cells.

The term "disease involving an antigen" or "disease involving an epitope" refers to any disease which implicates an antigen or epitope, e.g. a disease which is characterized by the presence of an antigen or epitope. The disease involving an antigen or epitope can be an infectious disease, or a cancer disease or simply cancer. As mentioned above, the antigen may be a disease-associated antigen, such as a tumor-associated antigen, a viral antigen, or a bacterial antigen and the epitope may be derived from such antigen.

The term "infectious disease" refers to any disease which can be transmitted from individual to individual or from organism to organism, and is caused by a microbial agent (e.g. common cold). Infectious diseases are known in the art and include, for example, a viral disease, a bacterial disease, or a parasitic disease, which diseases are caused by a virus, a bacterium, and a parasite, respectively. In this regard, the infectious disease can be, for example, hepatitis, sexually transmitted diseases (e.g. *chlamydia* or gonorrhea), tuberculosis, HIV/acquired immune deficiency syndrome (AIDS), diphtheria, hepatitis B, hepatitis C, cholera, severe acute respiratory syndrome (SARS), the bird flu, and influenza.

The terms "cancer disease" or "cancer" refer to or describe the physiological condition in an individual that is typically characterized by unregulated cell growth. Examples of cancers include, but are not limited to, carcinoma, lymphoma, blastoma, sarcoma, and leukemia. More particularly, examples of such cancers include bone cancer, blood cancer lung cancer, liver cancer, pancreatic cancer, skin cancer, cancer of the head or neck, cutaneous or intraocular melanoma, uterine cancer, ovarian cancer, rectal cancer, cancer of the anal region, stomach cancer, colon cancer, breast cancer, prostate cancer, uterine cancer, carcinoma of the sexual and reproductive organs, Hodgkin's Disease, cancer of the esophagus, cancer of the small intestine, cancer of the endocrine system, cancer of the thyroid gland, cancer of the parathyroid gland, cancer of the adrenal gland, sarcoma of soft tissue, cancer of the bladder, cancer of the kidney, renal cell carcinoma, carcinoma of the renal pelvis, neoplasms of the central nervous system (CNS), neuroectodermal cancer, spinal axis tumors, glioma, meningioma, and pituitary adenoma. The term "cancer" according to the disclosure also comprises cancer metastases.

Combination strategies in cancer treatment may be desirable due to a resulting synergistic effect, which may be considerably stronger than the impact of a monotherapeutic approach. In one embodiment, the pharmaceutical composition is administered with an immunotherapeutic agent. As used herein "immunotherapeutic agent" relates to any agent that may be involved in activating a specific immune response and/or immune effector function(s). The present disclosure contemplates the use of an antibody as an immunotherapeutic agent. Without wishing to be bound by theory, antibodies are capable of achieving a therapeutic effect against cancer cells through various mechanisms, including inducing apoptosis, block components of signal transduction pathways or inhibiting proliferation of tumor cells. In certain embodiments, the antibody is a monoclonal antibody. A monoclonal antibody may induce cell death via antibody-dependent cell mediated cytotoxicity (ADCC), or bind complement proteins, leading to direct cell toxicity, known as complement dependent cytotoxicity (CDC). Non-limiting examples of anti-cancer antibodies and potential antibody targets (in brackets) which may be used in combination with the present disclosure include: Abagovomab (CA-125), Abciximab (CD41), Adecatumumab (EpCAM), Afutuzumab (CD20), Alacizumab pegol (VEGFR2), Altumomab pentetate (CEA), Amatuximab (MORAb-009), Anatumomab mafenatox (TAG-72), Apolizumab (HLA-DR), Arcitumomab (CEA), Atezolizumab (PD-L1), Bavituximab (phosphatidylserine), Bectumomab (CD22), Belimumab (BAFF), Bevacizumab (VEGF-A), Bivatuzumab mertansine (CD44 v6), Blinatumomab (CD 19), Brentuximab vedotin (CD30 TNFRSF8), Cantuzumab mertansin (mucin CanAg), Cantuzumab ravtansine (MUC1), Capromab pendetide (prostatic carcinoma cells), Carlumab (CNT0888), Catumaxomab (EpCAM, CD3), Cetuximab (EGFR), Citatuzumab bogatox (EpCAM), Cixutumumab (IGF-1 receptor), Claudiximab (Claudin), Clivatuzumab tetraxetan (MUC1), Conatumumab (TRAIL-R2), Dacetuzumab (CD40), Dalotuzumab (insulin-like growth factor I receptor), Denosumab (RANKL), Detumomab (B-lymphoma cell), Drozitumab (DR5), Ecromeximab (GD3 ganglioside), Edrecolomab (EpCAM), Elotuzumab (SLAMF7), Enavatuzumab (PDL192), Ensituximab (NPC-1C), Epratuzumab (CD22), Ertumaxomab (HER2/neu, CD3), Etaracizumab (integrin αvβ3), Farletuzumab (folate receptor 1), FBTA05 (CD20), Ficlatuzumab (SCH 900105), Figitumumab (IGF-1 receptor), Flanvotumab (glycoprotein 75), Fresolimumab (TGF-β), Galiximab (CD80), Ganitumab (IGF-I), Gemtuzumab ozogamicin (CD33), Gevokizumab (ILIR), Girentuximab (carbonic anhydrase 9 (CA-IX)), Glembatumumab vedotin (GPNMB), Ibritumomab tiuxetan (CD20), Icrucumab (VEGFR-1), Igovoma (CA-125), Indatuximab ravtansine (SDC1), Intetumumab (CD51), Inotuzumab ozogamicin (CD22), Ipilimumab (CD 152), Iratumumab (CD30), Labetuzumab (CEA), Lexatumumab (TRAIL-R2), Libivirumab (hepatitis B surface antigen), Lintuzumab (CD33), Lorvotuzumab mertansine (CD56), Lucatumumab (CD40), Lumiliximab (CD23), Mapatumumab (TRAIL-R1), Matuzumab (EGFR), Mepolizumab (IL5), Milatuzumab (CD74), Mitumomab (GD3 ganglioside), Mogamulizumab (CCR4), Moxetumomab pasudotox (CD22), Nacolomab tafenatox (C242 antigen), Naptumomab estafenatox (5T4), Namatumab (RON), Necitumumab (EGFR), Nimotuzumab (EGFR), Nivolumab (IgG4), Ofatumumab (CD20), Olaratumab (PDGF-R a), Onartuzumab (human scatter factor receptor kinase), Oportuzumab monatox (EpCAM), Oregovomab (CA-125), Oxelumab (OX-40), Panitumumab (EGFR), Patritumab (HER3), Pemtumoma (MUC1), Pertuzuma (HER2/neu), Pintumomab (adenocarcinoma antigen), Pritumumab (vimentin), Racotumomab (N-glycolylneuraminic acid), Radretumab (fibronectin extra domain-B), Rafivirumab (rabies virus glycoprotein), Ramucirumab (VEGFR2), Rilotumumab (HGF), Rituximab (CD20), Robatumumab (IGF-1 receptor), Samalizumab (CD200), Sibrotuzumab (FAP), Siltuximab (IL6), Tabalumab (BAFF), Tacatuzumab tetraxetan (alpha-fetoprotein), Taplitumomab paptox (CD 19), Tenatumomab (tenascin C), Teprotumumab (CD221), Ticilimumab (CTLA-4), Tigatuzumab (TRAIL-R2), TNX-650 (IL13), Tositumomab (CD20), Trastuzumab (HER2/neu), TRBS07 (GD2), Tremelimumab (CTLA-4), Tucotuzumab celmoleukin (EpCAM), Ublituximab (MS4A1), Urelumab (4-1 BB), Volociximab (integrin α5β1), Votumumab (tumor antigen CTAA 16.88), Zalutumumab (EGFR), and Zanolimumab (CD4).

Citation of documents and studies referenced herein is not intended as an admission that any of the foregoing is pertinent prior art. All statements as to the contents of these documents are based on the information available to the applicants and do not constitute any admission as to the correctness of the contents of these documents.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

EXAMPLES

Example 1: Construct Design and mRNA Production

In vitro transcription of cytokine encoding mRNAs were based on the pST1-T7-AGA-dEarl-hAg-MCS-FI-A30LA70 plasmid-backbone and derivative DNA-constructs. These plasmid constructs contain a 5' UTR (untranslated region, a derivate of the 5'-UTR of HOMO Sapiens Hemoglobin Subunit Alpha 1 (hAg)), a 3' FI element (where F is a 136 nucleotide long 3'-UTR fragment of amino-terminal enhancer of split, mRNA and I is a 142 nucleotide long fragment of mitochondrially encoded 12S RNA both identified in Homo sapiens; WO 2017/060314) and a poly(A) tail of 100 nucleotides, with a linker after 70 nucleotides. Cytokine and serum albumin (hAlb) encoding sequences originate from Homo sapiens and no changes in the resulting amino acid sequences were introduced except for the intended mutations in the mutIL2 variants described below (hIL2: NP_000577.2; NCBI protein resource; https://www.ncbi.nlm.nih.gov/protein/). hAlb was added either at the N- or C-terminus of the IL2 variant with both orientations being similarly effective in vitro and in vivo (data not shown). Encoded proteins are equipped with an N-terminal signal peptide (SP) that is the native SP of the respective protein. In case of fusion proteins, only the SP of the N-terminal moiety was maintained, for further moieties only the mature portion (protein without SP) was encoded. A stop-codon was introduced for the most C-terminal moiety only. Different protein moieties in the cytokine and hAlb fusion constructs were separated by a 30-nucleotide long linker sequence encoding for glycine and serine residues. Mutations in the hIL2 sequence were introduced to alter CD25 binding (called "mutCD25" mutations, the respective constructs are named hIL2_Ax, with x being defined below) and binding to the IL2Rβγ (called "mutβγ" mutations, the respective constructs are labeled with an additional "s", e.g. hIL2s or hIL2_A4s). In case of hIL2_A1 four amino acid residue substitutions in the mature domain were introduced, the arginine at position 38 was changed to alanine (R38A), the phenylalanine at position 42 was changed to alanine (F42A), the tyrosine at position 45 was changed to alanine (Y45A) and the glutamic acid at position 62 was changed to alanine (E62A) (Carmenate, T. et al. *J. Immunol.* 190, 6230-6238 (2013).). For hIL2_A2 the amino acid residue substitutions of the mature domain are K35A, K43A and E61A. For hIL2_A3 the substitutions K35E, K43E and E61K were introduced, for hIL2_A4 K43E and E61K, for hIL2_A5 E61K and for hIL2_A6 an E62K mutation was introduced. For generation of the hIL2 mutβγ variants the amino acid residues of the mature domain of the respective hIL2 variant were substituted in the way L80F, R81D, L85V, I86V and I92F (Levin, A. M. et al. *Nature* 484, 529-533 (2012)). mRNA was generated by in vitro transcription as described by Kreiter et al. (Kreiter, S. et al. Cancer Immunol. Immunother. 56, 1577-87 (2007)) with substitution of the normal nucleoside uridine by 1-methyl-pseudouridine. Resulting mRNAs were equipped with a Cap1-structure and double-stranded (dsRNA) molecules were depleted. Purified mRNA was eluted in $H_2O$ and stored at −80° C. until further use. In vitro transcription of all described mRNA constructs was carried out at BioNTech RNA Pharmaceuticals GmbH. A list of all constructs used in subsequent experiments is shown in Table 1.

TABLE 1

Amino acid sequences of mRNA encoded and expressed proteins.

| | |
|---|---|
| hAIb<br>SEQ ID NO: 21 | MKWVTFISLLFLFSSAYSRGVFRRDAHKSEVAHRFKDLGEENFKALVLIAFAQYLQQCPF<br>EDHVKLVNEVTEFAKTCVADESAENCDKSLHTLFGDKLCTVATLRETYGEMADCCAKQEP<br>ERNECFLQHKDDNPNLPRLVRPEVDVMCTAFHDNEETFLKKYLYEIARRHPYFYAPELLF<br>FAKRYKAAFTECCQAADKAACLLPKLDELRDEGKASSAKQRLKCASLQKFGERAFKAWAV<br>ARLSQRFPKAEFAEVSKLVTDLTKVHTECCHGDLLECADDRADLAKYICENQDSISSKLK<br>ECCEKPLLEKSHCIAEVENDEMPADLPSLAADFVESKDVCKNYAEAKDVFLGMFLYEYAR<br>RHPDYSWVLLLRLAKTYETTLEKCCAAADPHECYAKVFDEFKPLVEEPQNLIKQNCELFE<br>QLGEYKFQNALLVRYTKKVPQVSTPTLVEVSRNLGKVGSKCCKHPEAKRMPCAEDYLSVV<br>LNQLCVLHEKTPVSDRVTKCCTESLVNRRPCFSALEVDETYVPKEFNAETFTFHADICTL<br>SEKERQIKKQTALVELVKHKPKATKEQLKAVMDDFAAFVEKCCKADDKETCFAEEGKKLV<br>AASQAALGL |
| hAIb-hIL2<br>SEQ ID NO: 19 | MKWVTFISLLFLFSSAYSRGVFRRDAHKSEVAHRFKDLGEENFKALVLIAFAQYLQQCPF<br>EDHVKLVNEVTEFAKTCVADESAENCDKSLHTLFGDKLCTVATLRETYGEMADCCAKQEP<br>ERNECFLQHKDDNPNLPRLVRPEVDVMCTAFHDNEETFLKKYLYEIARRHPYFYAPELLF<br>FAKRYKAAFTECCQAADKAACLLPKLDELRDEGKASSAKQRLKCASLQKFGERAFKAWAV<br>ARLSQRFPKAEFAEVSKLVTDLTKVHTECCHGDLLECADDRADLAKYICENQDSISSKLK<br>ECCEKPLLEKSHCIAEVENDEMPADLPSLAADFVESKDVCKNYAEAKDVFLGMFLYEYAR<br>RHPDYSVVLLLRLAKTYETTLEKCCAAADPHECYAKVFDEFKPLVEEPQNLIKQNCELFE<br>QLGEYKFQNALLVRYTKKVPQVSTPTLVEVSRNLGKVGSKCCKHPEAKRMPCAEDYLSVV<br>LNQLCVLHEKTPVSDRVTKCCTESLVNRRPCFSALEVDETYVPKEFNAETFTFHADICTL<br>SEKERQIKKQTALVELVKHKPKATKEQLKAVMDDFAAFVEKCCKADDKETCFAEEGKKLV<br>AASQAALGLGGSGGGGSGGAPTSSSTKKTQLQLEHLLLDLQMILNGINNYKNPKLTRMLT<br>FKFYMPKKATELKHLQCLEEELKPLEEVLNLAQSKNFHLRPRDLISNINVIVLELKGSET<br>TFMCEYADETATIVEFLNRWITFCQSIISTLT |
| hAIb-hIL2_A1<br>SEQ ID NO: 9 | MKWVTFISLLFLFSSAYSRGVFRRDAHKSEVAHRFKDLGEENFKALVLIAFAQYLQQCPF<br>EDHVKLVNEVTEFAKTCVADESAENCDKSLHTLFGDKLCTVATLRETYGEMADCCAKQEP<br>ERNECFLQHKDDNPNLPRLVRPEVDVMCTAFHDNEETFLKKYLYEIARRHPYFYAPELLF<br>FAKRYKAAFTECCQAADKAACLLPKLDELRDEGKASSAKQRLKCASLQKFGERAFKAWAV<br>ARLSQRFPKAEFAEVSKLVTDLTKVHTECCHGDLLECADDRADLAKYICENQDSISSKLK<br>ECCEKPLLEKSHCIAEVENDEMPADLPSLAADFVESKDVCKNYAEAKDVFLGMFLYEYAR<br>RHPDYSWLLLRLAKTYETTLEKCCAAADPHECYAKVFDEFKPLVEEPQNLIKQNCELFE<br>QLGEYKFQNALLVRYTKKVPQVSTPTLVEVSRNLGKVGSKCCKHPEAKRMPCAEDYLSVV<br>LNQLCVLHEKTPVSDRVTKCCTESLVNRRPCFSALEVDETYVPKEFNAETFTFHADICTL<br>SEKERQIKKQTALVELVKHKPKATKEQLKAVMDDFAAFVEKCCKADDKETCFAEEGKKLV<br>AASQAALGLGGSGGGGSGGAPTSSSTKKTQLQLEHLLLDLQMILNGINNYKNPKLTAMLT<br>AKFAMPKKATELKHLQCLEEALKPLEEVLNLAQSKNFHLRPRDLISNINVIVLELKGSET<br>TFMCEYADETATIVEFLNRWITFCQSIISTLT |

TABLE 1-continued Amino acid sequences of mRNA encoded and expressed proteins.

| | |
|---|---|
| hAIb-hIL2_A2<br>SEQ ID NO: 10 | MKWVTFISLLFLFSSAYSRGVFRRDAHKSEVAHRFKDLGEENFKALVLIAFAQYLQQCPF<br>EDHVKLVNEVTEFAKTCVADESAENCDKSLHTLFGDKLCTVATLRETYGEMADCCAKQEP<br>ERNECFLQHKDDNPNLPRLVRPEVDVMCTAFHDNEETFLKKYLYEIARRHPYFYAPELLF<br>FAKRYKAAFTECCQAADKAACLLPKLDELRDEGKASSAKQRLKCASLQKFGERAFKAWAV<br>ARLSQRFPKAEFAEVSKLVTDLTKVHTECCHGDLLECADDRADLAKYICENQDSISSKLK<br>ECCEKPLLEKSHCIAEVENDEMPADLPSLAADFVESKDVCKNYAEAKDVFLGMFLYEYAR<br>RHPDYSVVLLLRLAKTYETTLEKCCAAADPHECYAKVFDEFKPLVEEPQNLIKQNCELFE<br>QLGEYKFQNALLVRYTKKVPQVSTPTLVEVSRNLGKVGSKCCKHPEAKRMPCAEDYLSVV<br>LNQLCVLHEKTPVSDRVTKCCTESLVNRRPCFSALEVDETYVPKEFNAETFTFHADICTL<br>SEKERQIKKQTALVELVKHKPKATKEQLKAVMDDFAAFVEKCCKADDKETCFAEEGKKLV<br>AASQAALGLGGSGGGGSGGAPTSSSTKKTQLQLEHLLLDLQMILNGINNYKNPALTRMLT<br>FAFYMPKKATELKHLQCLEAELKPLEEVLNLAQSKNFHLRPRDLISNINIVLELKGSET<br>TFMCEYADETATIVEFLNRWITFCQSIISTLT |
| hAIb-hIL2_A3<br>SEQ ID NO:<br>11 | MKWVTFISLLFLFSSAYSRGVFRRDAHKSEVAHRFKDLGEENFKALVLIAFAQYLQQCPF<br>EDHVKLVNEVTEFAKTCVADESAENCDKSLHTLFGDKLCTVATLRETYGEMADCCAKQEP<br>ERNECFLQHKDDNPNLPRLVRPEVDVMCTAFHDNEETFLKKYLYEIARRHPYFYAPELLF<br>FAKRYKAAFTECCQAADKAACLLPKLDELRDEGKASSAKQRLKCASLQKFGERAFKAWAV<br>ARLSQRFPKAEFAEVSKLVTDLTKVHTECCHGDLLECADDRADLAKYICENQDSISSKLK<br>ECCEKPLLEKSHCIAEVENDEMPADLPSLAADFVESKDVCKNYAEAKDVFLGMFLYEYAR<br>RHPDYSVVLLLRLAKTYETTLEKCCAAADPHECYAKVFDEFKPLVEEPQNLIKQNCELFE<br>QLGEYKFQNALLVRYTKKVPQVSTPTLVEVSRNLGKVGSKCCKHPEAKRMPCAEDYLSVV<br>LNQLCVLHEKTPVSDRVTKCCTESLVNRRPCFSALEVDETYVPKEFNAETFTFHADICTL<br>SEKERQIKKQTALVELVKHKPKATKEQLKAVMDDFAAFVEKCCKADDKETCFAEEGKKLV<br>AASQAALGLGGSGGGGSGGAPTSSSTKKTQLQLEHLLLDLQMILNGINNYKNPELTRMLT<br>FEFYMPKKATELKHLQCLEKELKPLEEVLNLAQSKNFHLRPRDLISNINIVLELKGSET<br>TFMCEYADETATIVEFLNRWITFCQSIISTLT |
| hAIb-hIL2_A4<br>SEQ ID NO:<br>12 | MKWVTFISLLFLFSSAYSRGVFRRDAHKSEVAHRFKDLGEENFKALVLIAFAQYLQQCPF<br>EDHVKLVNEVTEFAKTCVADESAENCDKSLHTLFGDKLCTVATLRETYGEMADCCAKQEP<br>ERNECFLQHKDDNPNLPRLVRPEVDVMCTAFHDNEETFLKKYLYEIARRHPYFYAPELLF<br>FAKRYKAAFTECCQAADKAACLLPKLDELRDEGKASSAKQRLKCASLQKFGERAFKAWAV<br>ARLSQRFPKAEFAEVSKLVTDLTKVHTECCHGDLLECADDRADLAKYICENQDSISSKLK<br>ECCEKPLLEKSHCIAEVENDEMPADLPSLAADFVESKDVCKNYAEAKDVFLGMFLYEYAR<br>RHPDYSVVLLLRLAKTYETTLEKCCAAADPHECYAKVFDEFKPLVEEPQNLIKQNCELFE<br>QLGEYKFQNALLVRYTKKVPQVSTPTLVEVSRNLGKVGSKCCKHPEAKRMPCAEDYLSVV<br>LNQLCVLHEKTPVSDRVTKCCTESLVNRRPCFSALEVDETYVPKEFNAETFTFHADICTL<br>SEKERQIKKQTALVELVKHKPKATKEQLKAVMDDFAAFVEKCCKADDKETCFAEEGKKLV<br>AASQAALGLGGSGGGGSGGAPTSSSTKKTQLQLEHLLLDLQMILNGINNYKNPKLTRMLT<br>FEFYMPKKATELKHLQCLEKELKPLEEVLNLAQSKNFHLRPRDLISNINIVLELKGSET<br>TFMCEYADETATIVEFLNRWITFCQSIISTLT |
| hAIb-hIL2_A5<br>SEQ ID NO: 13 | MKWVTFISLLFLFSSAYSRGVFRRDAHKSEVAHRFKDLGEENFKALVLIAFAQYLQQCPF<br>EDHVKLVNEVTEFAKTCVADESAENCDKSLHTLFGDKLCTVATLRETYGEMADCCAKQEP<br>ERNECFLQHKDDNPNLPRLVRPEVDVMCTAFHDNEETFLKKYLYEIARRHPYFYAPELLF<br>FAKRYKAAFTECCQAADKAACLLPKLDELRDEGKASSAKQRLKCASLQKFGERAFKAWAV<br>ARLSQRFPKAEFAEVSKLVTDLTKVHTECCHGDLLECADDRADLAKYICENQDSISSKLK<br>ECCEKPLLEKSHCIAEVENDEMPADLPSLAADFVESKDVCKNYAEAKDVFLGMFLYEYAR<br>RHPDYSVVLLLRLAKTYETTLEKCCAAADPHECYAKVFDEFKPLVEEPQNLIKQNCELFE<br>QLGEYKFQNALLVRYTKKVPQVSTPTLVEVSRNLGKVGSKCCKHPEAKRMPCAEDYLSVV<br>LNQLCVLHEKTPVSDRVTKCCTESLVNRRPCFSALEVDETYVPKEFNAETFTFHADICTL<br>SEKERQIKKQTALVELVKHKPKATKEQLKAVMDDFAAFVEKCCKADDKETCFAEEGKKLV<br>AASQAALGLGGSGGGGSGGAPTSSSTKKTQLQLEHLLLDLQMILNGINNYKNPKLTRMLT<br>FKFYMPKKATELKHLQCLEKELKPLEEVLNLAQSKNFHLRPRDLISNINIVLELKGSET<br>TFMCEYADETATIVEFLNRWITFCQSIISTLT |
| hAIb-hIL2_A6<br>SEQ ID NO: 14 | MKWVTFISLLFLFSSAYSRGVFRRDAHKSEVAHRFKDLGEENFKALVLIAFAQYLQQCPF<br>EDHVKLVNEVTEFAKTCVADESAENCDKSLHTLFGDKLCTVATLRETYGEMADCCAKQEP<br>ERNECFLQHKDDNPNLPRLVRPEVDVMCTAFHDNEETFLKKYLYEIARRHPYFYAPELLF<br>FAKRYKAAFTECCQAADKAACLLPKLDELRDEGKASSAKQRLKCASLQKFGERAFKAWAV<br>ARLSQRFPKAEFAEVSKLVTDLTKVHTECCHGDLLECADDRADLAKYICENQDSISSKLK<br>ECCEKPLLEKSHCIAEVENDEMPADLPSLAADFVESKDVCKNYAEAKDVFLGMFLYEYAR<br>RHPDYSVVLLLRLAKTYETTLEKCCAAADPHECYAKVFDEFKPLVEEPQNLIKQNCELFE<br>QLGEYKFQNALLVRYTKKVPQVSTPTLVEVSRNLGKVGSKCCKHPEAKRMPCAEDYLSVV<br>LNQLCVLHEKTPVSDRVTKCCTESLVNRRPCFSALEVDETYVPKEFNAETFTFHADICTL<br>SEKERQIKKQTALVELVKHKPKATKEQLKAVMDDFAAFVEKCCKADDKETCFAEEGKKLV<br>AASQAALGLGGSGGGGSGGAPTSSSTKKTQLQLEHLLLDLQMILNGINNYKNPKLTRMLT<br>FKFYMPKKATELKHLQCLEEEKLKPLEEVLNLAQSKNFHLRPRDLISNINIVLELKGSET<br>TFMCEYADETATIVEFLNRWITFCQSIISTLT |
| hAIb-hIL2s<br>SEQ ID NO: 20 | MKWVTFISLLFLFSSAYSRGVFRRDAHKSEVAHRFKDLGEENFKALVLIAFAQYLQQCPF<br>EDHVKLVNEVTEFAKTCVADESAENCDKSLHTLFGDKLCTVATLRETYGEMADCCAKQEP<br>ERNECFLQHKDDNPNLPRLVRPEVDVMCTAFHDNEETFLKKYLYEIARRHPYFYAPELLF<br>FAKRYKAAFTECCQAADKAACLLPKLDELRDEGKASSAKQRLKCASLQKFGERAFKAWAV<br>ARLSQRFPKAEFAEVSKLVTDLTKVHTECCHGDLLECADDRADLAKYICENQDSISSKLK<br>ECCEKPLLEKSHCIAEVENDEMPADLPSLAADFVESKDVCKNYAEAKDVFLGMFLYEYAR<br>RHPDYSVVLLLRLAKTYETTLEKCCAAADPHECYAKVFDEFKPLVEEPQNLIKQNCELFE |

TABLE 1-continued

Amino acid sequences of mRNA encoded and expressed proteins.

```
                QLGEYKFQNALLVRYTKKVPQVSTPTLVEVSRNLGKVGSKCCKHPEAKRMPCAEDYLSVV
                LNQLCVLHEKTPVSDRVTKCCTESLVNRRPCFSALEVDETYVPKEFNAETFTFHADICTL
                SEKERQIKKQTALVELVKHKPKATKEQLKAVMDDFAAFVEKCCKADDKETCFAEEGKKLV
                AASQAALGLGGSGGGGSGGAPTSSSTKKTQLQLEHLLLDLQMILNGINNYKNPKLTRMLT
                FKFYMPKKATELKHLQCLEEELKPLEEVLNLAQSKNFHFDPRDVVSNINVFVLELKGSET
                TFMCEYADETATIVEFLNRWITFCQSIISTLT hAIb-hIL2_A4s   MKWVTFISLLFLFSSAYSRGVFRRDAHKSEVAHRFKDLGEENFKALVLIAFAQYLQQCPF
SEQ ID NO: 15   EDHVKLVNEVTEFAKTCVADESAENCDKSLHTLFGDKLCTVATLRETYGEMADCCAKQEP
                ERNECFLQHKDDNPNLPRLVRPEVDVMCTAFHDNEETFLKKYLYEIARRHPYFYAPELLF
                FAKRYKAAFTECCQAADKAACLLPKLDELRDEGKASSAKQRLKCASLQKFGERAFKAWAV
                ARLSQRFPKAEFAEVSKLVTDLTKVHTECCHGDLLECADDRADLAKYICENQDSISSKLK
                ECCEKPLLEKSHCIAEVENDEMPADLPSLAADFVESKDVCKNYAEAKDVFLGMFLYEYAR
                RHPDYSWLLLRLAKTYETTLEKCCAAADPHECYAKVFDEFKPLVEEPQNLIKQNCELFE
                QLGEYKFQNALLVRYTKKVPQVSTPTLVEVSRNLGKVGSKCCKHPEAKRMPCAEDYLSVV
                LNQLCVLHEKTPVSDRVTKCCTESLVNRRPCFSALEVDETYVPKEFNAETFTFHADICTL
                SEKERQIKKQTALVELVKHKPKATKEQLKAVMDDFAAFVEKCCKADDKETCFAEEGKKLV
                AASQAALGLGGSGGGGSGGAPTSSSTKKTQLQLEHLLLDLQMILNGINNYKNPKLTRMLT
                FEFYMPKKATELKHLQCLEKELKPLEEVLNLAQSKNFHFDPRDVVSNINVFVLELKGSET
                TFMCEYADETATIVEFLNRWITFCQSIISTLT hAIb-hIL2_A6s   MKWVTFISLLFLFSSAYSRGVFRRDAHKSEVAHRFKDLGEENFKALVLIAFAQYLQQCPF
SEQ ID NO: 16   EDHVKLVNEVTEFAKTCVADESAENCDKSLHTLFGDKLCTVATLRETYGEMADCCAKQEP
                ERNECFLQHKDDNPNLPRLVRPEVDVMCTAFHDNEETFLKKYLYEIARRHPYFYAPELLF
                FAKRYKAAFTECCQAADKAACLLPKLDELRDEGKASSAKQRLKCASLQKFGERAFKAWAV
                ARLSQRFPKAEFAEVSKLVTDLTKVHTECCHGDLLECADDRADLAKYICENQDSISSKLK
                ECCEKPLLEKSHCIAEVENDEMPADLPSLAADFVESKDVCKNYAEAKDVFLGMFLYEYAR
                RHPDYSWVLLLRLAKTYETTLEKCCAAADPHECYAKVFDEFKPLVEEPQNLIKQNCELFE
                QLGEYKFQNALLVRYTKKVPQVSTPTLVEVSRNLGKVGSKCCKHPEAKRMPCAEDYLSVV
                LNQLCVLHEKTPVSDRVTKCCTESLVNRRPCFSALEVDETYVPKEFNAETFTFHADICTL
                SEKERQIKKQTALVELVKHKPKATKEQLKAVMDDFAAFVEKCCKADDKETCFAEEGKKLV
                AASQAALGLGGSGGGGSGGAPTSSSTKKTQLQLEHLLLDLQMILNGINNYKNPKLTRMLT
                FKFYMPKKATELKHLQCLEEKLKPLEEVLNLAQSKNFHFDPRDVVSNINVFVLELKGSET
                TFMCEYADETATIVEFLNRWITFCQSIISTLT
```

Example 2: In Vitro Expression and IL2Rβγ Binding of RNA-Encoded IL2 Variants

In vitro expression of the generated mRNAs was analyzed by lipofection of the mRNA into HEK293T/17 cells and subsequent analysis of the CD25-independent activation of IL2Rβγ-expressing reporter cells by the IL2 mutCD25 variants (FIG. 1). One day prior to lipofection, $1.2 \times 10^6$ HEK293T/17 cells were seeded in 3 mL DMEM (Life Technologies GmbH, cat. no. 31966-021)+10% fetal bovine serum (FBS, Biochrom GmbH, cat. no. S0115) in 6-well plates. For lipofection, 3 µg mRNA was formulated under sterile and RNase-free conditions using 400 ng mRNA per µL Lipofectamine MessengerMax (Thermo Fisher Scientific, cat. No. LMRNA015) and applied per 10 cm² culture dish to the HEK293T/17 cells at approximately 80% confluence. After 20 h of expression, supernatants were collected under sterile conditions and stored at −20° C. until further use. The IL2Rβγ-dependent bioactivity of the IL2 mutCD25 variants was assessed by measuring specific proliferation responses of the intermediate-affinity IL2 receptor (IL2Rβγ) expressing TF-1_IL2Rβγ cells. This cell line was generated from TF-1 cell line (ATCC CRL-2003), a human erythroleukemic cell line naturally expressing the IL2R common γ-chain, by transduction with retroviral vector encoding for the sequence of the human IL2Rβ chain (Gene ID: 3560) analogous to Farner, N. L. et al. Blood 86, 4568-4578 (1995). In short, TF-1_IL2Rβγ cells were washed two times with D-PBS and resuspended in RPMI 1640 (Life Technologies GmbH, cat. no. 61870010) supplemented with 10% fetal bovine serum (FBS; Biochrom GmbH, cat. no. S0115) and 1 mM sodium pyruvate (Life Technologies GmbH, cat. no. 11360070). A total of 5,000 cells/well were seeded in white 96-well flat-bottom plates (Fisher Scientific GmbH, cat. no. 10072151) and were incubated with four-fold serial dilutions of IL2 variant-containing supernatants. After three days of culture proliferation was measured by quantitating viable cells via ATP amount using the CellTiter-Glo® 2.0 Assay (Promega, cat. no. G9242). Luminescence was recorded on a Tecan Infinite® F200 PRO reader (Tecan Deutschland GmbH) and dose-response curves were plotted in GraphPad Prism version 6.04 (GraphPad Software, Inc.).

Example 3: Binding of RNA-Encoded IL2 mutCD25 Variants to Recombinant CD25 (IL2Rα)

Figure 2:
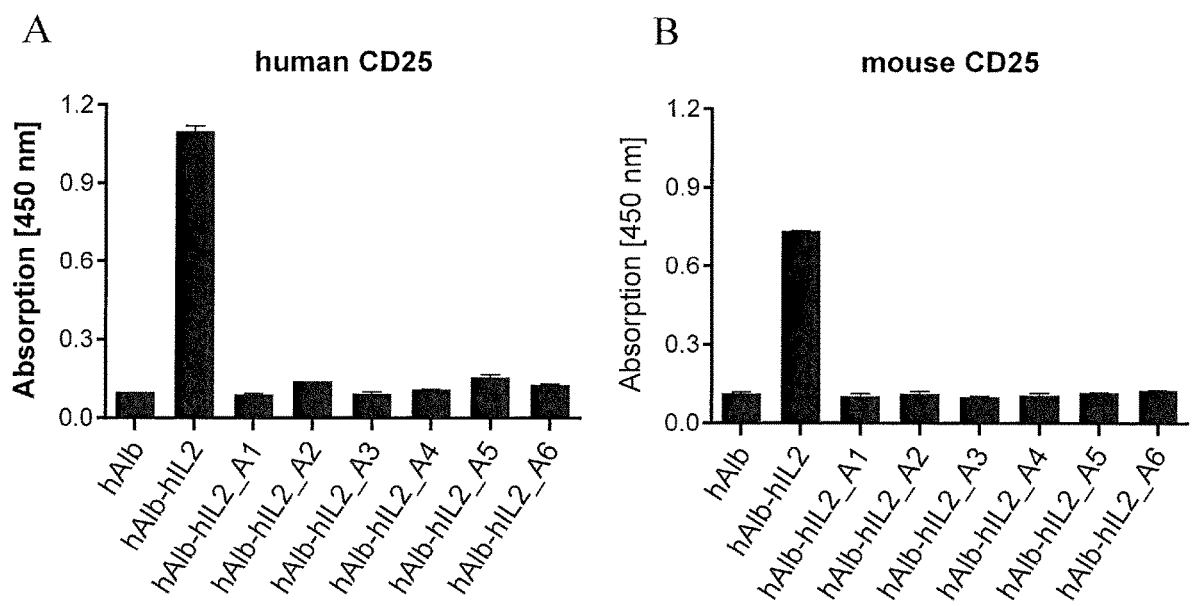
FIG. 2: CD25 binding of IL2 mutCD25 variants. 100 ng plate-bound recombinant human CD25 (A) or mouse CD25 (B) was incubated with 1:2 diluted IL2 variant-containing supernatants from lipofection of HEK293T/17 and bound protein was detected via an HRP-conjugated anti-human Serum Albumin antibody. Supernatants of HEK293T/17 cells lipofected with mRNA encoding for hAlb only were used as negative control. Data shown are mean±SD of n=2 technical replicates.

Binding of mRNA-encoded IL2 mutCD25 variants to recombinant CD25 was analyzed by ELISA (FIG. 2). Here, 1 µg/mL recombinant human or mouse CD25 (C-Fc, Novoprotein cat no. CJ78, CK32) was coated in 100 µL DPBS to high protein-binding 96-well plates (Nunc MaxiSorp™, Thermo Fisher Scientific, cat. no. 439454). IL2 variant-containing supernatants generated by lipofection of HEK-293-T-17 (as described in Example 2) were applied to coated CD25 and bound protein was detected via an HRP-conjugated anti-human Serum Albumin antibody (Abcam, cat. no. ab8941). General ELISA reagents and procedures were applied according to the protocol of DuoSet ELISA Ancillary Reagent Kit 2 (R&D Systems, cat. No. DY008).

Wild type hAlb-hIL2 bound strongly to both human and mouse CD25 as depicted in FIG. 2. In terms of human CD25, binding was completely forfeited for mutCD25 variants A1, A3, A4 and A6, while the variants A2 and A5 showed some residual binding to human CD25 (FIG. 2A). In contrast, all mutCD25 variants lost the ability to bind to mouse CD25 (FIG. 2B).

Figure 3:
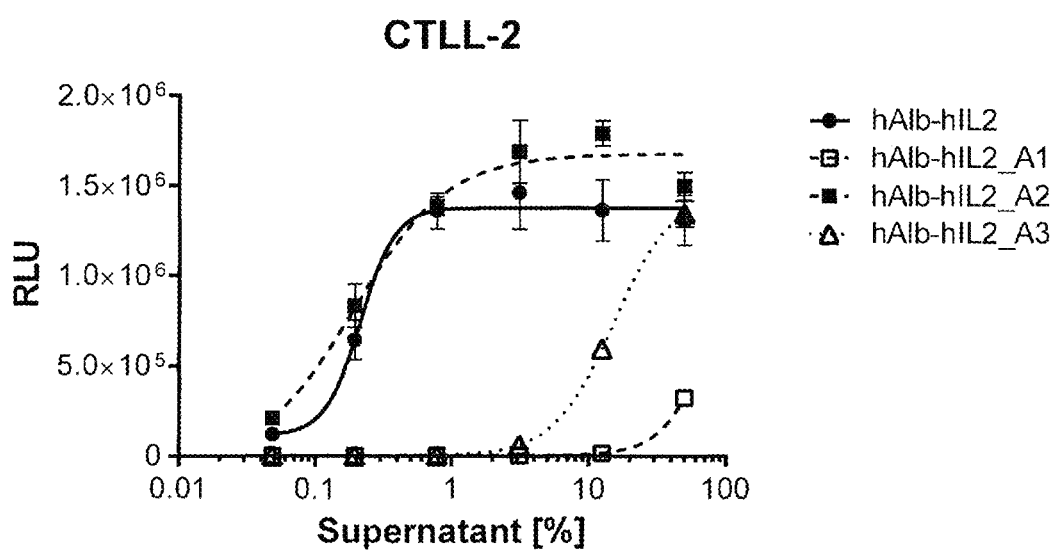
FIG. 3: Bioactivity of IL2 mutCD25 variants in high-affinity IL2 receptor (IL2Rαβγ)-dependent cell culture. Proliferation responses of the CD25high mouse T cell line CTLL-2 are shown. Cells were incubated for three days with a serial dilution of IL2 variant-containing supernatants and proliferation was measured by quantitating viable cells via ATP amount using the CellTiter-Glo® 2.0 Assay. Data shown are mean±SD of n=2-3 technical replicates fitted with a four parameter logarithmic fit to calculate $EC_{50}$ values. RLU=relative luminescence units.
Figure 3:
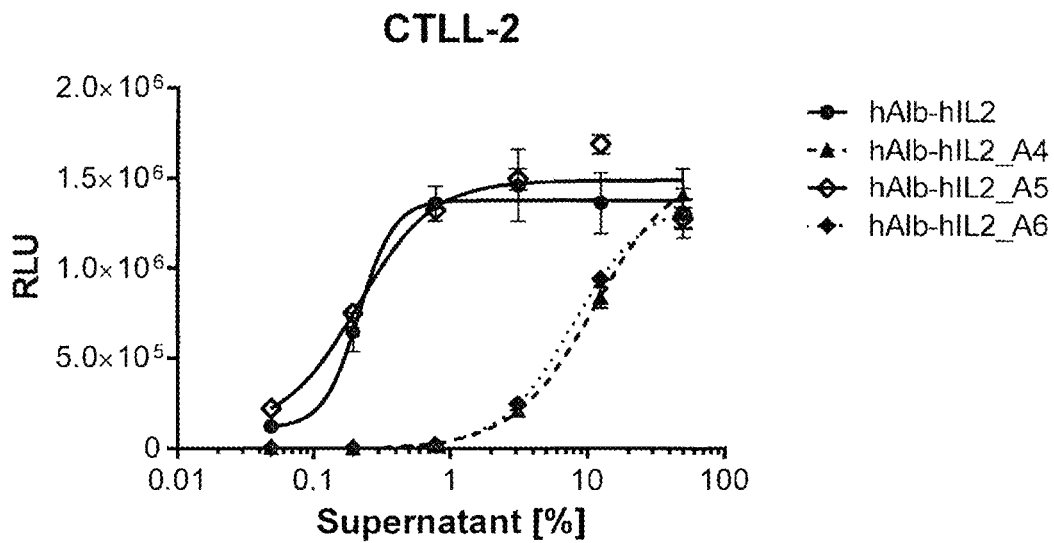

Example 4: Bioactivity of RNA-Encoded IL2 mutCD25 Variants on CD25-Dependent CTLL-2 Proliferation The biological activity of IL2 mutCD25 variants was assessed by analyzing the cytokine-dependent proliferation of murine CTLL-2 cells (Mouse C57BL/6 T cell line, ATCC TIB-214) highly expressing CD25 (FIG. 3). In short, CTLL-2 cells were harvested, washed twice with DPBS to remove any residual IL2 and resuspended in RPMI 1640 (Life Technologies GmbH, cat. no. 61870010) supplemented with 10% fetal bovine serum (FBS; Biochrom GmbH, cat. no. S0115) and 1 mM sodium pyruvate (Life Technologies GmbH, cat. no. 11360070). A total of 5,000 cells/well were seeded in white 96-well flat-bottom plates (Fisher Scientific GmbH, cat. no. 10072151) and incubated with four-fold serially diluted IL2 variant-containing supernatants (as described in Example 2). After three days of culture proliferation was measured by quantitating viable cells via ATP amount using the CellTiter-Glo® 2.0 Assay (Promega, cat. no. G9242). Luminescence was recorded on a Tecan Infinite® F200 PRO reader (Tecan Deutschland GmbH) and dose-response curves were plotted in GraphPad Prism version 6.04 (GraphPad Software, Inc.).

Wild type hALb-hIL2 induced proliferation of CTLL-2 cells in a dose-dependent manner with a half-maximal effective concentration (EC50) of 0.2144%-supernatant (FIG. 3). The mutCD25 variants A2 and A5 performed on par with wild type hAlb-hIL2, also reflected by the EC50 values ranging between 0.1933%-supernatant and 0.2127%-supernatant, respectively. In contrast, the IL2 variants A1 showed an approx. 1000-fold decrease in EC50 value, resulting in being nearly devoid of any biological activity on CTLL-2 cells. Variants A3, A4 and A6, however, induced proliferation of CTLL-2 cells with EC50 values ranging between 15.10%-supernatant for A3, 11.43%-supernatant for A4 and 7.785%-supernatant for A6, thereby featuring intermediate biological activity that is approx. 50-fold decreased compared to wild type hAlb-hIL2 (FIG. 3).

Example 5: Bioactivity of RNA-Encoded IL2 Variants on Human PBMC Proliferation In order to measure peripheral blood mononuclear cell (PBMC) proliferation, PBMCs were incubated with a sub-optimal concentration of anti-CD3 antibody (clone UCHT1) and supernatants derived from lipofections of HEK293T/17 with mRNA encoding IL2 variants or control supernatants. In short, PBMCs were obtained from buffy coats of healthy donors by Ficoll-Paque (VWR international, cat. no. 17-1440-03) density gradient separation. PBMCs were labeled using 1.6 µM carboxyfluorescein succinimidyl ester (CFSE; Thermo Fisher, cat. no. C34564). 75,000 CFSE-labeled PBMCs were seeded per well in a 96-well round-bottom plate (Costar, cat. no. 734-1797) in Iscove's Modified Dulbecco's Medium (IMDM; Life Technologies GmbH, cat. no. 12440-053) supplemented with 5% plasma-derived human serum (PHS; One Lambda Inc., cat. no. A25761) and incubated with a sub-optimal concentration of anti-CD3 antibody (clone UCHT1; R&D Systems, cat. no. MAB100; 0.03-0.09 µg/mL final concentration) that was pre-determined for each donor. In parallel, four-fold serial dilutions of IL2 variant-containing supernatants (see Example 2) were generated in IMDM supplemented with 5% PHS. Seeded cells were mixed 1:1 (referring to the volume of the culture medium of the seeded cells) with IL2 variant supernatants and stimulated for four days at 37° C., 5% $CO_2$. PBMCs were harvested and analyzed by flow cytometry. Cells were stained with the following reagents all diluted 1:100 in FACS-buffer (D-PBS containing 5% FBS and 5 mM EDTA): anti-human CD4-PE (TONBO Bioscience, cat. 50-0049), anti-human CD8-PE (TONBO Bioscience, cat. 50-0088), anti-human CD56-APC (eBioscience, cat. no. 17-0567-42) and 7-AAD (Beckman Coulter, cat. no. A07704). Flow cytometric analysis was performed on a BD FACSCanto™ II flow cytometer (Becton Dickinson) with CFSE dilution as proliferation read-out. Acquired proliferation data were analyzed using FlowJo 10.4 software and exported expansion index values were used to plot dose-response curves in GraphPad Prism version 6.04 (GraphPad Software, Inc.).

Figure 4:
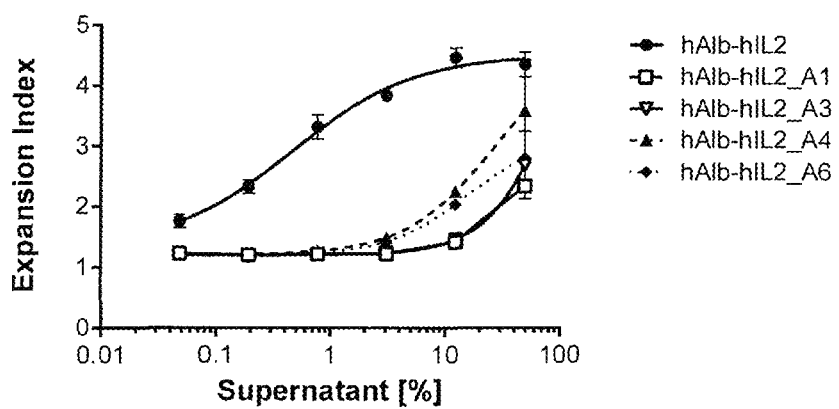
FIG. 4: Bioactivity of IL2 variants on different T cell subsets in human PBMCs measured by IL2-mediated enhancement of antigen-unspecific proliferation. CFSE-labeled PBMCs were incubated with a sub-optimal concentration of anti-CD3 antibody (clone UCHT1) and serial dilutions of IL2 variant-containing supernatants for four days. Proliferation of CD4+ T cells (A and D), CD8+ T cells (B and E) and CD56+ NK cells (C and F) was measured by flow cytometry. Data is shown from one representative donor as mean values of expansion index as calculated using FlowJo v10.4 software and fitted with a four parameter logarithmic fit. Error bars (SD) indicate the variation within the experiment (three replicates, using cells from one donor).
Figure 4:
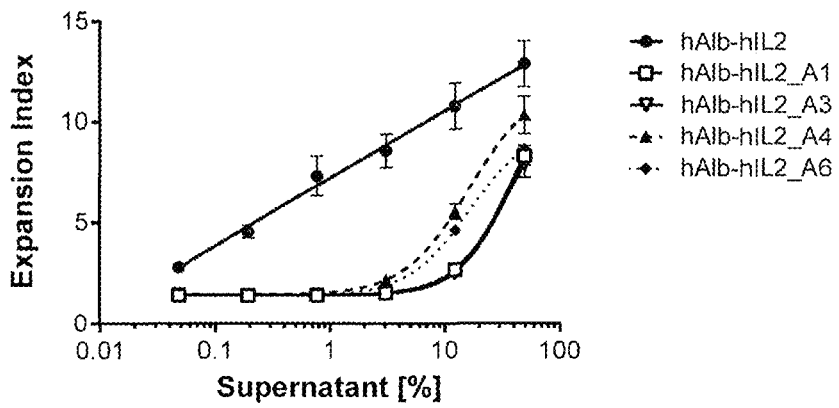
Figure 4:
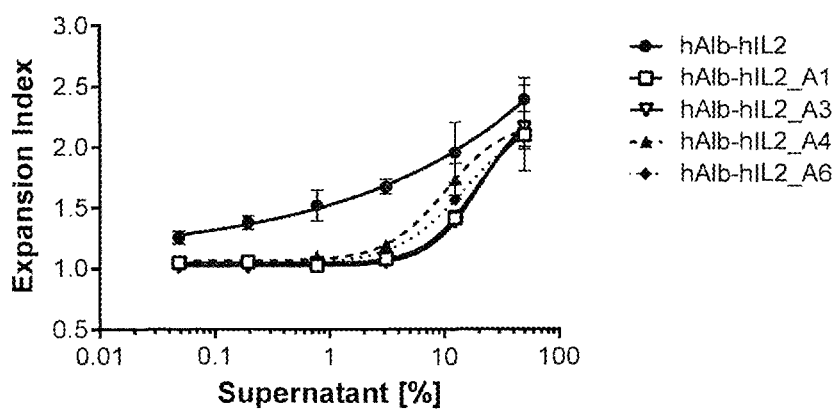
Figure 4:
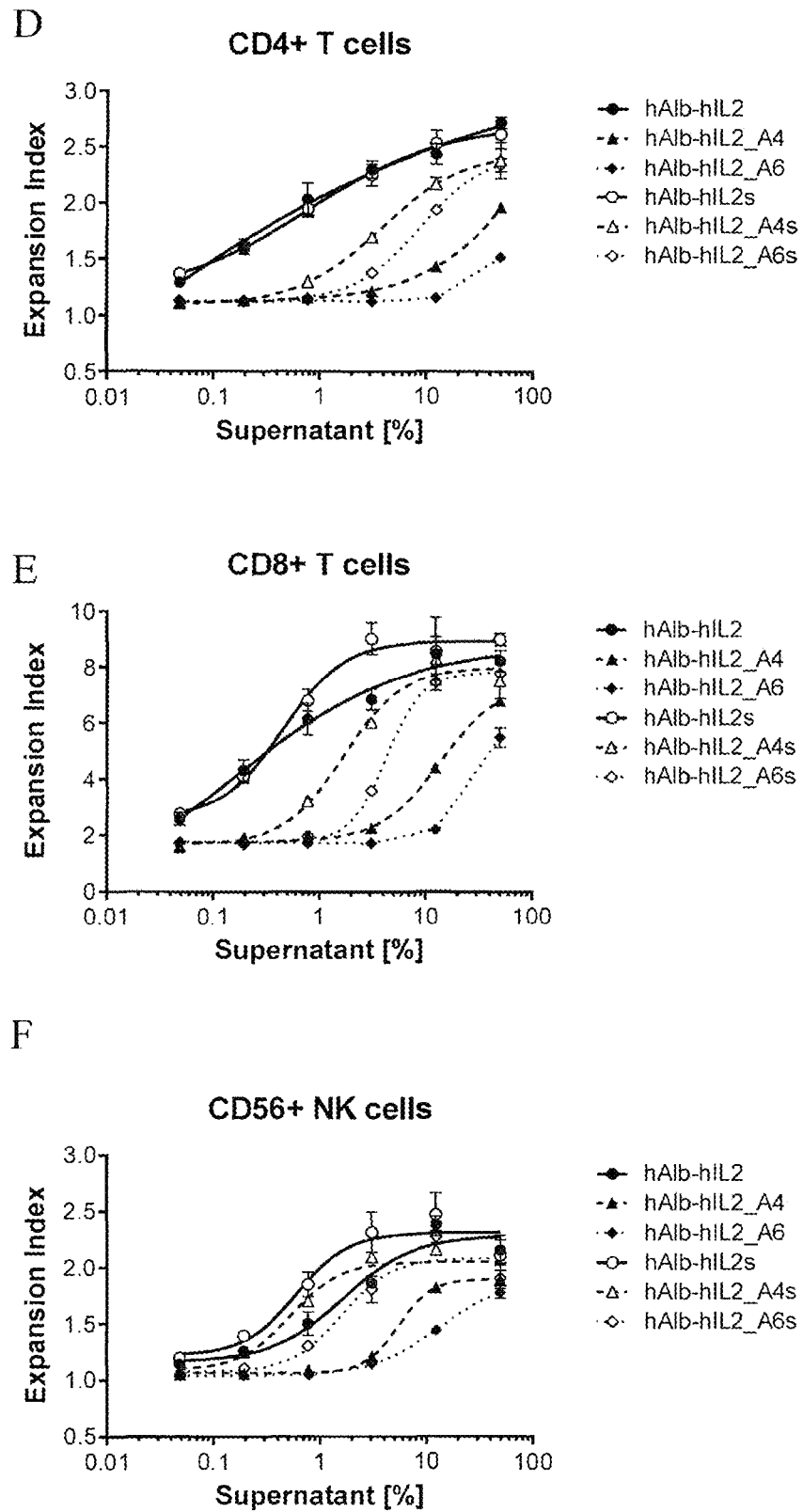

Besides variants hAlb-hIL2_A2 and hAlb-hIL2_A5, which performed identical to wild type IL2 in high-affinity IL2Rαβγ-dependent CTLL-2 proliferation assays, all other mutants were analyzed in an antigen-unspecific proliferation assay with human bulk PBMCs. Wild type hAlb-hIL2 showed superior biological activity compared to all other IL2 variants by strongly enhancing the CD3-induced proliferation of CD4+ T cells (FIG. 4A), CD8+ T cells (FIG. 4B) as well as CD56+ NK cells (FIG. 4C). All tested variants with diminished CD25 binding capacity displayed an intermediate phenotype. Variants hAlb-hIL2_A4 and hAlb-hIL2_A6 performed comparable with an approx. 50-fold reduction in potency compared to wild type hAlb-hIL2, whereas hAlb-hIL2_A1 and hAlb-hIL2_A3 showed superimposable dose-response curves with an even stronger shift towards decreased biological activity, i.e. approx. 75-fold lower bioactivity than hAlb-hIL2. The observed differences for the described variants were comparable in-between all three evaluated lymphocyte subsets, but NK cell proliferation was in general less pronounced than T cell proliferation. hAlb-hIL2_A4 and hAlb-hIL2_A6 with intermediate phenotype were further compared with variants additionally containing the mutβγ mutations that were described to increase binding to the IL2Rβγ complex (see also Example 1). On both CD4+ and CD8+ T cells hAlb-hIL2 displayed superior biological activity that was not boostable by the addition of the mutβγ mutations, also reflected in the calculated EC50 values (Table 2). The mutCD25 variant hAlb-hIL2_A4 showed a decrease in biological activity of approx. 50-fold on CD4+ T cells and 100-fold on CD8+ T cells compared to hAlb-hIL2. The potency of the other mutCD25 variant hAlb-hIL2_A6 was in comparison to hAlb-hIL2_A4 even 2-fold further reduced on both T cell subsets. Addition of the mutβγ mutations, however, boosted the biological activity of both mutCD25 variants (i.e. hAlb-hIL2_A4 and hAlb-hIL2_A6) on CD4+ and CD8+ T cells, as a consequence resulting in an only 4- to 7-fold decreased bioactivity of hAlb-hIL2_A4s and a 9- to 16-fold decreased bioactivity of hAlb-hIL2_A6s compared to hAlb-hIL2 and hAlb-hIL2s (FIGS. 4D and E, Table 2). On CD56+ NK cells, mutβγ variant hAlb-hIL2s exhibited highest bioactivity, slightly exceeding the biological activity of wild type hAlb-hIL2 (EC50 values of 0.6084 and 1.662%-supernatant, respectively, see Table 2). In contrast to CD4+ and CD8+ T cells, on CD56+ NK cells the potency of mutCD25 variants hAlb-hIL2_A4 und hAlb-hIL2_A6 was only 3-8-fold reduced compared the hAlb-hIL2. Addition of the mutβγ mutations to hAlb-hIL2_A4 and hAlb-hIL2_A6 restored the biological activity of variants hAlb-hIL2_A4s and hAlb-hIL2_A6s it to the level of wild type hAlb-hIL2 (FIG. 4 F).

TABLE 2

EC50 values [%-supernatant] of the hAlb-hIL2 variants in whole PBMC lymphocyte subsets derived from human PBMC proliferation dose-responses.

| IL2 variant | CD4+ T cells | CD8+ T cells | CD56+ NK cells |
|---|---|---|---|
| hAlb-hIL2 | 0.5455 | 0.1524 | 1.662 |
| hAlb-hIL2s | 0.5414 | 0.4578 | 0.6084 |
| hAlb-hIL2_A4 | n.d. | 14.06 | 5.472 |
| hAlb-hIL2_A4s | 3.801 | 1.701 | 0.5326 |
| hAlb-hIL2_A6 | n.d. | n.d. | 13.64 |
| hAlb-hIL2_A6s | 8.883 | 4.317 | 1.617 |

Figure 5:
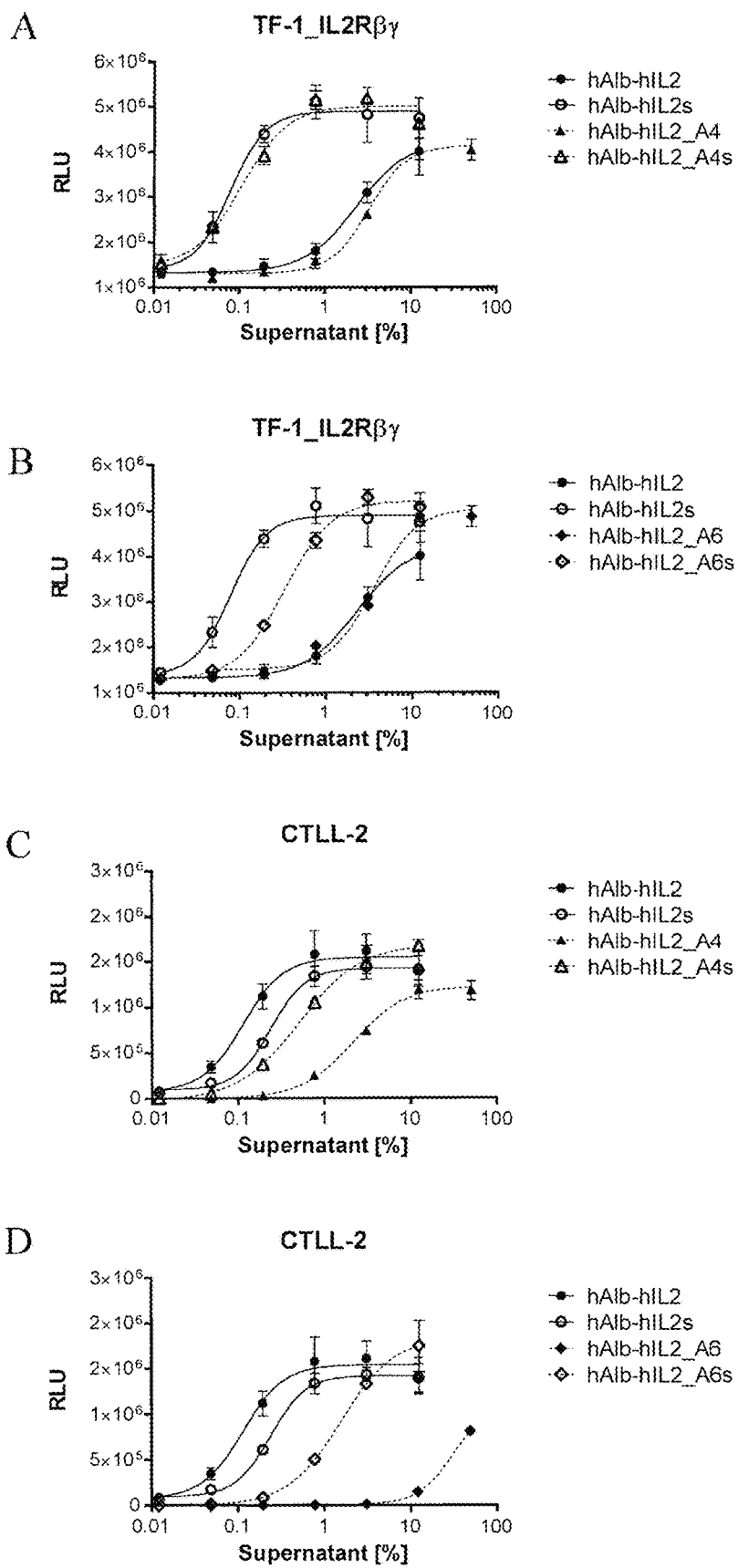
FIG. 5: Relative bioactivity of different IL2 variants in intermediate-affinity IL2 receptor (IL2Rβγ) versus high-affinity IL2 receptor (IL2Rαβγ)-dependent cell culture. Proliferation responses of (A-B) the intermediate-affinity IL2 receptor (IL2Rβγ) expressing human cell line TF-1_IL2Rβγ and (C-D) the high-affinity IL2 receptor (IL2Rαβγ)-expressing mouse T cell line CTLL-2 are shown. Cell cultures were incubated for three days with a serial dilution of IL2 variant-containing supernatant and proliferation was measured by quantitating viable cells via ATP amount using the CellTiter-Glo® 2.0 Assay. Data shown are mean±SD of n=2-3 technical replicates fitted with a four parameter logarithmic fit to calculate $EC_{50}$ values. RLU=relative luminescence units

Example 6: Comparison of the Relative Bioactivity of Different IL2 Variants in Intermediate-Affinity IL2 Receptor (IL2Rβγ) Versus High-Affinity IL2 Receptor (IL2Rαβγ)-Expressing IL2-Dependent Reporter Cell Lines To dissect the role of the IL2Rα chain (CD25) as a determinant for the biological activity of the different IL2 variants, the specific proliferation responses of the high-affinity IL2 receptor (IL2Rαβγ)-expressing mouse T cell line CTLL-2 were compared to the intermediate-affinity IL2 receptor (IL2Rβγ) expressing TF-1_IL2Rβγ cells, a human erythroleukemic cell line that naturally expresses the IL2R common γ-chain being transduced to also express the IL2Rβ chain (see example 2). In short, CTLL-2 as well as TF-1_IL2Rβγ cells were washed two times with D-PBS, and resuspended in RPMI 1640 (Life Technologies GmbH, cat. no. 61870010) supplemented with 10% fetal bovine serum (FBS; Biochrom GmbH, cat. no. S0115), and 1 mM sodium pyruvate (Life Technologies GmbH, cat. no. 11360070). A total of 5,000 cells/well were seeded in white 96-well flat-bottom plates (Fisher Scientific GmbH, cat. no. 10072151) and were incubated with five four-fold serial dilutions of IL2 variant-containing supernatants (as described in Example 2). After three days of culture proliferation was measured by quantitating viable cells via ATP amount using the CellTiter-Glo® 2.0 Assay (Promega, cat. no. G9242). Luminescence was recorded on a Tecan Infinite® F200 PRO reader (Tecan Deutschland GmbH) and dose-response curves were plotted as well as EC50 values calculated in GraphPad Prism version 6.04 (GraphPad Software, Inc.). hAlb-hIL2 as well as the hAlb-hIL2 mutCD25 variants with reduced CD25 binding affinity (i.e. hAlb-hIL2_A4 and _A6) performed on par on CD25-independent, IL2Rβγ-expressing TF-1_IL2Rβγ cells with nearly super-imposable dose-response curves (FIG. 5A,B). This is also reflected in the calculated EC50 values, ranging from 2.352%-supernatant for hAlb-hIL2 to 3.657%-supernatant for hAlb-hIL2_A6 (Table 3). Moreover, the mutβγ variants with enhanced binding affinity to IL2Rβ (i.e. hAlb-hIL2s, hAlb-hIL2_A4s, hAlb-hIL2_A6s) showed a 10-30-fold shift towards increased biological activity as expected with comparable EC50 values for hAlb-hIL2s and hAlb-hIL2A4s (0.080 and 0.107%-supernatant, respectively) as well as a slightly lower activity of hAlb-hIL2_A6s (EC50=0.338%-supernatant).

In striking contrast, strong differences in-between hAlb-hIL2 and hAlb-hIL2 variants can be seen in CD25-dependent, IL2Rαβγ-expressing CTLL-2 cultures (FIG. 5C,D). Here, hAlb-hIL2 displayed the highest biological activity that could not be further boosted by addition of the mutβγ mutations (Table 4; EC50 of 0.115 vs. 0.240%-supernatant for hAlb-hIL2 and hAlb-hIL2s). In comparison to hAlb-hIL2, the activity of hAlb-hIL2_A4 was reduced by approx. 19-fold (E50=2.19% supernatant) whereas for hAlb-hIL2_A6 it was reduced approx. 300-fold (EC50=33.72% supernatant). The corresponding mutβγ variants, hAlb-hIL2_A4s and hAlb-hIL2_A6s, showed an enhanced biological activity but were still less active than hAlb-hIL2 with EC50 values of 0.517 and 1.575, respectively.

TABLE 3

EC50 values [%-supernatant] of the hAlb-hIL2 variants in intermediate-affinity IL2 receptor (IL2Rβγ)-dependent cell culture derived from human TF-1_IL2Rβγ proliferation dose-responses. Ratios to obtain EC50 fold-reduction and fold-increase data compared to hAlb-hIL2 were calculated.

| IL2 variant | EC50 | EC50 fold-reduction over hAlb-hIL2 | EC50 fold-increase over hAlb-hIL2 |
|---|---|---|---|
| hAlb-hIL2 | 2.352 | — | — |
| hAlb-hIL2s | 0.080 | 29.400 | 0.034 |
| hAlb-hIL2_A4 | 3.304 | 0.712 | 1.405 |
| hAlb-hIL2_A4s | 0.107 | 21.981 | 0.045 |
| hAlb-hIL2_A6 | 3.657 | 0.64 | 1.555 |
| hAlb-hIL2_A6s | 0.338 | 6.96 | 0.144 |

TABLE 4

EC50 values [%-supernatant] of the hAlb-hIL2 variants in high-affinity IL2 receptor (IL2Rαβγ)-dependent cell culture derived from mouse CTLL-2 proliferation dose-responses. Ratios to obtain EC50 fold-reduction and fold-increase data compared to hAlb-hIL2 were calculated.

| IL2 variant | EC50 | EC50 fold-reduction over hAlb-hIL2 | EC50 fold-increase over hAlb-hIL2 |
|---|---|---|---|
| hAlb-hIL2 | 0.115 | — | — |
| hAlb-hIL2s | 0.240 | 0.480 | 2.087 |
| hAlb-hIL2_A4 | 2.190 | 0.050 | 19.043 |
| hAlb-hIL2_A4s | 0.517 | 0.220 | 4.496 |
| hAlb-hIL2_A6 | 33.720 | 0.003 | 293.217 |
| hAlb-hIL2_A6s | 1.575 | 0.073 | 13.696 |

Example 7: Comparison of the Activity of hAlb-hIL2 Variants on Different T Cell Subsets in Human PBMCs Using STAT5 Phosphorylation as Readout To assess the activity of hAlb-hIL2 variants on different T cell subsets that were either deficient in, or expressed CD25, whole human PBMCs were stimulated with hAlb-hIL2 variants and assayed for STAT5 phosphorylation at a range of cytokine dilutions. In short, PBMCs were obtained from buffy coats of healthy donors by Ficoll-Paque (VWR international, cat. no. 17-1440-03) density gradient separation. PBMCs were washed twice with D-PBS (Life Technologies GmbH, cat. no. 14190250) and collected by centrifugation for 5 min, 300×g at room temperature. PBMCs were re-suspended in Iscove's Modified Dulbecco's Medium (IMDM; Life Technologies GmbH, cat. no. 12440-053) supplemented with 10% fetal bovine serum (FBS; Biochrom GmbH, cat. no. S0115) and were rested for 1 h at 37° C. and 5% $CO_2$. Next, 100,000 PBMCs were seeded per well of a 96-well V-bottom plate (Greiner Bio-One GmbH, cat. no. 651101) in IMDM supplemented with 10% FBS and 2-fold PhosSTOP™ phosphatase inhibitor (Sigma-Aldrich, cat. no. 04906845001). In parallel, five four-fold serial dilutions of hAlb-hIL2 variant-containing supernatants (as described in Example 2) were generated in IMDM supplemented with 10% FBS. Seeded cells were mixed 1:1 (referring to the volume of the culture medium of the seeded cells)

with hAlb-hIL2 variant supernatants and stimulated for 10 min at 37° C. and 5% $CO_2$. Next, 1:1,000 fixable viability dye eFluor™ 780 was added and the cells stimulated for another 5 min at 37° C. and 5% $CO_2$. The cells were fixed by addition of formaldehyde (Carl Roth GmbH+Co. KG, cat. no. P087.4) to 2% and incubated for 10 min on ice. Fixed PBMCs were washed with ice cold D-PBS and permeabilized with 100% ice-cold methanol for 30 min on ice. Permeabilized PBMCs were washed twice with 1-fold Permeabilization Buffer (eBioscience Inc., cat. no. 00-8333-56) and subsequently stained with 1:5 Alexa Fluor® 488 Anti-Stat5 (pY694) (Becton Dickinson GmbH, cat. no. 612598), 1:25 PerCP-Cy™5.5 Mouse Anti-Human CD25 (Becton Dickinson GmbH, cat. no. 560503), 1:25 APC Rat anti FOXP3 (eBioscience Inc., 17-4776-41), 1:25 BV421 Mouse Anti-Human CD4 (Becton Dickinson GmbH, cat. no. 565997), and 1:25 BV510 Mouse Anti-Human CD8 (Becton Dickinson GmbH, cat. no. 563256) in 1-fold Permeabilization Buffer for 30 min at 2-8° C. protected from light. Stained PBMCs were washed twice with ice-cold 1-fold Permeabilization Buffer and finally re-suspended in D-PBS supplemented with 2% FBS and 2 mM EDTA (Sigma-Aldrich, cat. no. 03690-100ML). Flow cytometric analysis was performed on a BD FACSCanto™ II flow cytometer (Becton Dickinson GmbH) and acquired data was analyzed using FlowJo software version 10.3. Dose-response curves and EC50 values were calculated in GraphPad Prism version 6.04 (GraphPad Software, Inc.).

Figure 6:
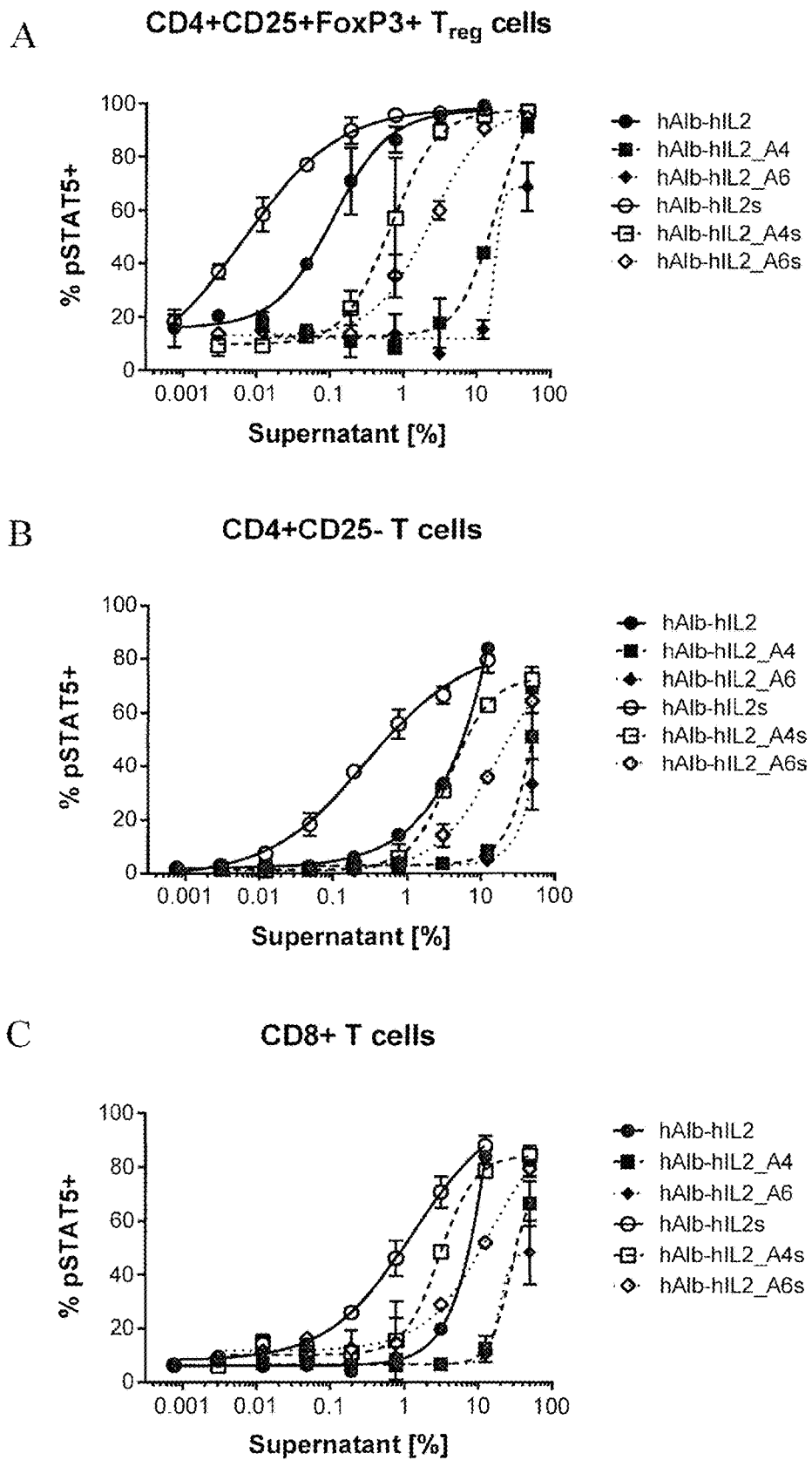
FIG. 6: Functional properties of IL2 variants on different T cell subsets in human PBMCs measured by IL2-mediated phosphorylation of STAT5. Dose-response curves of STAT5 phosphorylation (pSTAT5) on CD4+CD25+FoxP3+ regulatory T cells (A), CD4+CD25− T effector and memory cells (B), as well as CD8+ cytotoxic T cells (C). PBMCs were incubated with serial dilutions of IL2 variant-containing supernatant and phosphorylation of STAT5 was subsequently analyzed in different T cell subsets via flow cytometry. Data shown are mean±SD of n=2 technical replicates fitted with a four parameter logarithmic fit to calculate $EC_{50}$ values.

On CD4+CD25+FoxP3+ regulatory T cells hAlb-hIL2 displayed superior potency over all IL2 mutCD25 variants with reduced CD25 binding affinity (hAlb-hIL2_A4/_A6) as well as the respective mutβγ variants thereof (hAlb-hIL2_A4s, hAlb-hIL2_A6s) (FIG. 6 and Tables 5, 6). In detail, the biological activity of hAlb-hIL2_A6 was strongly reduced by ~320-fold compared to hAlb-hIL2, whereas hAlb-hIL2_A4 displayed an intermediate phenotype (~170-fold reduced activity compared to hAlb-hIL2). The bioactivity of both mutCD25 variants was boostable by the addition of mutβγ mutations with hAlb-hIL2_A4s being superior to hAlb-hIL2_A6s showing a ~6-fold and ~21-fold reduced activity compared to hAlb-hIL2, respectively.

The most active variant was hAlb-hIL2s with its biological activity being even enhanced by ~15-fold compared to hAlb-hIL2. In the absence of CD25 expression, hAlb-hIL2 potency was strongly reduced by >40-fold (see FIG. 6, Table 5, CD4+CD25− T helper cells and CD8+ cytotoxic T cells compared to CD4+CD25+FoxP3+ $T_{reg}$), however, it was still superior to mutCD25 variants hAlb-hIL2_A4 and hAlb-hIL2_A6. The same is also true for the corresponding mutβγ mutation containing variants: hAlb-hIL2s displayed the highest biological activity in both CD25-negative CD4+ and CD8+ T cell subsets (see Tables 7-8; ~5-10-fold increased potency compared to hAlb-hIL2) followed by hAlb-hIL2_A4s, which performs on par to hAlb-hIL2 in CD4+CD25− T helper cells and was even superior to hAlb-hIL2 in CD8+ cytotoxic T cells (see Tables 7-8; ~2-fold increased biological activity compared to hAlb-hIL2). When compared to hAlb-hIL2_A4s, hAlb-hIL2_A6s comes with slightly reduced biological activity, still performing nearly as good as hAlb-hIL2 in CD8+ cytotoxic T cells but being less active in CD4+CD25− T helper cells. Most importantly, using the ratio of EC50 values determined per individual hAlb-hIL2 variant on CD4+CD25− T helper cells or CD8+ cytotoxic T cells versus EC50 values determined on CD4+CD25+FoxP3+ regulatory T cells (Table 5) allows to calculate the 'regulatory T cell bias' of each hAlb-hIL2 variant (Table 9). hAlb-hIL2 exhibits a 40-60-fold bias towards regulatory CD4+CD25+FoxP3+ regulatory T cells compared to its potency on CD4+CD25− T helper cells or CD8+ cytotoxic T cells. In striking contrast, this regulatory T cell bias is reduced to only 1.2-1.9-fold when looking at the mutCD25 variants hAlb-hIL2_A4 and hAlb-hIL2_A6. The corresponding mutβγ variants hAlb-hIL2_A4s and hAlb-hIL2_A6s come with a slightly increased regulatory T cell bias of 4.4-7.1-fold. hAlb-hIL2s shows the strongest bias of 63-182-fold towards CD4+CD25+FoxP3+ regulatory T cells when compared to its potency on CD4+CD25− T helper cells or CD8+ cytotoxic T cells.

TABLE 5

EC50 values [%-supernatant] calculated based on STAT5 phosphorylation dose-response for the hAlb-hIL2 variants in different human T cell subsets.

| IL2 variant | CD4+CD25+ FoxP3+Treg | CD4+CD25− T helper cells | CD8+ cytotoxic T cells |
|---|---|---|---|
| hAlb-hIL2 | 0.111 | 4.356 | 6.845 |
| hAlb-hIL2s | 0.007 | 0.4442 | 1.275 |
| hAlb-hIL2_A4 | 18.49 | 35.39 | 33.76 |
| hAlb-hIL2_A4s | 0.680 | 3.967 | 3.021 |
| hAlb-hIL2_A6 | 35.93 | 51.69 | 44.75 |
| hAlb-hIL2_A6s | 2.343 | 16.75 | 14.62 |

TABLE 6

EC50 values [%-supernatant] calculated based on STAT5 phosphorylation dose-response for the hAlb-hIL2 variants in human CD4+CD25+FoxP3+ regulatory T cells. Ratios to obtain EC50 fold-reduction and fold-increase data compared to hAlb-hIL2 are calculated.

| IL2 variant | EC50 | EC50 fold-reduction over hAlb-hIL2 | EC50 fold-increase over hAlb-hIL2 |
|---|---|---|---|
| hAlb-hIL2 | 0.111 | — | — |
| hAlb-hIL2s | 0.007 | 15.850× | 0.063× |
| hAlb-hIL2_A4 | 18.49 | 0.006× | 166.577× |
| hAlb-hIL2_A4s | 0.680 | 0.163× | 6.126× |
| hAlb-hIL2_A6 | 35.93 | 0.003× | 323.694× |
| hAlb-hIL2_A6s | 2.343 | 0.047× | 21.108× |

TABLE 7

EC50 values [%-supernatant] calculated based on STAT5 phosphorylation dose-response for the hAlb-hIL2 variants in human CD4+CD25− T helper cells. Ratios to obtain EC50 fold-reduction and fold-increase data compared to hAlb-hIL2 are calculated.

| IL2 variant | EC50 | EC50 fold-reduction over hAlb-hIL2 | EC50 fold-increase over hAlb-hIL2 |
|---|---|---|---|
| hAlb-hIL2 | 4.356 | — | — |
| hAlb-hIL2s | 0.4442 | 9.806× | 0.102× |
| hAlb-hIL2_A4 | 35.39 | 0.123× | 8.124× |
| hAlb-hIL2_A4s | 3.967 | 1.090× | 0.911× |
| hAlb-hIL2_A6 | 51.69 | 0.084× | 11.866× |
| hAlb-hIL2_A6s | 16.75 | 0.260× | 3.845× |

TABLE 8

EC50 values [%-supernatant] calculated based on STAT5 phosphorylation dose-response for the hAlb-hIL2 variants in human CD8+ cytotoxic T cells. Ratios to obtain EC50 fold-reduction and fold-increase data compared to hAlb-hIL2 are calculated.

| IL2 variant | EC50 | EC50 fold-reduction over hAlb-hIL2 | EC50 fold-increase over hAlb-hIL2 |
|---|---|---|---|
| hAlb-hIL2 | 6.845 | — | — |
| hAlb-hIL2s | 1.275 | 5.369× | 0.186× |
| hAlb-hIL2_A4 | 33.76 | 0.203× | 4.932× |

TABLE 8-continued

EC50 values [%-supernatant] calculated based on STAT5
phosphorylation dose-response for the hAlb-hIL2 variants in human
CD8+ cytotoxic T cells. Ratios to obtain EC50 fold-reduction
and fold-increase data compared to hAlb-hIL2 are calculated.

| IL2 variant | EC50 | EC50 fold-reduction over hAlb-hIL2 | EC50 fold-increase over hAlb-hIL2 |
|---|---|---|---|
| hAlb-hIL2_A4s | 3.021 | 2.265× | 0.441× |
| hAlb-hIL2_A6 | 44.75 | 0.153× | 6.538× |
| hAlb-hIL2_A6s | 14.62 | 0.468× | 2.136× |

TABLE 9

The 'regulatory T cell bias' of each hAlb-hIL2 variant is given as
fold-reduced potency on CD4+CD25− T helper cells or CD8+
cytotoxic T cells compared to CD4+CD25+FoxP3+ regulatory T cells.
Fold-reduced potency was calculated as the ratio of individual
EC50 values for each hAlb-hIL2 variant determined on CD4+CD25−
T helper cells or CD8+ cytotoxic T cells versus the EC50 values
determined on CD4+CD25+FoxP3+ regulatory T cells.

| IL2 variant | fold-reduced effect on CD4+CD25− T helper cells vs. $T_{reg}$ | fold-reduced effect on CD8+ cytotoxic T cells vs. $T_{reg}$ |
|---|---|---|
| hAlb-hIL2 | 39× | 62× |
| hAlb-hIL2s | 63× | 182× |
| hAlb-hIL2_A4 | 1.9× | 1.8× |
| hAlb-hIL2_A4s | 5.8× | 4.4× |
| hAlb-hIL2_A6 | 1.4× | 1.2× |
| hAlb-hIL2_A6s | 7.1× | 6.2× |

Example 8: Effects of IL2 mutCD25 Variants on T Cell Vaccination In Vivo

Figure 7:
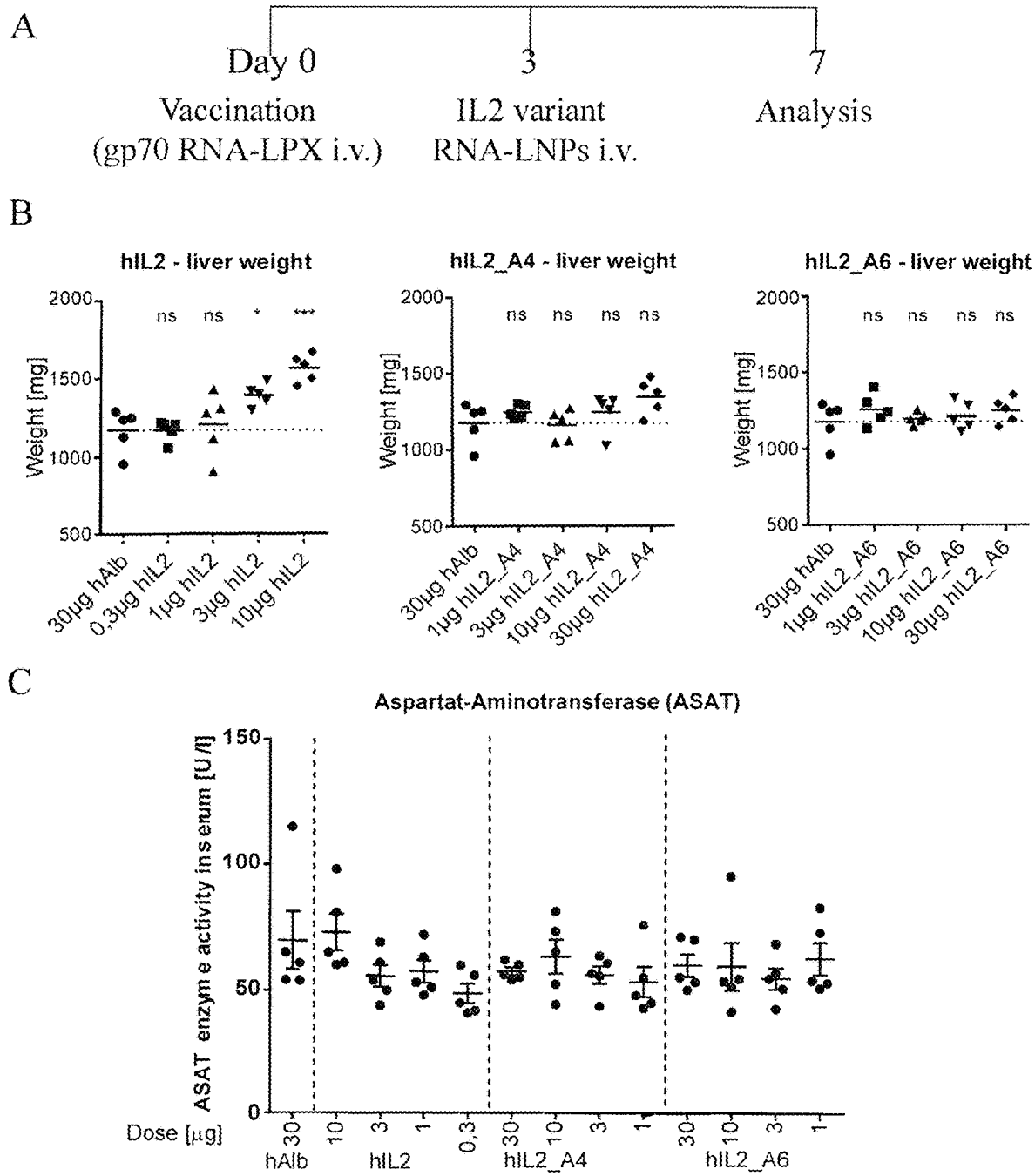
FIG. 7: Effects of IL2 mutCD25 variants on T cell vaccination in vivo A, BALB/c mice (n=5 per group) were vaccinated intravenously (i.v.) with 20 μg of RNA-LPX encoding the CD8+ T cell antigen gp70. Three days after vaccination, hAlb (negative control) or escalating doses of hAlb-hIL2, hAlb-hIL2_A4, hAlb-hIL2_A6 RNA formulated as lipid nanoparticles (LNPs) were administered i.v. Liver weight (B); Aspartat-Aminotransferase (ASAT) activity in sera (C); gp70 antigen specific CD8 positive (D), CD8 positive (E), CD45 positive (F), or CD4 FoxP3 CD25 positive (G) cells per μl blood; as well as the CD8 T cell to Treg ratio (H) is shown. Dots represent individual mice, lines represent the group mean. I, the fold change of gp70-specific or unspecific CD8 positive T cells over the respective mean hAlb control values of treated mice is depicted (mean+standard error of mean (SEM)). Statistical significance was determined using one way ANOVA and Dunnett's multiple comparisons test (B-H) or a two way ANOVA followed by Sidak's multiple comparison test (1). All analyses were two-tailed and carried out using GraphPad Prism 6. n.s.: P>0.05, *P<0.05, P<0.01, *P<0.001.
Figure 7:
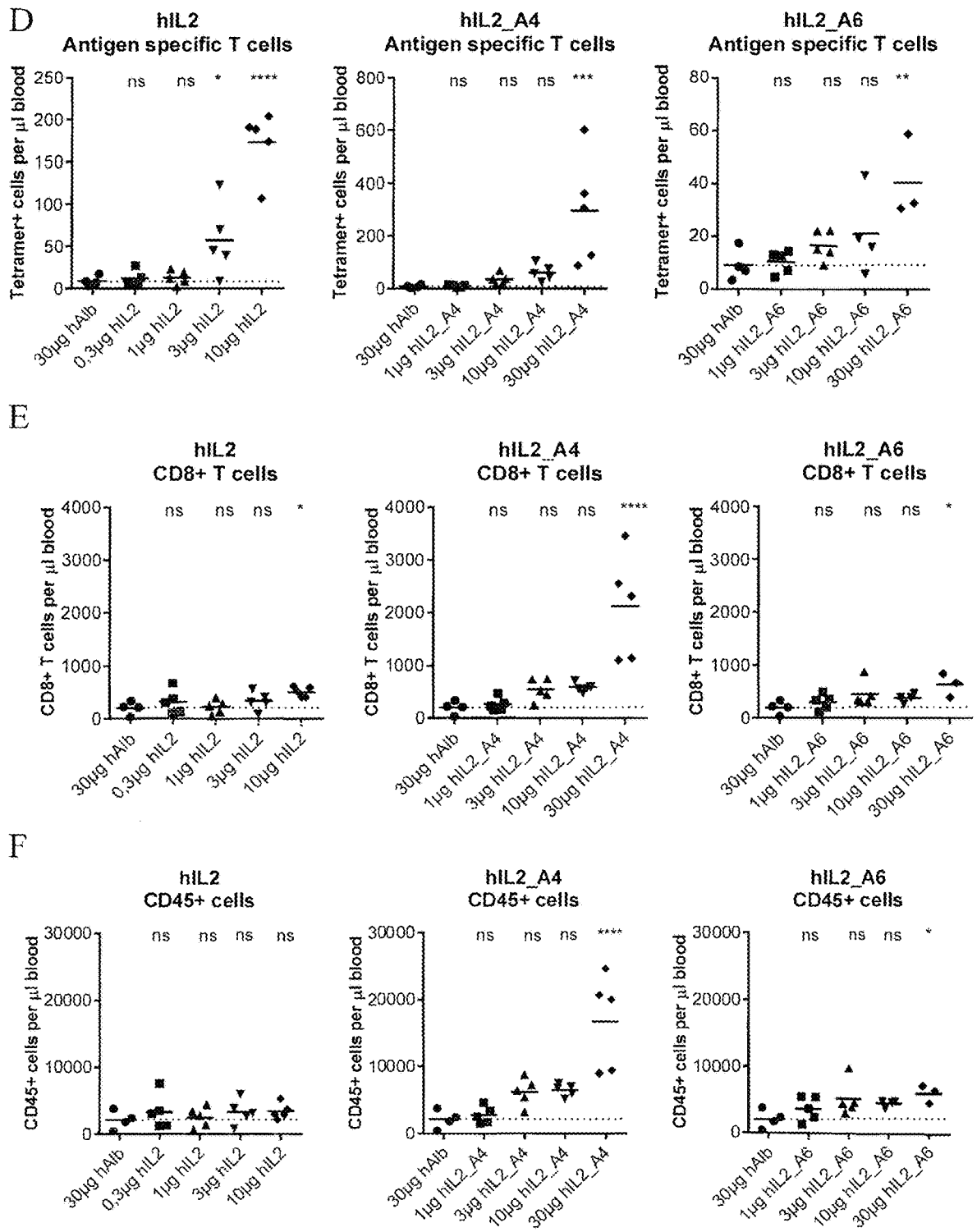
Figure 7:
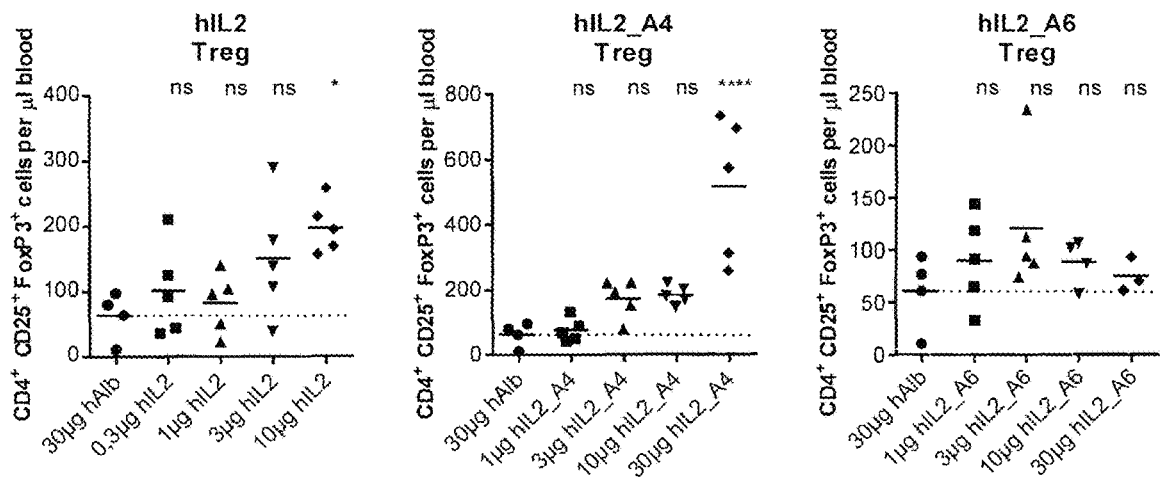
Figure 7:
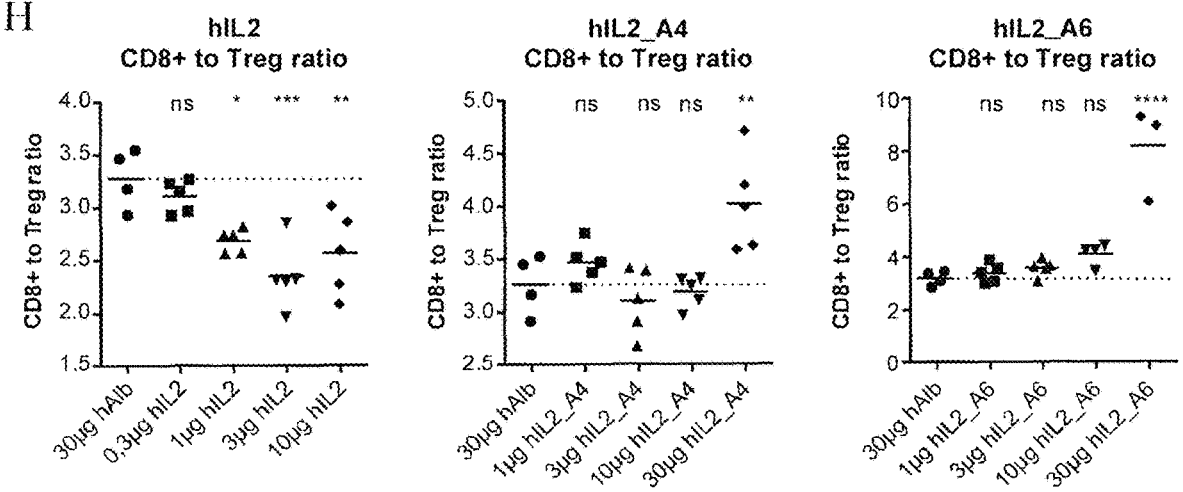
Figure 7:
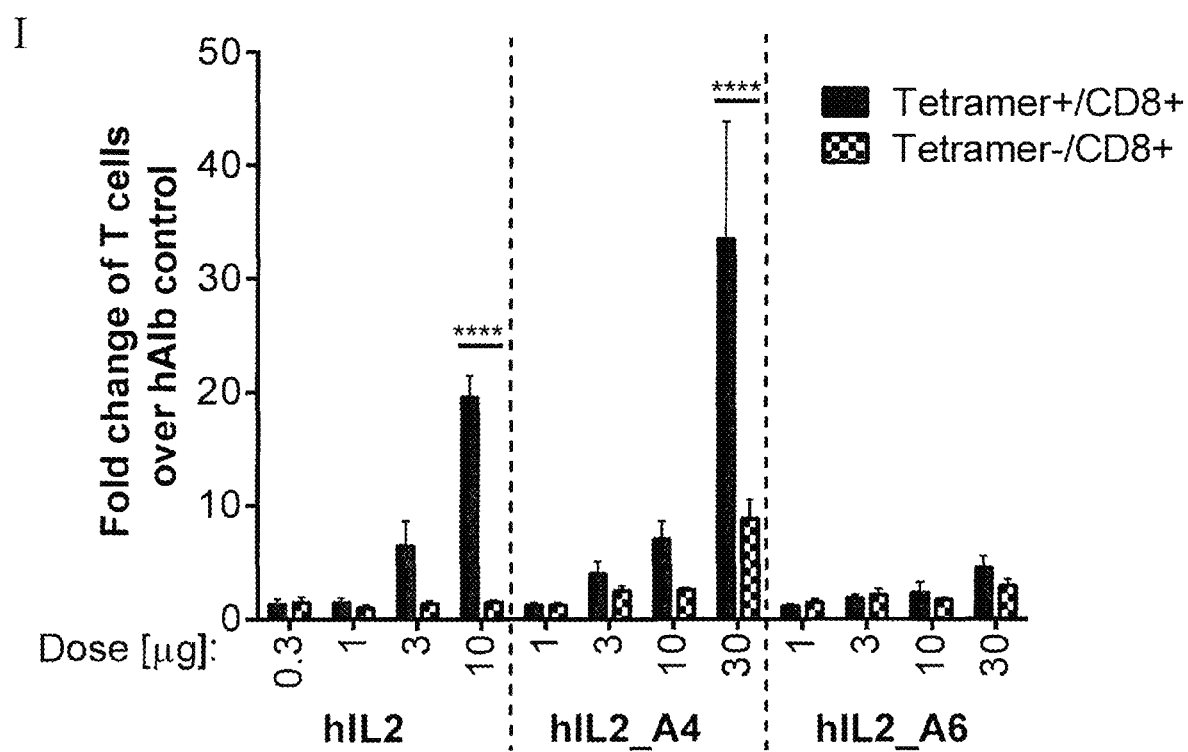

We subsequently characterized the effect of the IL2 mutCD25 variants hIL2_A4 and hIL2_A6 on the RNA-vaccine induced T cell responses in vivo. BALB/c mice (n=5 per group) were vaccinated i.v. with 20 µg of RNA-LPX encoding the CD8+ T cell antigen gp70 (SPSYAYHQF) as described in Kranz, L. M. et al. Nature 534, 396-401 (2016). Gp70 is a tumor antigen which can be found for example in the colon carcinoma cell line CT26. Anti-tumor efficacy of a gp70 targeting vaccine increases with rising numbers of induced gp70 specific T cells (Kranz, L. M. et al. Nature 534, 396-401 (2016) and unpublished). Three days after vaccination, hAlb (negative control) or escalating doses of hAlb-hIL2, hAlb-hIL2_A4, hAlb-hIL2_A6 RNA formulated as LNPs were administered i.v. as depicted in FIG. 7. On day 7 analyses including immunophenotyping of blood lymphocyte subsets and gp70 specific T cells (MHC tetramer, MBL) via flow cytometry (BD FACSCelesta) was performed (staining as described in Kranz, L. M. et al. Nature 534, 396-401 (2016)).

As described in Example 4 and Example 6, mutCD25 variants have a reduced potency to stimulate IL2Rαβγ positive CTLL-2 cells. For this reason, we tested approximately three times higher doses of mutCD25 variants than wild type hAlb-hIL2 to be able to induce comparable effects on gp70 specific effector T cells as hAlb-hIL2 while improving the CD8 to Treg ratios. Despite of higher doses, only hAlb-hIL2 but not hAlb-hIL2 mutCD25 variants showed a significant increase in liver weight as indicator for IL2 mediated toxicity (FIG. 7B). Similarly, no increase of serum Aspartat-Aminotransferase (ASAT) (FIG. 7C), Alanin-Aminotransferase, Lactate-Dehydrogenase, Amylase or Lipase activity (Indiko™, Thermo Fischer Scientific) as well as lung weight was observed (data not shown). Wild type hAlb-hIL2 as well as both hAlb-hIL2 mutCD25 variants resulted in a dose-dependent increase of gp70 specific T cells in blood as determined by flow cytometry with the strongest boost observed with the highest dose of hAlb-hIL2_A4 and the weakest boost with hAlb-hIL2_A6 (FIG. 7D). Interestingly, especially hAlb-hIL2_A4 resulted in a very strong increase of CD8+ T cells as well as CD45+ leukocytes (FIG. 7E,F). In comparison to hAlb-hIL2 and hAlb-hIL2_A4, administration of hAlb-hIL2_A6 resulted in no increase of Tregs (FIG. 7G). Importantly, both hAlb-hIL2 variants mediated an increase of the CD8+ T cell to Treg ratio demonstrating preferential expansion of CD8+ T cells over tumor promoting Tregs (FIG. 7H). In comparison, hAlb-hIL2 reduced the CD8+ T cell to Treg ratio in a dose-dependent manner. When comparing the fold change of either gp70 specific or unspecific CD8+ T cells over the hAlb control, hAlb-hIL2 and hAlb-hIL2_A4 but not hAlb-hIL2_A6 lead to a preferential expansion of gp70 specific T cells (FIG. 7I). Taken together, these results indicate that the hAlb-hIL2_A6 and hAlb-hIL2_A4 variants have no or reduced CD25 binding capacity leading to beneficial effects for cancer immunotherapy such as an increase in the CD8+ T cell to Treg ratio.

Figure 8:
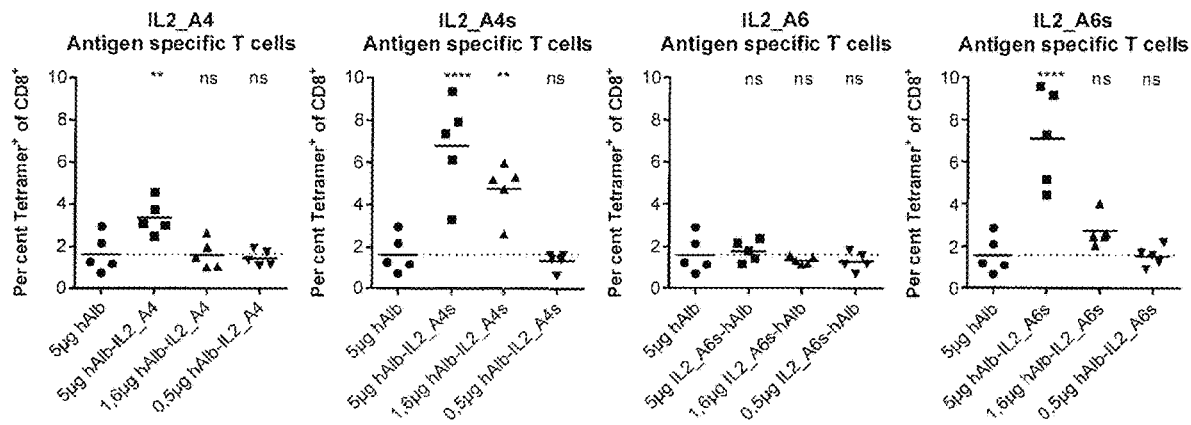
FIG. 8: Improved efficacy of IL2 mutCD25 variants by addition of mutβγ mutations BALB/c mice (n=5 per group) were vaccinated intravenously (i.v.) with 20 μg of RNA-LPX encoding the CD8+ T cell antigen gp70. Three days after vaccination, hAlb (negative control) or different doses of hAlb-hIL2_A4, hAlb-hIL2_A4s, hIL2_A6-hAlb and hAlb-hIL2_A6s RNA formulated as LNPs were administered i.v. The frequency of gp70 antigen specific CD8 positive (A), CD4 FoxP3 CD25 positive (B) and CD4 CD8 negative CD49b positive NK cells (D) is shown. Dots represent individual mice, lines represent the group mean. C, The fold change of gp70 specific or unspecific CD8 positive T cells over the respective mean hAlb control values of treated mice is depicted (mean+SEM). Statistical significance was determined using one way ANOVA and Dunnett's multiple comparisons test (A,B,D) or a two way ANOVA followed by Sidak's multiple comparison test (C). All analyses were two-tailed and carried out using GraphPad Prism 6. n.s.: P>0.05, *P<0.05, P<0.01, *P<0.001.
Figure 8:
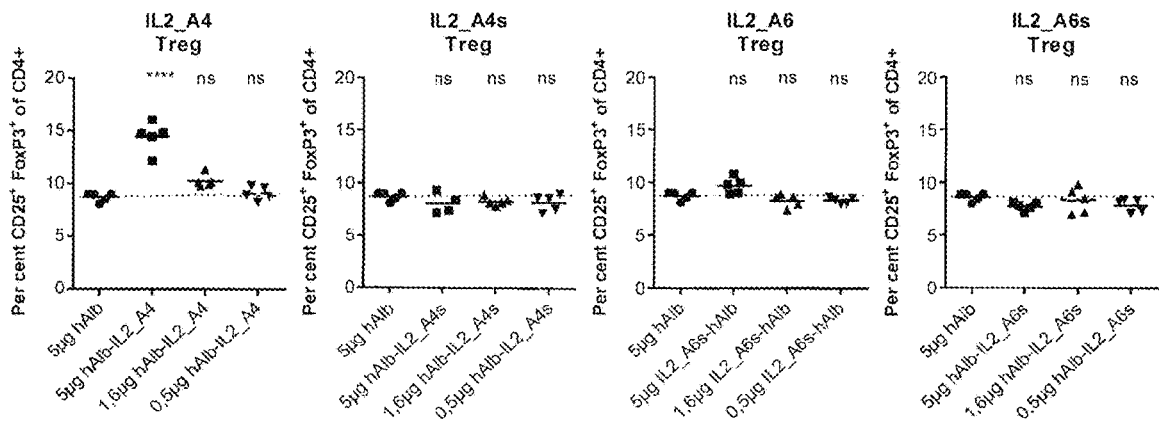
Figure 8:
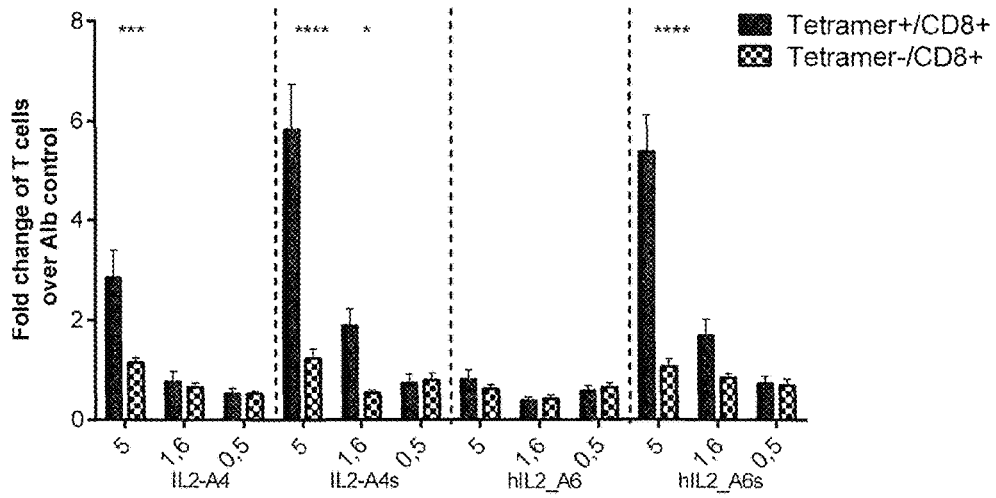
Figure 8:
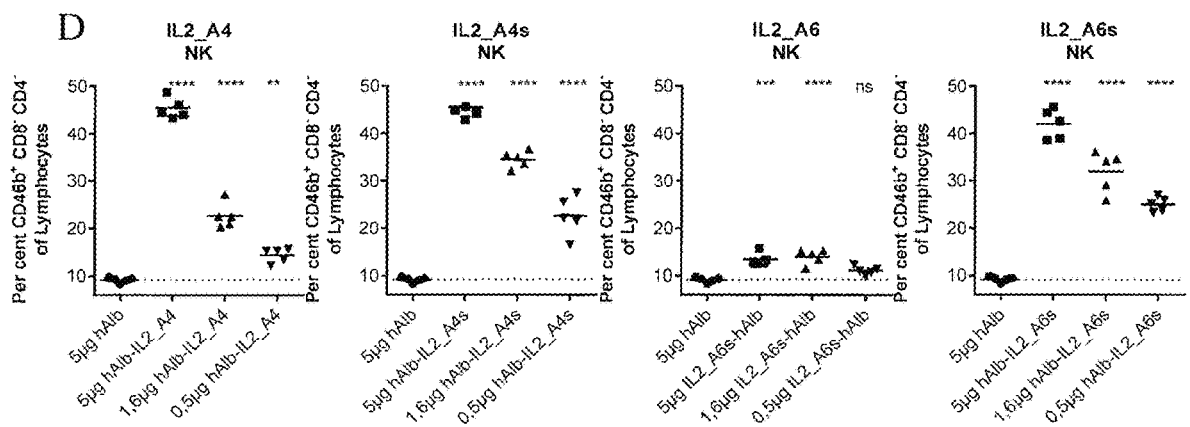

Example 9: Improvement of IL2 mutCD25 Variant Efficacy by Addition of Mutβγ Mutations Although the variants hAlb-hIL2_A4 and hAlb-hIL2_A6 strongly increased the CD8+ T cell to Treg ratio, a strong expansion of antigen specific T cells required much higher doses compared to hAlb-hIL2 due to the reduced binding to the high affinity IL2Rαβγ on activated T cells. Hence, we tested whether the potency of hAlb-hIL2_A4 and hAlb-hIL2_A6 in vivo could be further improved by introduction of mutβγ mutations which were shown to improve the binding to all IL2Rβγ positive cells in vitro (Examples 5-7; Levin, A. M. et al. Nature 484, 529-533 (2012)). As for Example 8, BALB/c mice (n=5 per group) were vaccinated i.v. with 20 µg gp70 RNA-LPX followed three days later by cytokine RNA-LNP injection (FIG. 7A). In this experiment we drastically reduced the cytokine RNA-LNP doses in order to make sure that improvements by mutβγ mutations would be well covered, and to test the lower limits of the treatment dose. Seven days after vaccination, gp70 specific T cells, NK cells as well as CD25 FoxP3 positive Tregs were analyzed (FIG. 8).

As shown in Example 8, antigen specific T cell and Treg frequencies were increased by administration of hAlb-hIL2_A4 but not hAlb-hIL2_A6 (FIG. 8A,B). Strikingly, both mutβγ mutation containing variants hAlb-hIL2_A4s and hAlb-hIL2_A6s further increased antigen specific T cell frequencies without any detectable increase of Treg frequencies (or cell counts, data not shown). hAlb-hIL2_A4s and hAlb-hIL2_A6s led to preferential increase of antigen specific over unspecific CD8 T cells which exceeded that of hAlb-hIL2_A4 and hAlb-hIL2_A6 (FIG. 8C). Furthermore, all constructs strongly expanded NK cell frequencies (and counts, data not shown) up to almost 50% of peripheral lymphocytes (FIG. 8D). Here, hAlb-hIL2_A4s and hAlb-hIL2_A6s showed similar efficacy as hAlb-hIL2_A4 at high doses but superiority at lower doses. In summary, this shows that the mutβγ mutations can further improve the efficacy of the hAlb-hIL2 mutCD25 variants without increasing Treg frequencies.

Example 10: HAlb-hIL2 Variants Containing Both mutCD25 and Mutβγ Mutations are Superior Compared to Mutβγ Mutation Containing IL2 and Wild Type hAlb-hIL2

Figure 9:
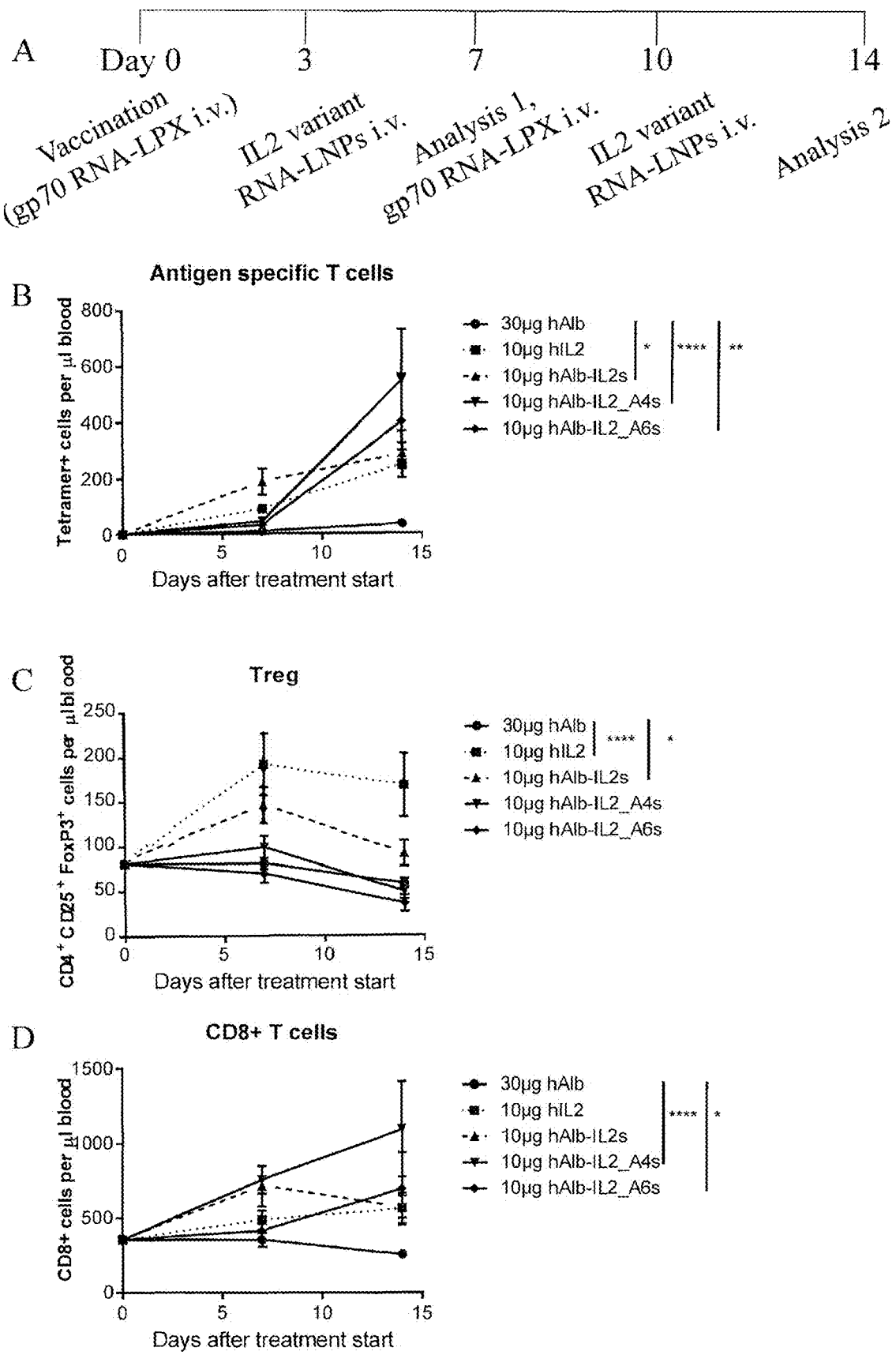
FIG. 9: IL2 variants with combined mutCD25 and mutβγ mutations are superior to wild type IL2 and the mutβγ IL2 variant BALB/c mice (n=5 per group) were vaccinated i.v. with 20 μg gp70 RNA-LPX on days 0 and 7 as well as cytokine RNA-LNPs (dose indicated in figure) on day 3 and 10. Analysis of blood lymphocytes via flow cytometry (see Example 8) was performed on day 7 and 14 (A). B, gp70 antigen specific CD8 positive T cell numbers per μl blood (mean±SEM). C, CD4 CD25 FoxP3 positive Tregs per μl blood (mean±SEM). D, CD8 positive T cell numbers per μl blood (mean±SEM). The ratio of antigen specific T cells (E) or CD8+ T cells (F) to Tregs is depicted (mean±SEM). G, The fold change of gp70 specific or unspecific CD8 positive T cells over the respective mean hAlb control values of treated mice is depicted (mean+SEM). H, The mean (±SEM) fraction of CD127 negative KLRG1 Tetramer CD8 positive T cells is shown. I, CD49 positive CD4 CD8 negative NK cell numbers per μl blood (mean±SEM). H, The fraction of KLRG1 positive NK cells per mouse is shown (line represents group mean). Statistical significance was determined using two way ANOVA and Dunnett's multiple comparisons test (B-F,H,I) or Sidak's test (G) or a one way ANOVA followed by Tukey's multiple comparison test (J). All analyses were two-tailed and carried out using GraphPad Prism 6. n.s.: P>0.05, *P<0.05, P<0.01, *P<0.001.
Figure 9:
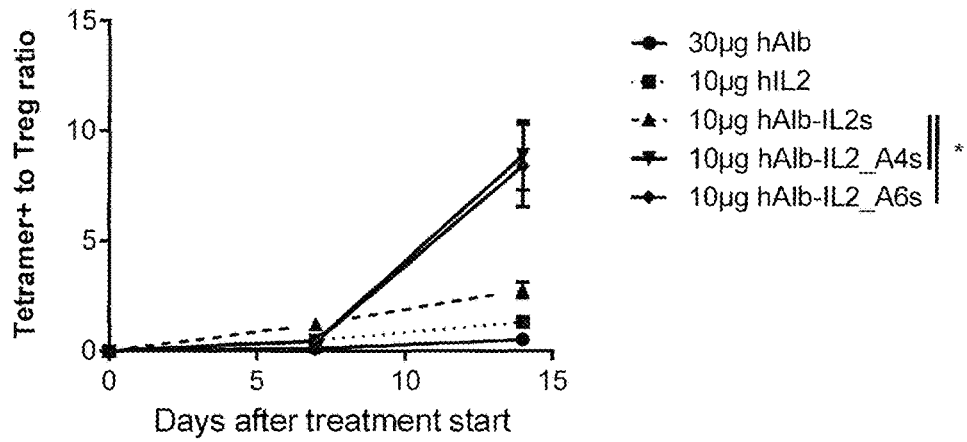
Figure 9:
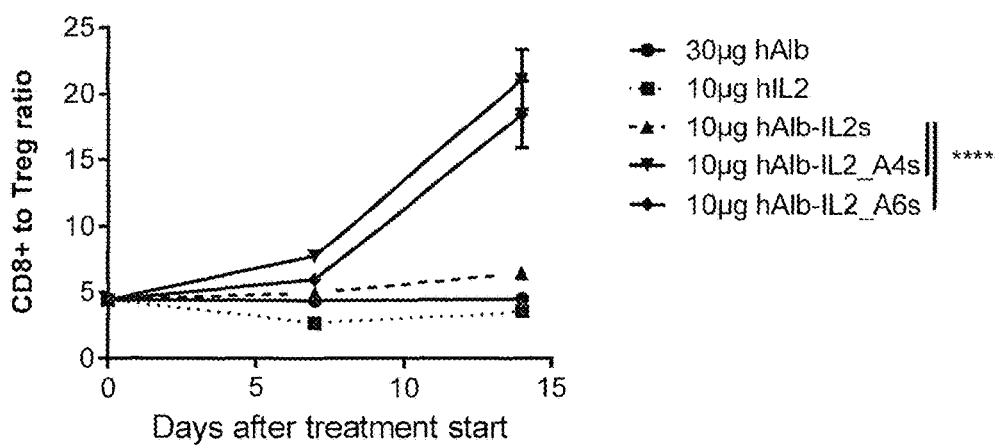
Figure 9:
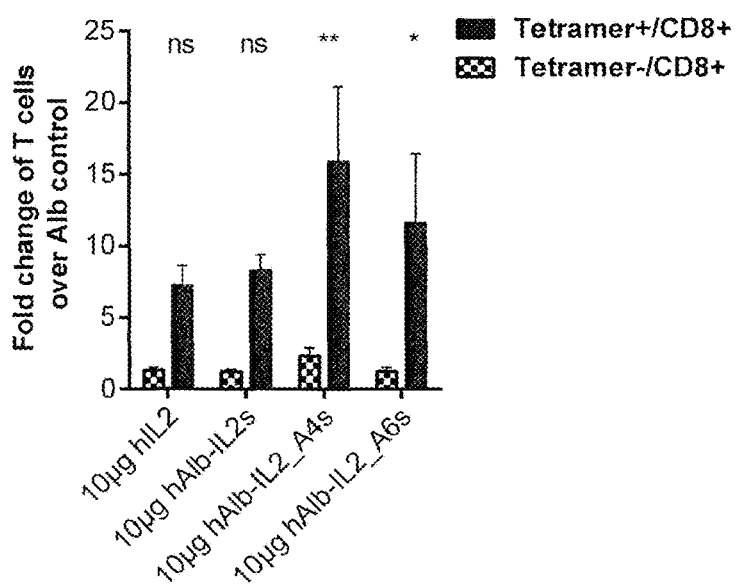
Figure 9:
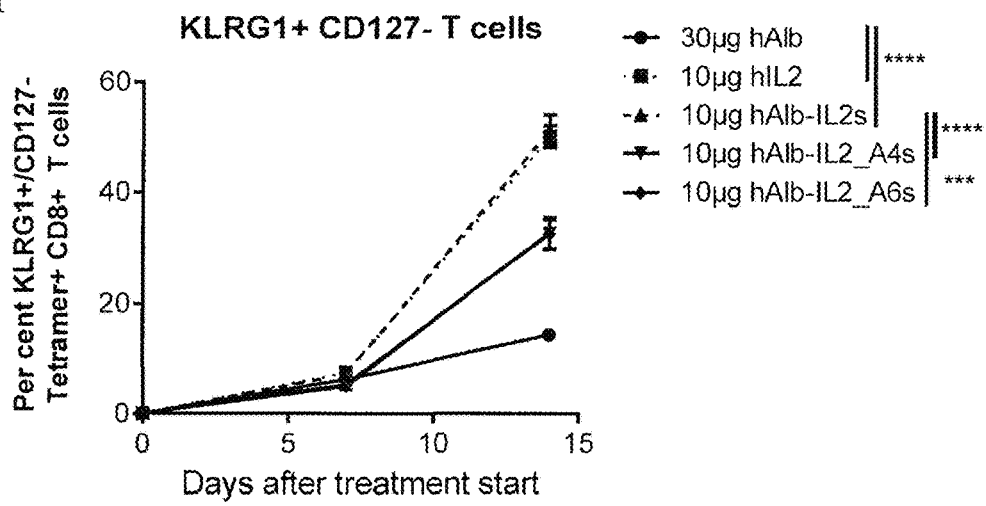
Figure 9:
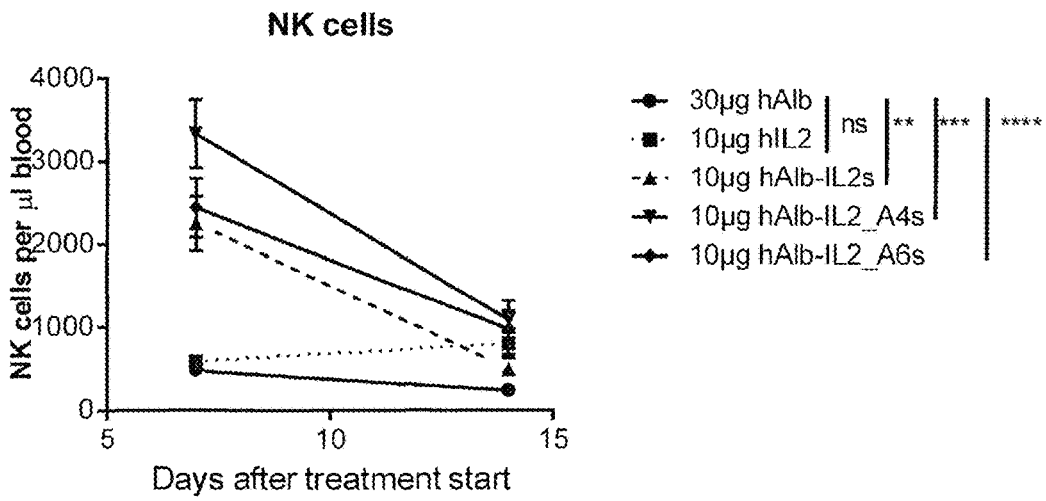
Figure 9:
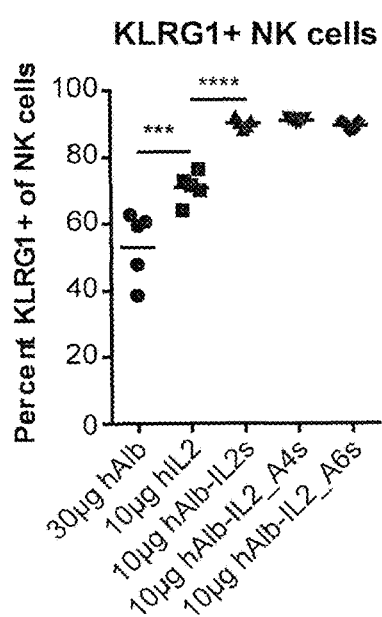

In Example 9, we showed that introduction of mutβγ mutations to the mutCD25 variants increased their potency to stimulate antigen specific T cells without increasing Treg frequencies. Next, we wanted to test if IL2 variants containing both mutCD25 and mutβγ mutations are superior to the mutβγ containing IL2 variant (hAlb-hIL2s). BALB/c mice (n=5 per group) were vaccinated i.v. with 20 µg gp70 RNA-LPX on days 0 and 7 as well as cytokine RNA-LNPs (dose indicated in figure) on day 3 and 10. Analysis of blood lymphocytes via flow cytometry (see Example 8) was performed on day 7 and 14 (FIG. 9A). Antigen specific T cell numbers were boosted for all IL2 variants compared to the hAlb control (FIG. 9B). Importantly, whereas hAlb-hIL2 and to a lower extent hAlb-hIL2s expanded Tregs, in hAlb-hIL2_A4s and hAlb-hIL2_A6s treated groups Treg counts did not increase (FIG. 9C). The lack of Treg expansion by hAlb-hIL2_A4s and hAlb-hIL2_A6s could explain the strong boost of antigen specific T cells after the second treatment outpacing the effect of hAlb-hIL2 and the hAlb-hIL2s variant (FIG. 9B). In comparison, for hAlb-hIL2 and hAlb-hIL2s the expansion of antigen specific T cells slows down after the second treatment probably due to suppression of effector T cells by induced Tregs (FIG. 9B,C). Similarly, CD8+ T cell numbers were most strongly increased by the mutCD25 and mutβγ mutation containing hAlb-hIL2_A4s and hAlb-hIL2_A6s variants (FIG. 9D). As a consequence, the antigen specific T cell to Treg ratio (FIG. 9E) and the CD8+ T cell to Treg ratio (FIG. 9F) were both massively increased by administration of the hAlb-hIL2_A4s and hAlb-hIL2_A6s variants compared to hAlb-hIL2 and hAlb-hIL2s. All hAlb-hIL2 variants and especially hAlb-hIL2_A4s and hAlb-hIL2_A6s preferentially expanded antigen specific T cells (Tetramer+/CD8+) compared to unspecific CD8+ (Tetramer-/CD8+) T cells (FIG. 9G). Interestingly, hAlb-hIL2_A4s and hAlb-hIL2_A6s induced lower frequencies of KLRG1+CD127− short lived effector T cells (SLEC) than hAlb-hIL2 and hAlb-hIL2s (FIG. 9H). A high SLEC frequency negatively impacts the longevity of a T cell response due to reduced likelihood of memory formation (Joshi, N. S. et al. *Immunity* 27, 281-295 (2007)). In addition, hAlb-hIL2_A4s and hAlb-hIL2_A6s variants expanded NK cells much stronger than hAlb-hIL2 and slightly stronger than hAlb-hIL2s (FIG. 9I). All mutβγ mutation containing variants resulted in significantly higher fractions of KLRG1 expressing NK cells compared to hAlb-hIL2 indicating an activated effector phenotype (FIG. 9J). KLRG1 positive NK cells were shown to protect against pulmonary metastatic disease (Renner, P. et al. *Oncoimmunology* 3, e28328 (2014)). Due to the short lived nature of activated NK cells, NK cell counts drop after the first treatment in all mutβγ mutation containing variants but still remain higher than in the hAlb control group (FIG. 9I).

In summary, combination of mutCD25 and mutβγ mutations significantly boost the efficacy of hAlb-hIL2 to increase antigen specific T cells and NK cells without expansion of Tregs leading to a strong increase in the ratio of (antigen specific) CD8+ T cells to Tregs.

Example 11: HAlb-hIL2_A4s Administration Boosts CD4+ T-Cell Responses

Figure 10:
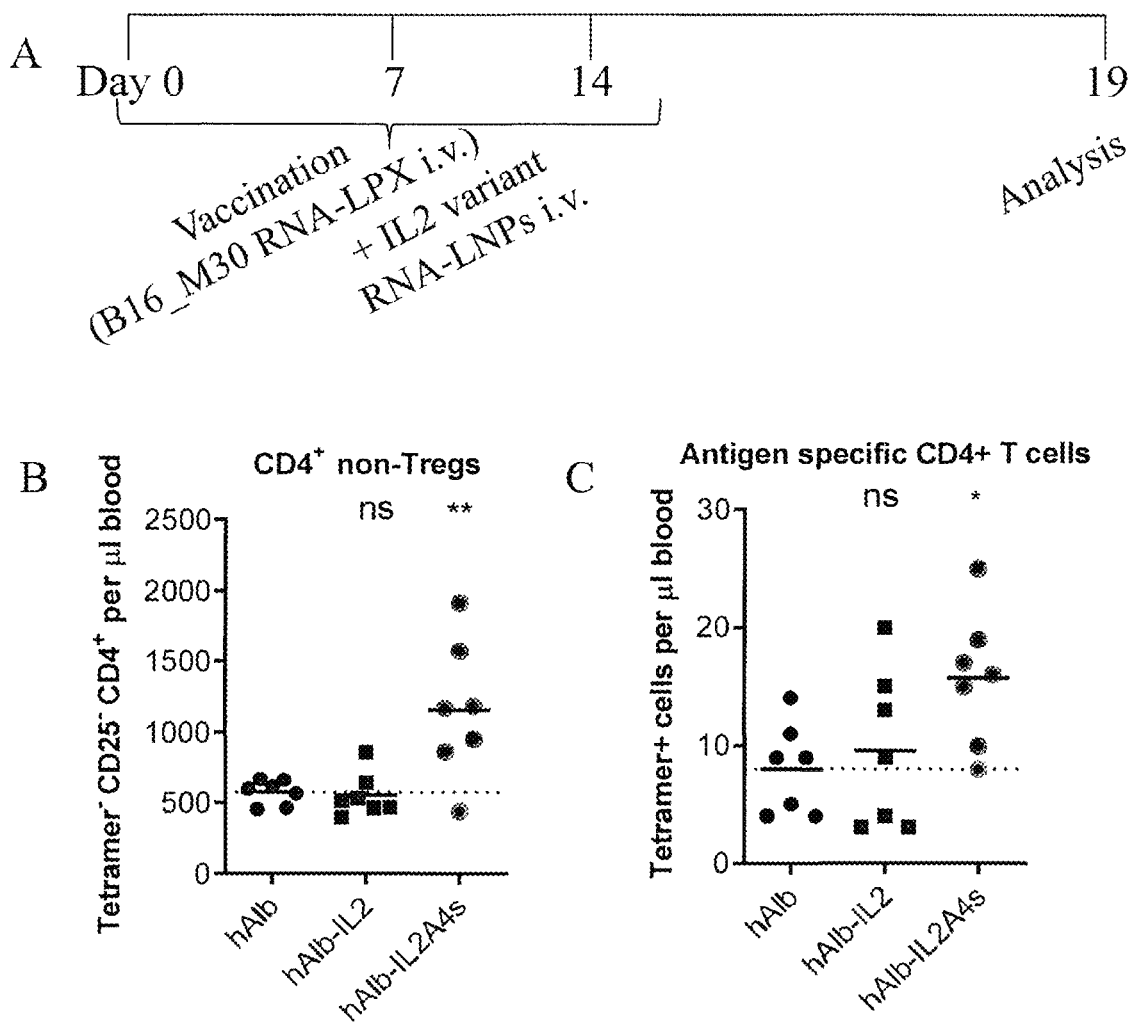
FIG. 10: Administration of IL2 variants with combined mutCD25 and mutβγ mutations boosts CD4+ T-cell responses C57BL/6 mice (n=7 per group) were treated i.v. with 20 μg B16_M30 (Kreiter, S. et al. *Nature* 520, 692-696 (2015)) RNA-LPX and 3 μg hAlb, hAlb-hIL2 or hAlb-hIL2_A4s RNA-LNPs on days 0, 7 and 14. Blood lymphocytes were analyzed via flow cytometry on day 19 (A). B16_M30 is a MHC class II-restricted neoepitope of the B16F10 tumor cell line recognized by CD4+ T cells (Kreiter, S. et al. *Nature* 520, 692-696 (2015)). Only co-administration of hAlb-hIL2_A4s but not hAlb-hIL2 increased the number of CD4+ effector T cells/non-Tregs (CD25− FoxP3− CD4+) and B16_M30 specific tetramer+ CD4+ T cells, respectively (B, C).

In the previous experiments we have demonstrated that administration of IL2 variants that contain both mutCD25 and mutβγ mutations enhance the induction of antigen specific CD8+ T cells. To further test if CD4+ T cells would benefit from these IL2 variants C57BL/6 mice (n=7 per group) were treated i.v. with 20 µg B16_M30 (Kreiter, S. et al. *Nature* 520, 692-696 (2015)) RNA-LPX and 3 µg hAlb, hAlb-hIL2 or hAlb-hIL2_A4s RNA-LNPs on days 0, 7 and 14. Analysis of blood lymphocytes via flow cytometry (see Example 8) was performed on day 19 (FIG. 10A). B16_M30 is a MHC class II-restricted neoepitope of the B16F10 tumor cell line recognized by CD4+ T cells (Kreiter, S. et al. *Nature* 520, 692-696 (2015)).

As shown in FIGS. 10B and 10C, only co-administration of hAlb-hIL2_A4s but not hAlb-hIL2 increased the number of CD4+ effector T cells/non-Tregs (CD25− FoxP3− CD4+) and B16_M30 specific tetramer+ CD4+ T cells, respectively.

Example 12: IL2 Variants with Combined mutCD25 and Mutβγ Mutations Potentiate the Anti-Tumor Efficacy of Cancer Vaccination Tumor antigen specific T cells induced by vaccination can control tumor growth while Tregs inhibit the effect of effector T cells (Kreiter, S. et al. *Nature* 520, 692-696 (2015).). We have previously shown that hAlb-hIL2 is able to significantly improve the anti-tumor efficacy of gp70 RNA vaccination in CT26 tumor bearing mice. Hence, improved variants of hAlb-hIL2 that do not increase Tregs such as hAlb-hIL2_A4s and hAlb-hIL2_A6s are expected to be therapeutically even more efficacious.

The invention claimed is:

1. A polypeptide comprising a mutein of human interleukin-2 (IL2) or of a functional variant of human IL2, wherein the human IL2 or functional variant thereof is substituted at at least a position having an acidic or basic amino acid residue in wild type human IL2 that contacts the alpha subunit of the αβγ IL2 receptor complex (IL2Rαβγ), wherein if the amino acid residue is an acidic amino acid residue in wild type human IL2 the substitution is by a basic amino acid residue and if the amino acid residue is a basic amino acid residue in wild type human IL2 the substitution is by an acidic amino acid residue, wherein the human IL2 or functional variant thereof is substituted with at least a glutamic acid at lysine 43, and a lysine at glutamic acid 61, said amino acid substitutions numbered in accordance with wild type human IL2.

2. The polypeptide of claim 1, wherein wild type human IL2 has the amino acid sequence according to SEQ ID NO: 17.

3. The polypeptide of claim 1, wherein the acidic amino acid residue in wild type human IL2 contacts a basic amino acid residue in the alpha subunit of IL2Rαβγ.

4. The polypeptide of claim 1, wherein the basic amino acid residue in wild type human IL2 contacts an acidic amino acid residue in the alpha subunit of IL2Rαβγ.

5. The polypeptide of claim 1, wherein the substitution reduces the affinity for IL2Rα βγ or wherein the substitution reduces the affinity for IL2Rαβγ to a greater extent than for the βγ IL2 receptor complex (IL2Rβγ).

6. The polypeptide of claim 1, wherein the polypeptide preferentially activates effector T cells over regulatory T cells.

7. The polypeptide of claim 1, wherein the human interleukin-2 (IL2) or a functional variant thereof is substituted with a lysine at glutamic acid 62.

8. The polypeptide of claim 1, wherein the human IL2 or functional variant thereof further comprises one or more amino acid substitutions which enhance the affinity for IL2Rβγ.

9. A polypeptide comprising a mutein of human interleukin-2 (IL2) or of a functional variant of human IL2, wherein the human IL2 or functional variant thereof comprises at least (i) one or more amino acid substitutions which reduce the affinity for the alpha subunit of IL2Rαβγ and (ii) one or more amino acid substitutions which enhance the affinity for IL2Rβγ, wherein the human IL2 or functional variant thereof is substituted with at least a glutamic acid at lysine 43 and a lysine at glutamic acid 61.

10. The polypeptide of claim 9, wherein the one or more amino acid substitutions which reduce the affinity for the alpha subunit of IL2Rαβγ comprise substitutions at one or more positions of IL2 or a functional variant thereof selected from the group consisting of K35, T37, R38, T41, F42, K43, F44, Y45, E61, E62, K64, P65, E68, L72, and Y107, and wherein the one or more amino acid substitutions which enhance the affinity for IL2Rβγ comprise substitutions at one or more positions of IL2 selected from the group consisting of K9, L12, Q13, E15, H16, D20, Q74, L80, R81, D84, L85, I86, N88, I92, L94, and E95.

11. The polypeptide of claim 8, wherein the one or more amino acid substitutions which enhance the affinity for IL2Rβγ comprise substitutions at one or more positions of IL2 selected from the group consisting of K9, L12, Q13, E15, H16, D20, Q74, L80, R81, D84, L85, I86, N88, I92, L94, and E95.

12. The polypeptide of claim 9, wherein the one or more amino acid substitutions which enhance the affinity for IL2Rβγ comprise the following set of substitutions: 80F, 81D, 85V, 86V, 92F.

13. The polypeptide of claim 1, which is an extended pharmacokinetic (PK) IL2 further comprising an amino acid sequence which is heterologous to the IL2 or functional variant thereof fused to the substituted IL2 or functional variant thereof.

14. The polypeptide of claim 13, wherein the amino acid sequence which is heterologous to the IL2 or functional variant thereof is selected from the group consisting of serum albumin, an immunoglobulin fragment, transferrin, and Fn3, or variants thereof.

15. The polypeptide of claim 14, wherein the serum albumin comprises mouse serum albumin or human serum albumin.

16. A polynucleotide encoding the polypeptide of claim 1.

17. The polynucleotide of claim 16, which is RNA.

18. A host cell comprising the polynucleotide of claim 16.

19. A pharmaceutical composition comprising the polypeptide of claim 1, a polynucleotide encoding the polypeptide of claim 1, or a host cell comprising the polynucleotide.

20. A medical preparation comprising: a. the polypeptide of claim 1, a polynucleotide encoding the polypeptide of claim 1, a host cell comprising the polynucleotide, or a pharmaceutical composition comprising the polypeptide or the polynucleotide; and b. a peptide or polypeptide comprising an epitope for inducing an immune response against an antigen in a subject or a polynucleotide encoding the peptide or polypeptide.

21. The medical preparation of claim 20, which comprises each component a. and b. in a separate container.

22. The medical preparation of claim 20, further comprising instructions for use of the medical preparation for treating or preventing cancer wherein the antigen is a tumor-associated antigen.

23. The polypeptide of claim 11, wherein the one or more amino acid substitutions which enhance the affinity for IL2Rβγ comprise the following set of substitutions: 80F, 81D, 85V, 86V, 92F.

24. The polypeptide of claim 9, wherein (i) the one or more amino acid substitutions which reduce the affinity for the alpha subunit of IL2Rαβγ comprise a substitution at position 43 (lysine) with glutamic acid and a substitution at position 61 (glutamic acid) with lysine.

25. The polypeptide of claim 9, wherein the human interleukin-2 (IL2) or a functional variant thereof is substituted with a lysine at glutamic acid 62.

* * * * *